(12) United States Patent
Gruse et al.

(10) Patent No.: US 11,945,544 B2
(45) Date of Patent: Apr. 2, 2024

(54) CONTROL DEVICE FOR A BICYCLE

(71) Applicant: SRAM, LLC, Chicago, IL (US)

(72) Inventors: Patrick Gruse, Colorado Springs, CO (US); Rebecca Greetis, Chicago, IL (US); Nathan Luman, Chicago, IL (US); Douglas Mahoney, Park Ridge, IL (US); Walter May, Colorado Springs, CO (US); Neil Swanson, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 38 days.

(21) Appl. No.: 17/673,999

(22) Filed: Feb. 17, 2022

(65) Prior Publication Data
US 2023/0257062 A1    Aug. 17, 2023

(51) Int. Cl.
| | |
|---|---|
| *B62L 3/02* | (2006.01) |
| *B60T 11/236* | (2006.01) |
| *B62J 43/20* | (2020.01) |
| *B62J 43/30* | (2020.01) |
| *B62M 25/08* | (2006.01) |

(52) U.S. Cl.
CPC ............ *B62L 3/023* (2013.01); *B60T 11/236* (2013.01); *B62J 43/20* (2020.02); *B62J 43/30* (2020.02); *B62M 25/08* (2013.01)

(58) Field of Classification Search
CPC ......... B62L 3/023; B60T 11/236; B62J 43/20; B62J 43/30; B62M 25/08
See application file for complete search history.

(56) References Cited

U.S. PATENT DOCUMENTS

| | | | | |
|---|---|---|---|---|
| 9,290,232 B2 * | 3/2016 | Snead | ................... | B62L 3/023 |
| 9,630,677 B2 * | 4/2017 | Jordan | .................. | B62K 23/06 |
| 10,589,819 B2 * | 3/2020 | Komada | ............... | B62M 25/04 |
| 10,894,578 B2 * | 1/2021 | Cahan | ..................... | B62L 3/02 |
| 2009/0120751 A1 | 5/2009 | Lin | | |
| 2013/0255239 A1 * | 10/2013 | Miki | ..................... | B62L 3/023 |
| | | | | 60/325 |
| 2014/0368026 A1 * | 12/2014 | Fushimi | ............... | B60T 11/101 |
| | | | | 303/9.64 |
| 2015/0284049 A1 | 10/2015 | Shipman et al. | | |

(Continued)

FOREIGN PATENT DOCUMENTS

| | | | | |
|---|---|---|---|---|
| DE | 202014100854 U1 | 6/2014 | | |
| EP | 3043102 A1 * | 7/2016 | ............. | F16L 37/28 |

*Primary Examiner* — Vinh Luong

(57) ABSTRACT

A control device includes a housing having a base portion and an extension portion. The base portion of the housing has an inward facing side and an outward facing side. The control device includes a lever coupled to and pivotable relative to the housing, and a master cylinder portion supported by the housing. The master cylinder portion has a hollow fluid cylinder. The control device also includes a piston assembly supported by the housing. The piston assembly is movable relative to the master cylinder portion. At least part of the piston assembly is disposed within the master cylinder portion. The master cylinder portion is angled relative to the outward facing side of the base portion of the housing, such that the first end of the fluid cylinder is closer to the outward facing side than the second end of the fluid cylinder is relative to the outward facing side.

19 Claims, 30 Drawing Sheets

(56) References Cited

U.S. PATENT DOCUMENTS

| | | | |
|---|---|---|---|
| 2015/0367908 A1* | 12/2015 | Kariyama | B62L 3/023 |
| | | | 188/344 |
| 2016/0264213 A1* | 9/2016 | Swanson | B62M 25/08 |
| 2018/0238354 A1 | 8/2018 | Komada | |
| 2019/0315435 A1 | 10/2019 | Jordan | |
| 2020/0172193 A1* | 6/2020 | Zenere | B62L 1/06 |
| 2022/0185425 A1* | 6/2022 | Dunlap | B62L 3/023 |
| 2022/0185426 A1* | 6/2022 | Dunlap | B62K 23/06 |
| 2023/0067171 A1* | 3/2023 | Brown | B62K 23/02 |
| 2023/0356802 A1* | 11/2023 | Dunlap | B62L 3/023 |

* cited by examiner

CONTROL DEVICE FOR A BICYCLE

FIELD OF THE DISCLOSURE

The present disclosure is generally directed to a control device for a bicycle, and more particularly, to a control device for a bicycle braking mechanism and gear shifting mechanism.

DESCRIPTION OF RELATED ART

Many vehicles, such as, for example, bicycles, utilize a hydraulic brake system that applies pressure to a rotating part, a rotating wheel, or a disc mounted to the rotating wheel. Some of these braking systems utilize a mechanism including a brake lever to generate pressure in a hydraulic fluid. This pressure is transferred through a hydraulic line or conduit to a brake assembly, such that the hydraulic pressure is applied to pads of the brake assembly to squeeze the pads against the rotating part to impart a braking force.

The mechanism including the hand lever may be part of a control device that also includes an electronic shift control system. The electronic shift control system also includes at least a shift lever located adjacent to the brake lever, a transmitter configured to wirelessly transmit shift signals wirelessly, and a battery unit configured to power the transmitter. The control device is mountable to a handlebar of the bicycle, such that a rider may activate the brake lever and the shift lever.

SUMMARY

In one example, a control device mountable to a handlebar of a bicycle includes a housing having a base portion and an extension portion. The base portion of the housing has a front end, a rear end opposite the front end, a downward facing side, an upward facing side, an inward facing side, an outward facing side, and a handlebar clamp disposed at the rear end. The control device also includes a lever coupled to and pivotable relative to the housing, and a master cylinder portion supported by the housing. The master cylinder portion has a fluid cylinder. The fluid cylinder has a first end and a second end opposite the first end with a cylindrical wall therebetween. The fluid cylinder is hollow, such that an opening extends through the master cylinder portion, from the first end to the second end. The control device also includes a piston assembly supported by the housing. The piston assembly is movable relative to the master cylinder portion. At least part of the piston assembly is disposed within the master cylinder portion. The master cylinder portion is angled relative to the outward facing side of the base portion of the housing, such that the first end of the fluid cylinder is closer to the outward facing side than the second end of the fluid cylinder is relative to the outward facing side.

In one example, the control device further includes a push rod. The lever is coupled to the piston assembly via the push rod, such that rotation of the lever relative to the housing causes the piston assembly to translate relative to the master cylinder portion.

In one example, the master cylinder portion has a central axis extending along a length of the master cylinder portion. The control device further includes a pivot axle that pivotably couples the lever to the housing. The pivot axle defines a pivot axis about which the lever is pivotable relative to the housing. The pivot axis is perpendicular relative to the central axis of the master cylinder portion, such that the lever pivots in a plane in line with or parallel relative to the central axis of the master cylinder portion.

In one example, relative to the downward facing side of the base portion of the housing, the pivot axle is disposed above the push rod.

In one example, the control device further includes a fluid chamber at least partially disposed within the extension portion of the housing. The pivot axle is disposed between at least part of the fluid chamber and the push rod.

In one example, the cylindrical wall of the fluid cylinder has at least one inner annular surface and at least one outer annular surface. The cylindrical wall of the fluid cylinder includes an opening extending from an inner annular surface of the at least one inner annular surface to an outer annular surface of the at least one outer annular surface of the cylindrical wall, through the cylindrical wall.

In one example, the piston assembly includes a piston and a seal disposed around the piston. A fluid is disposable within a volume between the piston and the fluid cylinder. The piston assembly is configured to translate in a first direction relative to the master cylinder portion from a first position towards a second position when the lever pivots in a first rotational direction relative to the housing, such that the seal moves towards the opening through the cylindrical wall of the fluid cylinder and pushes a portion of the fluid out of the master cylinder portion for activation of a brake caliper of the bicycle.

In one example, the control device further includes a fluid port supported by the base portion of the housing, a bleed port supported by the extension portion of the housing, and a fluid passage within the housing. The fluid passage is between the fluid chamber and the master cylinder portion. When the piston assembly is in the first position relative to the master cylinder portion, the control device has a fluid path between the fluid port and the bleed port, via the opening through the master cylinder portion, the opening through the cylindrical wall of the fluid cylinder, a volume between the fluid cylinder and the housing, the fluid passage, and the fluid chamber.

In one example, the master cylinder portion has a central axis extending along a length of the master cylinder portion. When the control device is mounted to the handlebar of the bicycle, the central axis of the master cylinder portion extends generally horizontally relative to a flat surface on which the bicycle is supported.

In one example, a control device mountable to a handlebar of a bicycle includes a housing having a base portion and an extension portion. The base portion of the housing has a front end, a rear end opposite the front end, a downward facing side, an upward facing side, an inward facing side, an outward facing side, and a handlebar clamp disposed at the rear end. The control device also includes a lever coupled to and pivotable relative to the housing, and a master cylinder portion supported by the housing. The master cylinder portion has a fluid cylinder. The fluid cylinder has a first end and a second end opposite the first end with a cylindrical wall therebetween. The fluid cylinder is hollow, such that an opening extends through the master cylinder portion, from the first end to the second end. The control device also includes a piston assembly supported by the housing, the piston assembly being movable relative to the master cylinder portion, at least part of the piston assembly being disposed within the master cylinder portion. The control device also includes a first adjustment mechanism configured to adjust an angular position of the lever relative to the housing, such that when the control device is mounted to the handlebar of the bicycle, a distance between an end of the lever and the handlebar is also adjusted. The control device also includes a second adjustment mechanism configured to adjust an initial position of the piston assembly relative to an opening through the cylindrical wall of the fluid cylinder.

In one example, the piston assembly includes a piston and a seal disposed around the piston. A fluid is disposable within a volume between the piston and the fluid cylinder. The piston assembly is configured to translate in a first direction relative to the master cylinder portion from a first position towards a second position when the lever pivots in a first rotational direction relative to the housing, such that the seal moves towards the opening through the cylindrical wall of the fluid cylinder and pushes a portion of the fluid out of the master cylinder portion for activation of a brake caliper of the bicycle.

In one example, the control device further includes a push rod. A first end of the push rod is coupled to the lever via the first adjustment mechanism, and a second end of the push rod is coupled to the piston assembly, such that rotation of the lever relative to the housing causes the piston assembly to translate relative to the master cylinder portion. The first adjustment mechanism includes a threaded connection between the push rod, at or adjacent to the first end of the push rod, and the lever. The lever is pivotably connected to the housing, such that when the push rod rotates relative to the lever in a first rotational direction via the threaded connection between the push rod and the lever, an end of the lever moves towards the base portion of the housing.

In one example, the first end of the push rod is accessible and rotatable via an opening through the lever.

In one example, the second adjustment mechanism includes a cam that is rotatable relative to the piston assembly. The piston assembly is biased against the cam, such that the cam acts as a stop and locates an initial position of the piston assembly relative to the master cylinder portion. The cam is configured to translate the piston assembly relative to the master cylinder portion when the cam is rotated relative to the piston assembly.

In one example, the master cylinder portion has a central axis extending along a length of the master cylinder portion. The cam is rotatable relative to the piston assembly about a cam axis of rotation. The cam axis of rotation is perpendicular to the central axis of the master cylinder portion. The cam has a plurality of sides. Each side of the plurality of sides has a different height in a direction along or parallel with the central axis of the master cylinder portion.

In one example, the control device further includes a push rod and a push rod support including a receptacle at a first end of the push rod support. The push rod support is connected to the push rod at the receptacle. The push rod support supports the cam at or adjacent to a second end of the push rod support. The second end of the push rod support is opposite the first end of the push rod support. The lever is coupled to the piston assembly via the push rod, the push rod support, and the cam, such that rotation of the lever relative to the housing causes the piston assembly to translate relative to the master cylinder portion.

In one example, the second adjustment mechanism includes a hollow dial supported by the housing. The second adjustment mechanism is configured, such that rotation of the hollow dial relative to the housing causes one of the piston assembly and the master cylinder portion to translate relative to the other of the piston assembly and the master cylinder portion.

In one example, the control device further includes a push rod and a push rod support including a receptacle at a first end of the push rod support. The push rod support is connected to the push rod at the receptacle. The second adjustment mechanism further includes a hollow adapter having an inner annular surface and an outer annular surface. A second end of the push rod support is threadedly connected to the hollow adapter at the inner annular surface of the hollow adapter, and an inner annular surface of the hollow dial is connected to the outer annular surface of the hollow adapter. The hollow adapter abuts a piston of the piston assembly, and is configured to rotate with the hollow dial and rotate and translate relative to the push rod support via the threaded connection between the push rod support and the hollow adapter, such that rotation of the hollow dial relative to the housing causes the hollow adapter, and thus the piston assembly, to translate relative to the master cylinder portion.

In one example, the control device further includes a push rod. A piston of the piston assembly includes a receptacle at an end of the piston. The piston is connected to the push rod at the receptacle. An inner annular surface of the hollow dial is threadedly connected to an outer annular surface of the fluid cylinder. The hollow dial is rotatable relative to the fluid cylinder via the threaded connection between the inner annular surface of the hollow dial and the outer annular surface of the fluid cylinder, such that rotation of the hollow dial relative to the housing causes the fluid cylinder to translate relative to the piston assembly.

In one example, the control device further includes a cover that is connected to the housing. The cover covers at least part of the housing. The cover is movable relative to the housing, from a first position relative to the housing to a second position relative to the housing, such that the hollow dial is accessible when the cover is in the second position relative to the housing.

In one example, the control device further includes a shift lever coupled to and movable relative to the housing, and an electrical switch that is actuatable by movement of the shift. The control device further includes a controller in communication with the electrical switch. The controller is configured to generate a shift signal in response to actuation of the electrical switch. The control device further includes a battery receptacle supported by the base portion of the housing. The battery receptacle is electrically connected to the controller, such that when a battery is disposed within the battery receptacle, the battery is configured to power the controller, the electrical switch, or a combination thereof. The control device further includes a battery cover that closes off the battery receptacle and is removably attached to the battery receptacle or the housing.

In one example, the battery receptacle opens up to the downward facing side or the inward facing side of the base portion of the housing.

In one example, the battery receptacle is supported within the housing, between the downward facing side of the base portion of the housing and the master cylinder portion.

In one example, the extension portion of the housing has an inward facing side and an outward facing side. The outward facing side is opposite the inward facing side. The electrical switch is a first switch. The control device further includes a second switch that is supported by the extension portion of the housing, at or adjacent to the inward facing side of the extension portion of the housing.

In one example, the control device further includes an actuator in communication with the second switch, such that the second switch is actuatable via the actuator. The actuator is supported by the inward facing side of the extension portion of the housing.

In one example, the second switch is electrically connected to the controller, such that when the battery is disposed within the battery receptacle, the battery is configured to power the second switch.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
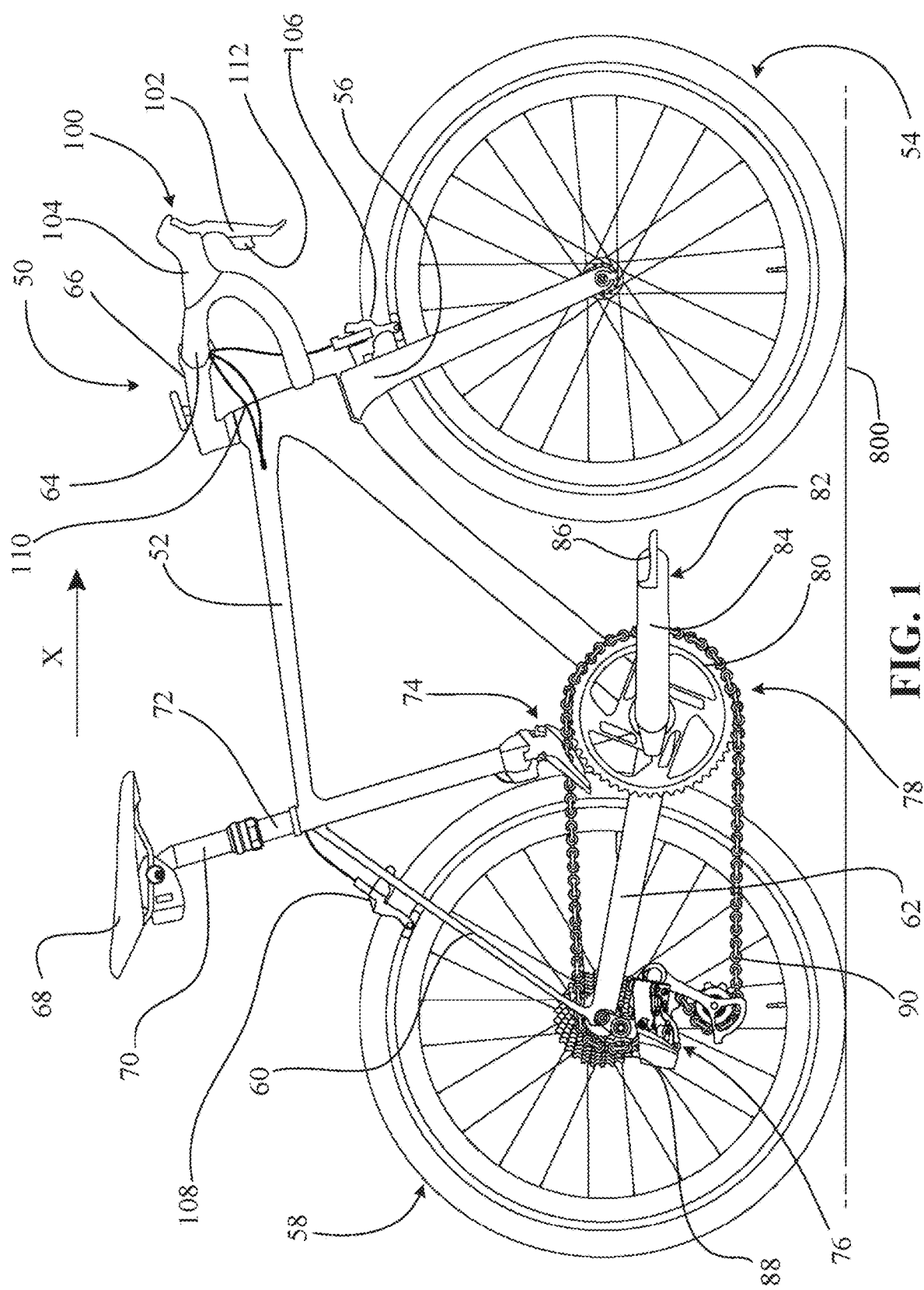
FIG. 1 is a side view of one example of a bicycle that may be fitted with a control device constructed in accordance with the teachings of this disclosure.
Figure 2:
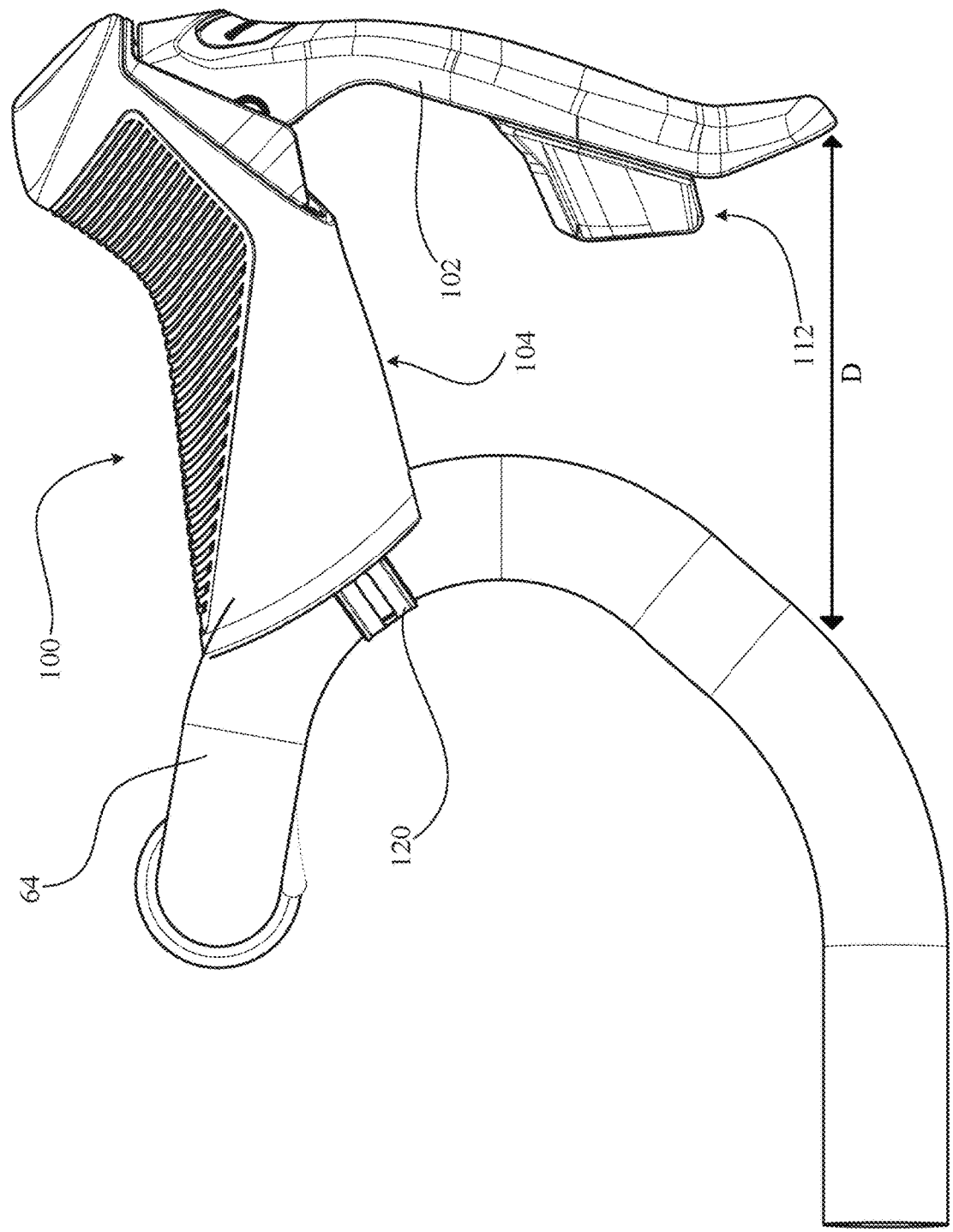
FIG. 2 is a first side view of an embodiment of the control device and a portion of a handlebar of the bicycle of FIG. 1.
Figure 3:
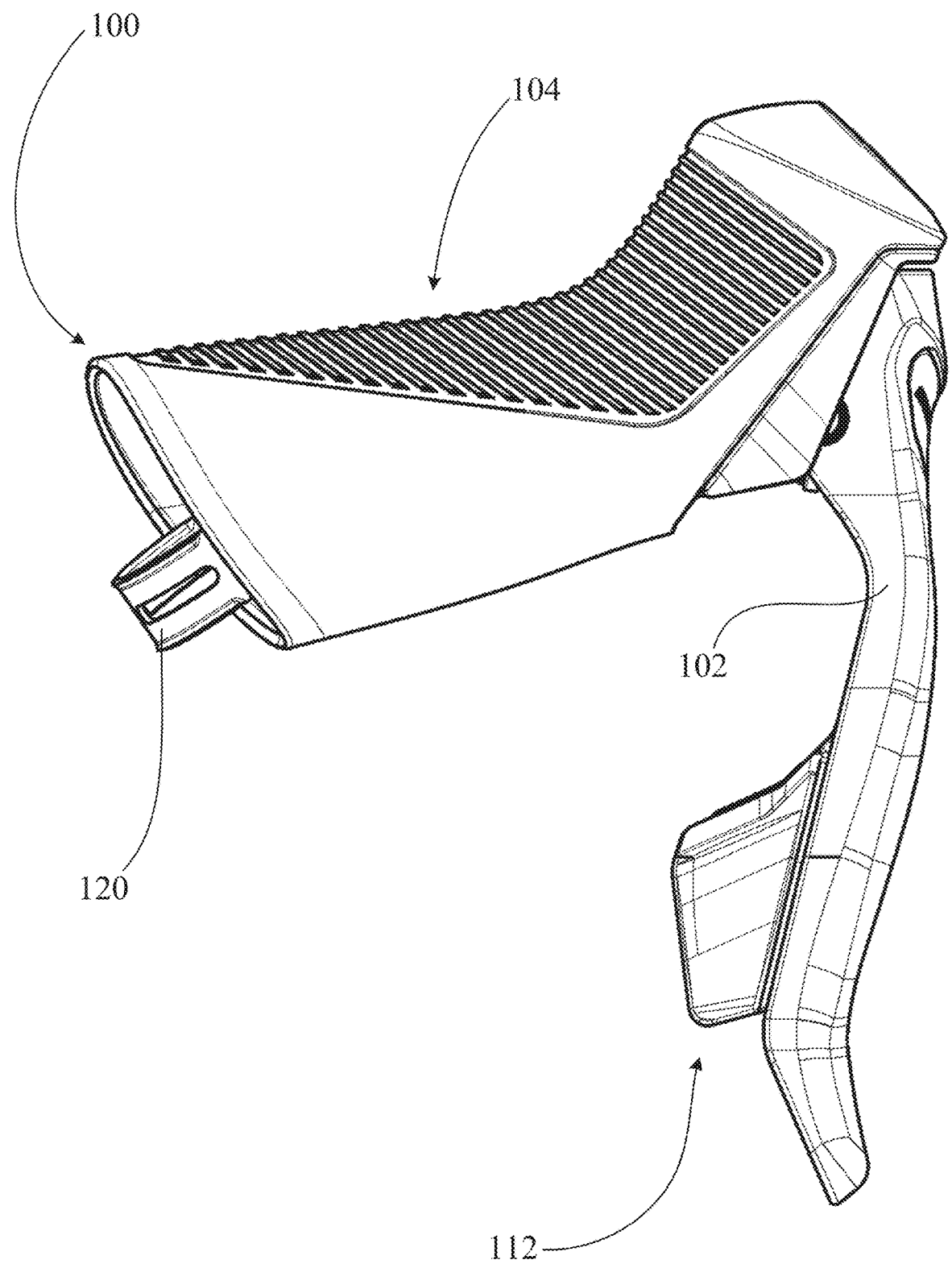
FIG. 3 is the first side view of the control device of FIG. 2, removed from the handlebar.
Figure 4:
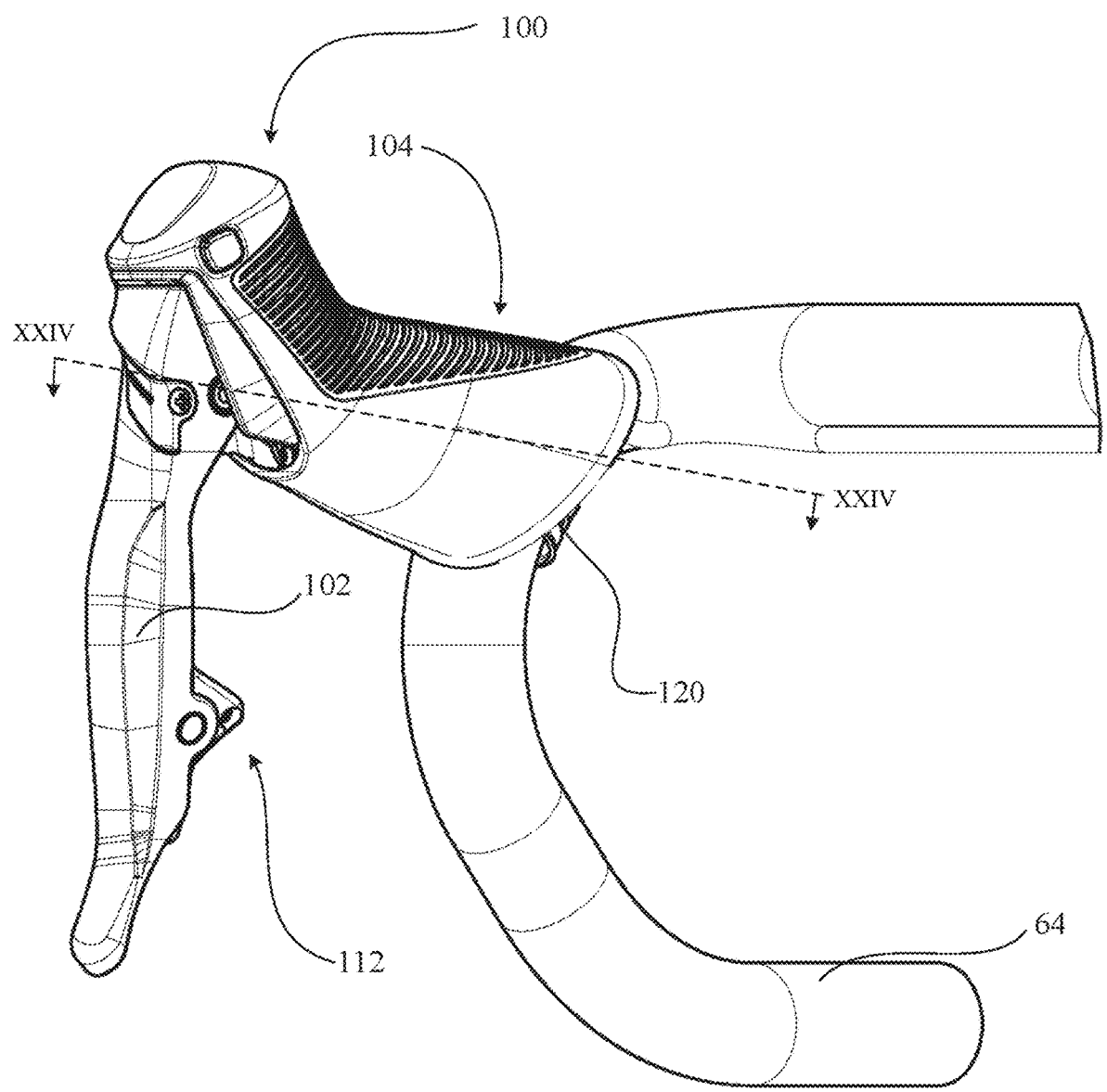
FIG. 4 is an exterior perspective view of the control device of FIG. 2 and a portion of a handlebar of the bicycle of FIG. 1.

Hydraulic brake calculations for a bicycle are based upon lever fluid volumes, hose fluid volume, and caliper fluid volume. As pads wear, fluid is displaced into the caliper. A master cylinder of a control device includes timing ports. The timing ports allow fluid to flow between the caliper of the brake assembly and a reservoir within a lever body of the control device. When a primary seal crosses the timing ports, the seal positively displaces fluid and builds hydraulic pressure within the hydraulic line to a brake assembly. This hydraulic pressure causes a braking force, slowing the bicycle and a rider. For this reason, locating the primary seal close to the timing ports allows for minimum lever movement before braking is felt by the rider. Existing control devices of the prior art rely on a locating feature formed on the lever body to locate the piston assembly, and thus the primary seal, relative to the master cylinder.

The present disclosure provides examples of control devices for a bicycle that solve or improve upon one or more disadvantages with prior known control devices. The disclosed control devices include adjustment mechanisms for adjustment of a distance between the primary seal and the timing ports. For example, an adjustment mechanism may include a multi-position cam for such hydraulic contact adjustment. The multi-position cam may stop and locate the piston assembly, which includes, for example, a master piston and the primary seal, and may be used to adjust a position of the piston assembly relative to the timing ports.

To create a lower cost configuration of a master cylinder and piston assembly, the master cylinder is independent of a lever body of the control device. This allows each component to be designed and manufactured using, for example, lowest cost and/or lowest weight materials for each component. To reduce the number of components for cost and/or assembly purposes, multiple components and/or functions are integrated together.

The disclosed control devices also include an auxiliary button for additional functionality and ergonomics. The auxiliary button is mounted to an inboard side of an upper, pommel portion of a body (e.g., a housing) of the control device. The auxiliary button may be positioned above a brake lever cavity, in front of a hydraulic reservoir cover sealing face. The auxiliary button may be connected to a shift lever paddle printed circuit board (PCB) via a cable that is routed and retained on the body of the control device through a channel within the body of the control device.

The disclosed control devices also include a remote hydraulic reservoir. The hydraulic reservoir may be above the master cylinder (e.g., within a pommel portion of the body of the control device), which maximizes air evacuation. To provide more hydraulic reservoir fluid volume, a pocket may be added into a lever blade opening for additional fluid for compensation. The pocket may fit between ears of a lever blade and wrap around a lever pivot axle.

The disclosed control devices also include a high-pivot brake lever. A location of a pivot of the lever blade is higher than an actuating cross dowel and a pushrod. The location of the pivot allows for a greater mechanical advantage for building pressure and also provides a more subtle sweep of an end of the pushrod, mitigating bore, piston, and seal wear that may occur from side-load of the master piston.

The disclosed control devices also include a master cylinder that is oriented at an angle relative to the handlebar. This angle provides space to package the master cylinder, contact adjustment (e.g., one or more adjustment mechanisms), and a fluid port into a cylinder bore. The angle of the master cylinder allows for installation of a hose and a hose compression nut. The lever blade may be mounted at the same angle to provide smooth lever actuation. This angle also provides a unique ergonomic experience, as a sweep of the lever blade follows a natural motion of finger(s) of the rider.

These and other objects, features, and advantages of the disclosed control devices will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 depicts a bicycle 50 with a frame 52, a front wheel 54 coupled to a fork 56 of the frame 52, and a rear wheel 58 coupled to seat stays 60 and chain stays 62 of the frame 52. The front wheel 54 and the rear wheel 58 support the frame 52 above a surface on which the bicycle 50 may travel in a forward direction indicated by the arrow 'X'. The bicycle 50 has a drop-bar type handlebar 64 that is mounted to a head tube 66 of the frame 52. The bicycle 50 also has a seat 68 carried by a seat post 70 received in a seat tube 72 of the frame 52. The bicycle 50 may have one or both of a front gear changer 74 (e.g., a front electromechanical derailleur; hereinafter, referred to as a front derailleur) and a rear gear changer 76 (e.g., a rear electromechanical derailleur; hereinafter, referred to as a rear derailleur) mounted to the frame 52. The bicycle 50 includes a multiple-geared drive train 78 with one or more chainrings 80 driven by a crank assembly 82, which has two crank arms 84 and two pedals 86, respectively. The chainrings 80 may be connected to a plurality of sprockets 88 at the rear wheel 58 by a chain 90.

Referring to FIGS. 1-7, the bicycle 50 in the disclosed example has at least one bicycle control device 100 (e.g., control device 100) that is mountable to the handlebar 64. In this example, the control device 100 includes a brake control element of a brake system. The brake control element includes a brake lever 102 that is movably connected to a hood or housing 104 of the control device 100. The brake lever 102 operates components of the braking system of the bicycle 50. In one example, the brake system may include a hydraulic front brake mechanism 106 coupled to the front wheel 54 (see FIG. 1) and/or a hydraulic rear brake mechanism 108 coupled to the rear wheel 58 (see FIG. 1) via, for example, a hydraulic brake line 110. In an embodiment, the brake system is a hydraulic disc brake system including hydraulic brake mechanisms acting on rotors. In an alternate embodiment, the brake system may instead be a mechanical cable type brake system. As described in greater detail below, the control device 100 also includes a shift control element of an electronic shift control system. The shift control element includes a shift lever assembly 112 for shifting the gears of the bicycle 50.

Referring to FIGS. 2-7, different exterior views of the control device 100, which is constructed according to one example of the present disclosure, are depicted. The control device 100 is mountable to the handlebar 64. In one example, the housing 104 includes a clamp 120, which may include an adjustable band that extends around the handlebar 64. In one example, the bicycle 50 may include a pair of the control devices 100, one on each of the left side and the right side of the handlebar 64, as is well known. Together, the pair of control devices 100 may be configured to operate the front derailleur 74 and the rear derailleur 76, respectively, and the front brake mechanism 106 and the rear brake mechanism 108, respectively. In one example, the pair of control devices 100 may be identical to one another.

Figure 8:
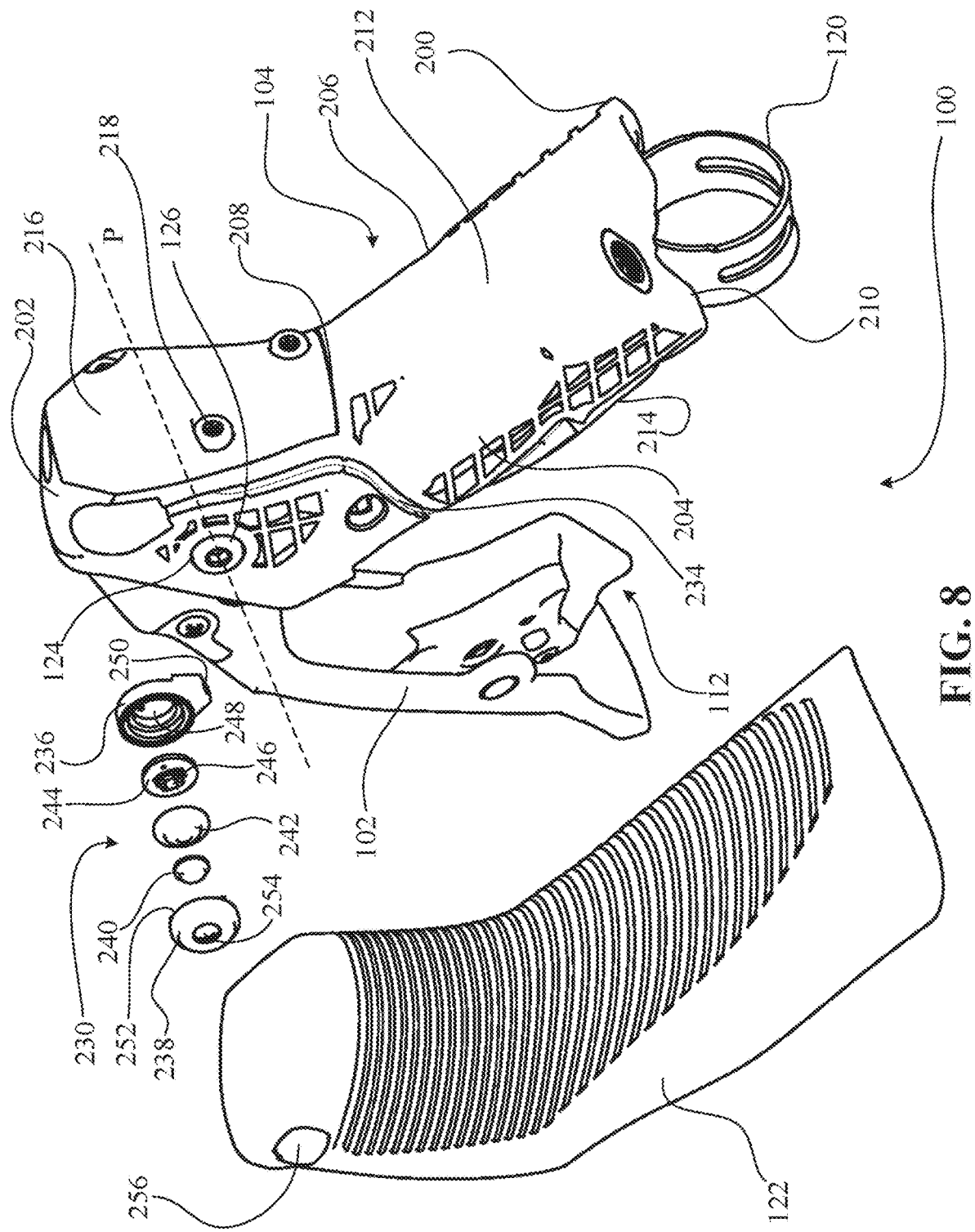
FIG. 8 is a perspective view of the control device of FIG. 2 with an exploded view of the cover and an auxiliary button dissembled from a housing of the control device.

In the disclosed example, referring to FIG. 8, the control device 100 includes a hood (e.g., the housing 104) that may be covered with an exterior or outer cover 122. The housing 104 is shaped and sized to be grasped by a hand of a user or rider, and the outer cover 122 may be configured to closely follow and overlie the shape of the housing 104. The housing 104 and outer cover 122 may serve as a grip or may together be configured as a graspable portion of the control device 100. The housing 104 may be formed of any number of materials, such as, for example, metal, plastic, and/or composite materials. For example, the housing 104 may be made of glass filled Nylon or carbon filled Nylon. The housing 104 is constructed to carry, house, and/or support various components and mechanisms of the control elements of the brake system and the electronic shift control system, as described in greater detail below. The outer cover 122 may be made of any number of materials, such as, for example, natural materials and/or synthetic elastomeric materials. The outer cover 122 may be configured to present a comfortable interface with the user and to reduce the tendency to become detached or moved from a position on an exterior of the housing 104. For example, the outer cover 122 may be formed of a flexible thermoplastic elastomer (TPE) such as Santoprene™ or thermoplastic vulcanizates. The outer cover 122 may be configured to be removably attached to and held in position on the housing 104 using any known securement or attachment method.

Figure 17:
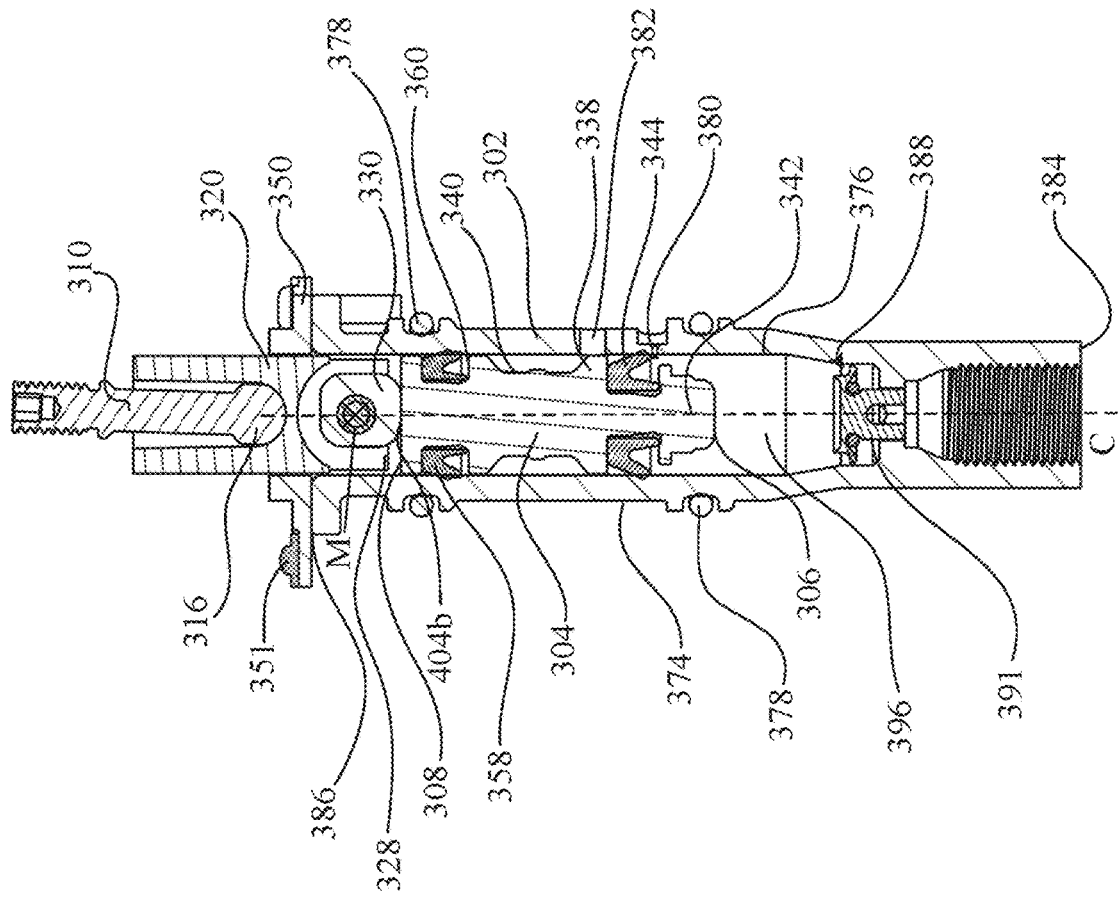
FIG. 17 is a cross section of the fluid cylinder of FIG. 16, with the first adjustment mechanism and the piston assembled within the fluid cylinder.

Referring to FIG. 17, the master cylinder sleeve 302 includes one or more first openings 380 (e.g., a plurality of first openings; five first openings disposed around a circumference of the master cylinder sleeve 302) and one or more second openings 382 (e.g., a plurality of second openings; five second openings disposed around a circumference of the master cylinder sleeve 302). The plurality of first openings 380 and the plurality of second openings 382, for example, extend from at least one of the one or more outer annular surfaces 374, through the master cylinder sleeve 302 (e.g., through a cylindrical wall 704 of the master cylinder sleeve 302), to at least one of the one or more inner annular surfaces 376, respectively. In other words, the plurality of first openings 380 and the plurality of second openings 382 extend radially through the master cylinder sleeve 302.

Figure 13:
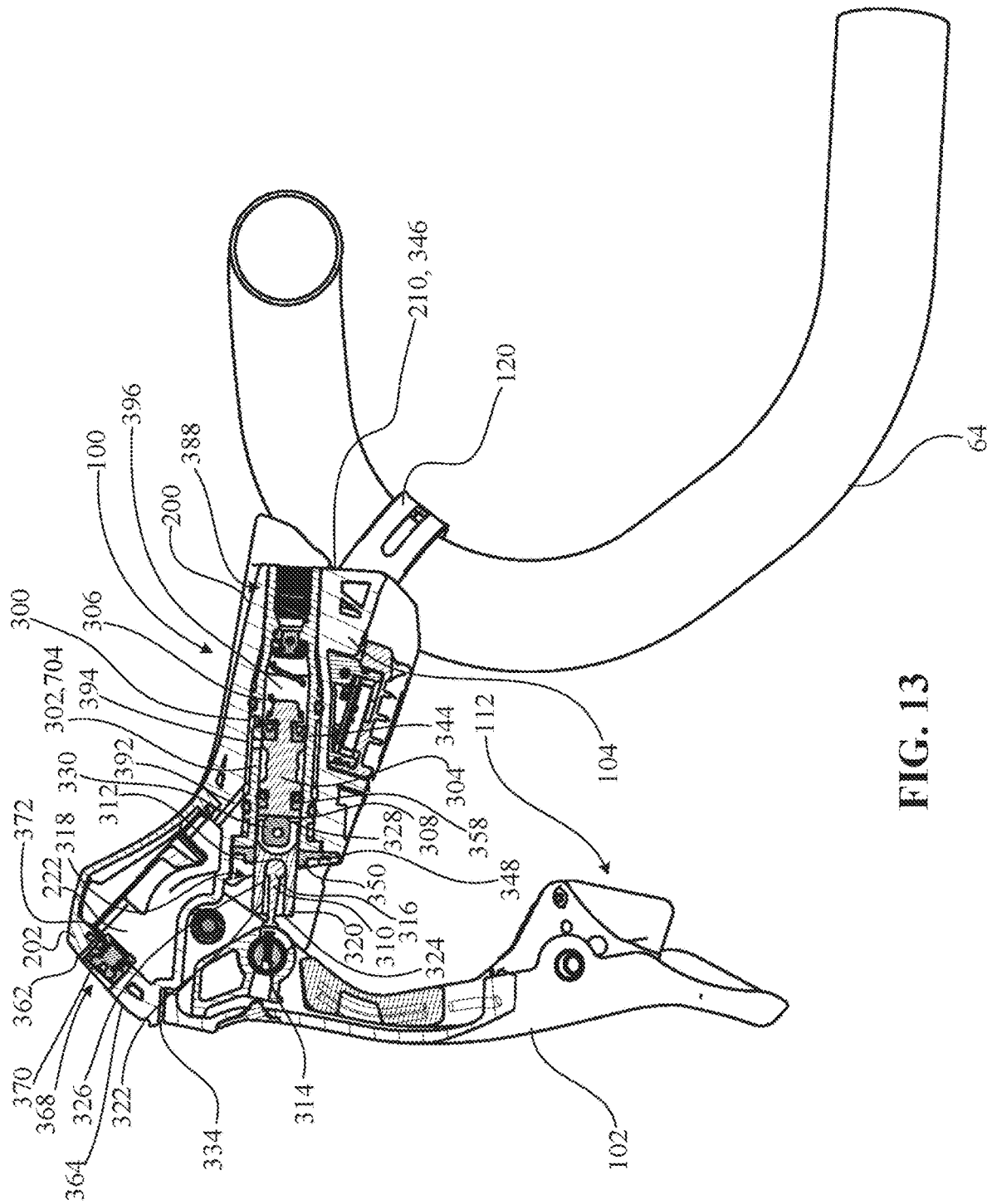
FIG. 13 is a cross-section of the control device of FIG. 11 taken along axis XIII-XIII of FIG. 11.
Figure 14:
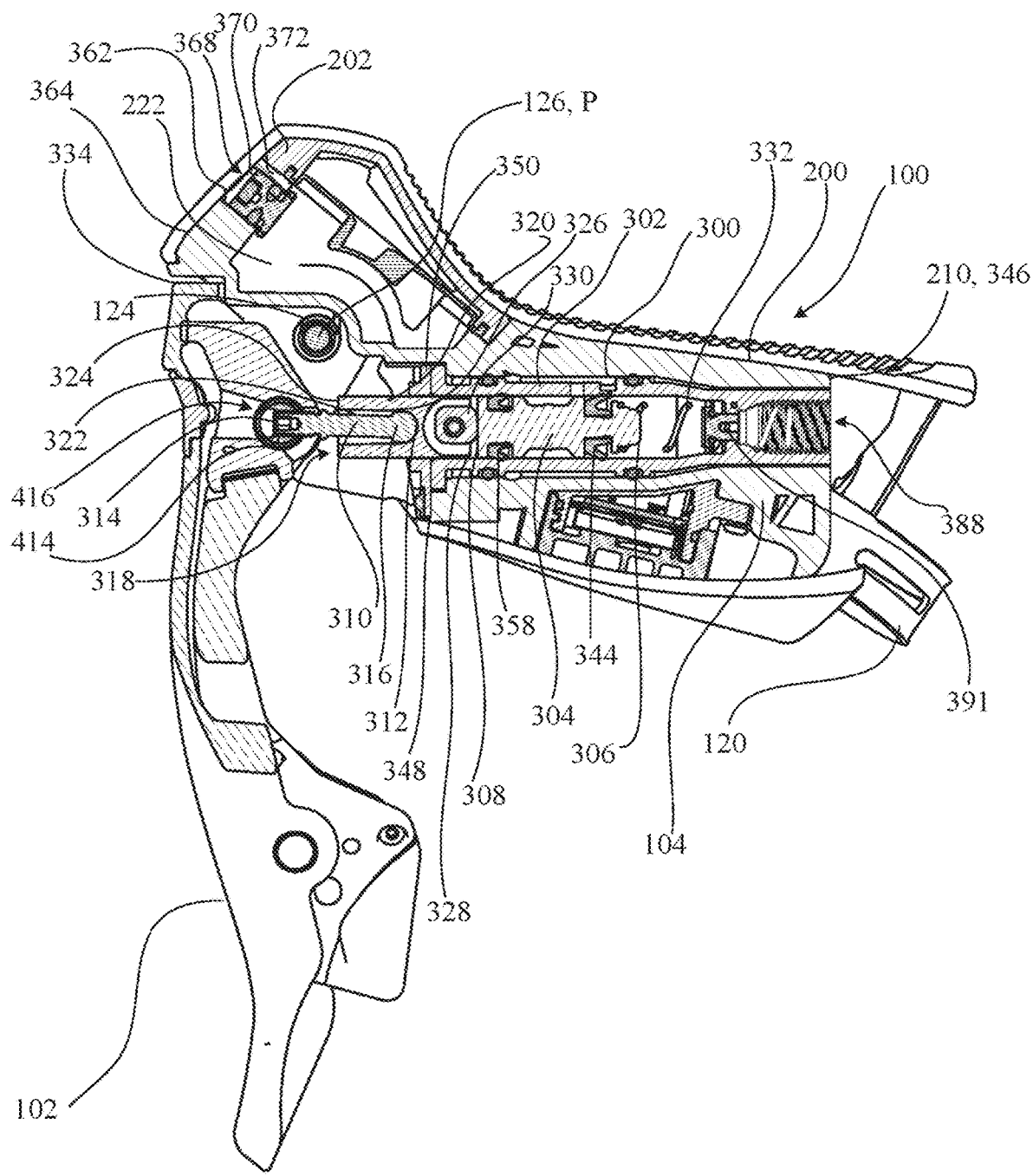
FIG. 14 is a cross-section of the control device of FIG. 12, taken along axis XIV-XIV of FIG. 12.

In this example, referring to FIGS. 8, 13, and 14, the brake lever 102 is pivotally or movably attached to the housing 104. The brake lever 102 may be attached to the housing 104 at or near a leading or front part of the housing 104 so that the brake lever 102 is spaced forward from the handlebar 64. The brake lever 102 may thus be pivotable relative to the housing 104 generally forward and rearward. As discussed further below, the brake lever 102 may also be pivotable toward and away from the frame 52 of the bicycle 50.

Figure 10:
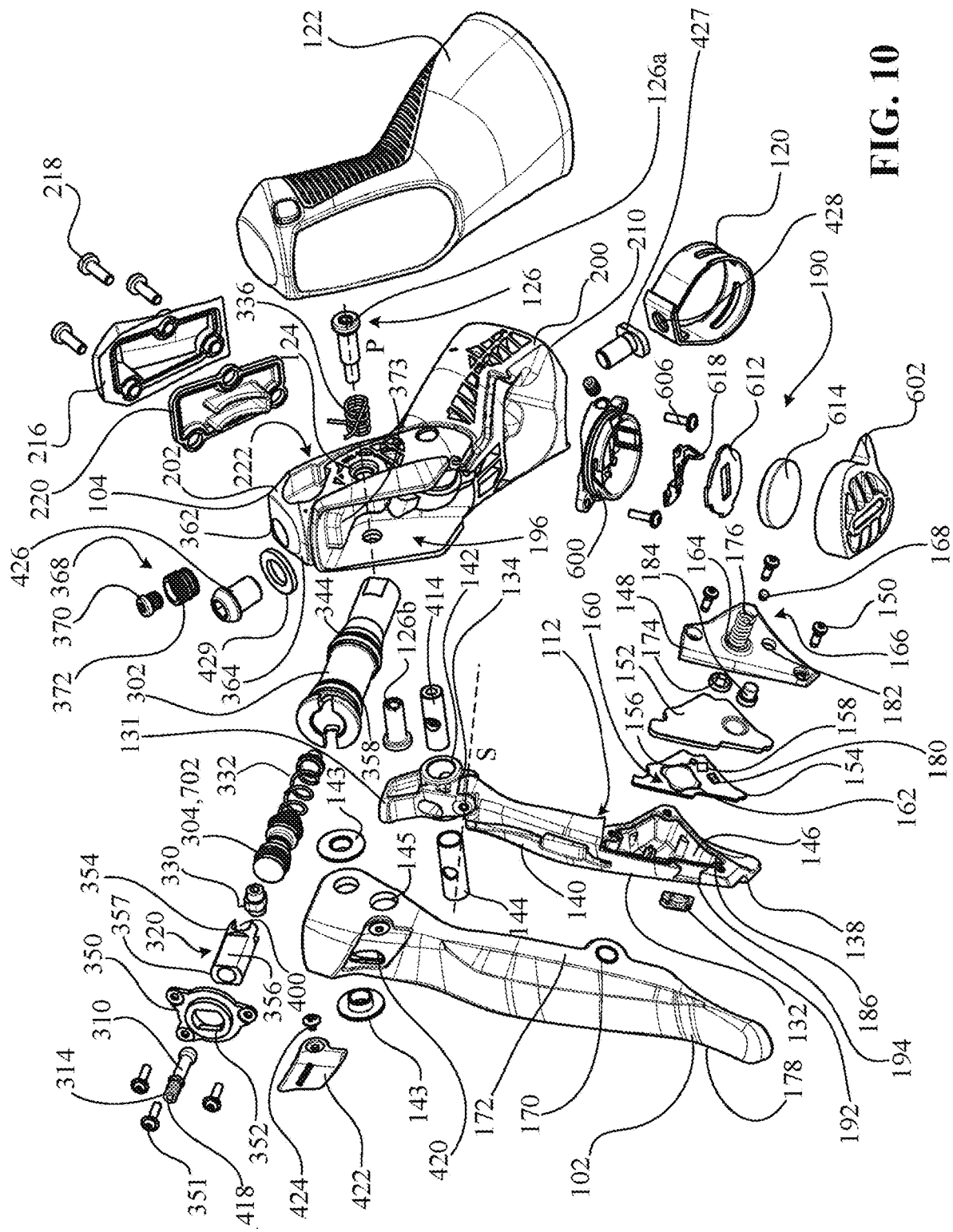
FIG. 10 is an exploded perspective view of the control device of FIG. 2.

The brake lever 102 may be made of any number of materials, such as, for example, metal (e.g., aluminum), plastic, and/or composite materials. Referring to FIG. 10, the housing 104 may include a pivot bore or holes 124. The pivot holes 124 may be aligned with one another and define a pivot axis P. The brake lever 102 may be attached to the housing 104 by an axle 126 formed by, for example, a pivot pin, a rod, a shaft, or the like, through the pivot holes 124. As discussed further below, the pivot axis P may be disposed above a push rod operably coupled to a piston supported by the housing 104. Further, the pivot axis P may be disposed between the push rod and at least part of a fluid chamber disposed within the housing 104.

In the disclosed example, the brake lever 102 may have a U-shaped recess or define a channel along at least a lengthwise portion of the grip handle. Referring to FIGS. 2-7, the shift lever assembly 112 may be positioned in a nested arrangement at least partially within the recess or channel, as described in more detail below. This nested arrangement of the shift lever assembly 112 with the brake lever 102, and the U-shape of the lever body, may impart some rigidity to the structure and may provide protection for components disposed within the channel. The shift lever assembly 112 may also be pivotally or movably attached to the housing 104, to a pivot mechanism, or to the brake lever 102. The shift lever assembly 112 may be positioned behind the brake lever 102 (e.g., between the brake lever 102 and the handlebar 64 when installed on the bicycle 50). The shift lever assembly 112 may be made of any number materials, such as, for example, plastic or composite materials. In one example, the shift lever assembly 112 may be made, at least in part, from a material that does not significantly inhibit wirelessly transmitted signals from penetrating the material.

Referring to FIG. 10, the shift lever assembly 112 may pivot laterally in a direction about an axis S that is generally perpendicular to the pivot axis P of the brake lever 102 about the axle 126. Thus, the shift lever assembly 112 may move in inboard and outboard directions relative to the bicycle 50 while staying nested and aligned with the brake lever 102.

The shift lever assembly 112 includes a bracket 131 and a shift lever 132. The shift lever 132 has a proximal end 134 that is directly or indirectly pivotably attached to the bracket 131, the housing 104, and/or the brake lever 102 by a pivot pin (not shown). The pivot pin defines the pivot axis S of the shift lever assembly 112. The shift lever 132 also has a distal or paddle end 138 that is opposite the proximal end 134 and a lever arm 140 (e.g., an elongate lever arm) connecting the proximal end 134 and the distal end 138. The lever arm 140 may be a closed hollow body or may be U-shaped or open sided and may include structural ribbing therein. The shift lever 132 may be made of any number of materials including, for example, a plastic.

An assembly of the brake lever 102 and the shift lever assembly 112 is pivotably mounted to the housing 104 via a two piece axle 126. The two piece axle 126 includes, on one side, a bolt 126a and, on the other side, a nut 126b that is fastened to the bolt 126a. In one embodiment, at least a portion of an outer annular surface of a shaft of the bolt 126a includes raised knurl features that help retain the bolt 126a within the hood of the control device 100. Two bushings 143 provide a low friction, compliant interface between the brake lever 102 and the axle 126.

The proximal end 134 of the shift lever 132 and/or the bracket 131 may also carry connecting components for connecting the brake lever 102 to the hydraulic brake system. These components may include a sleeve 144 carried by the bracket 131 (e.g., via an opening through the bracket 131). When the shift lever assembly 112 is assembled to the brake lever 102, the sleeve 144 is received in a set of openings 145 at the proximal end of the brake lever 102, which are spaced from the pivot bore 124. The combination of the sleeve 144 and the openings 145 marries the brake lever 102 and the shift lever assembly 112 together relative to the brake lever pivot axis P. The shift lever assembly 112 is thus configured to move in concert with the brake lever 102 about the pivot axis P when the brake system is operated, but moves independent of the brake lever 102 when the shift control system is operated. As described in more detail below, the paddle end 138 of the shift lever 132 includes an interior cavity 146 that houses electronic components of the shift lever assembly 112 and the shift control system.

Figure 9:
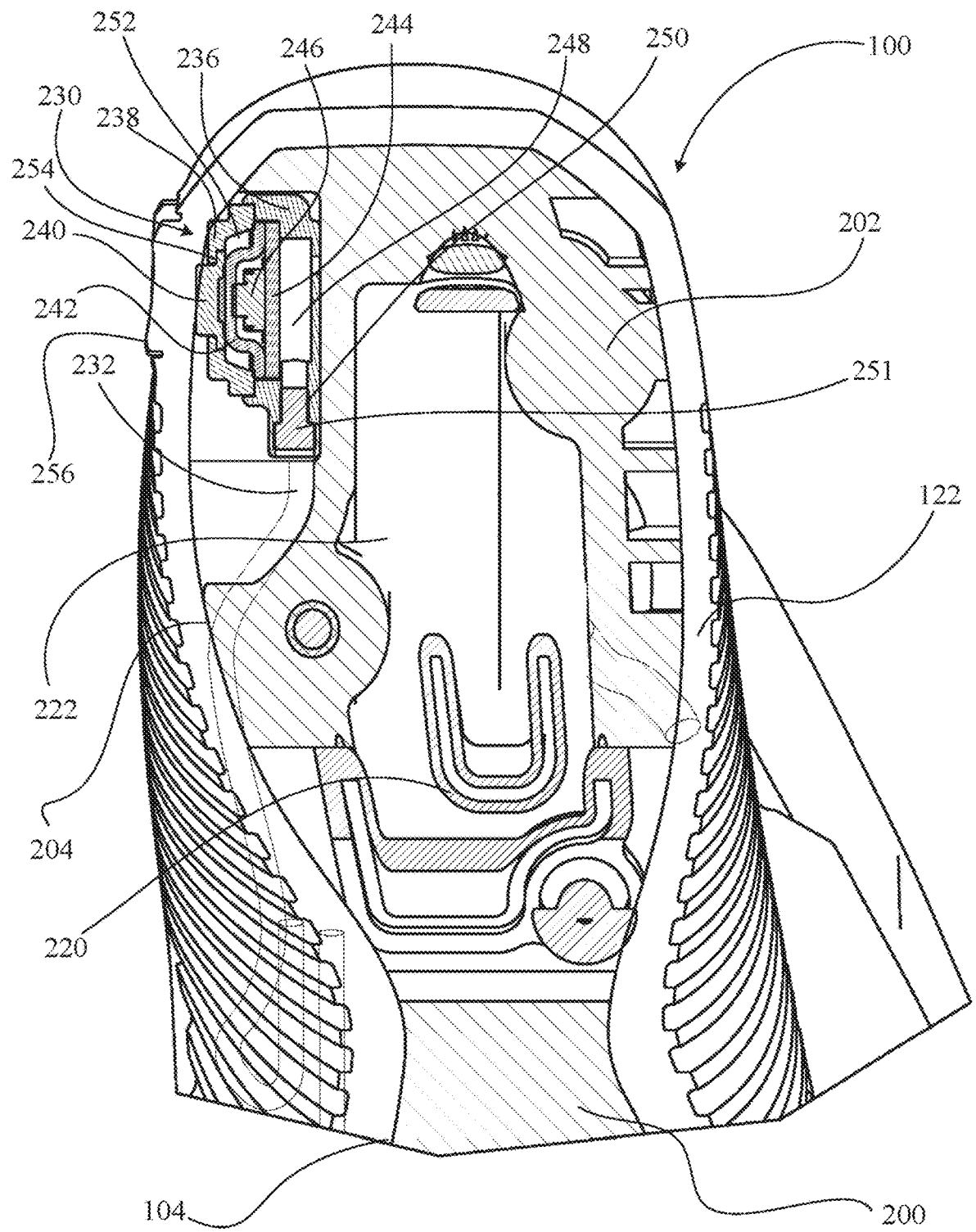
FIG. 9 is a cross-section of a top perspective view of the control device of FIG. 2.

Referring to FIGS. 8-10, the bicycle control device 100 has at least four primary parts including the housing 104, the outer cover 122, the brake lever 102, and the shift lever assembly 112. The shift lever assembly 112 and the housing 104 each further include additional sub-components according to the teachings of the present disclosure. The sub-components of the shift lever assembly 112 are illustrated generally in FIG. 10, and the sub-components of the housing 104 are illustrated generally in FIGS. 8-10.

In the disclosed example, referring to FIG. 10, the shift lever assembly 112 is a self-contained electrical assembly. In this example, the shift lever assembly 112 includes electronic components for operating the bicycle control device 100. Some of the electronic components in this example are housed within the interior cavity 146 in the paddle end 138 of the shift lever 132, and some of the electronic components are external to but electrically connected with the electronic components within the interior cavity 146 in the paddle end 138.

The paddle end 138 of the shift lever 132 in this example has a larger surface area than the adjoining lever arm 140. The paddle end 138 thus provides a convenient and ergonomic contact point for a user. The interior cavity 146 in the paddle end 138 includes a cover 148 that may be secured by fasteners 150 (e.g., three fasteners) to the paddle end 138 to close off the interior cavity 146 and exclude water and other contaminants from entry into the interior cavity 146. A seal 152 may be interposed between the interior cavity 146 and the cover 148. The seal 152 may be a rubber seal membrane or layer of any suitable material that seals the interior cavity 146 in the paddle end 138 to prevent ingress of moisture or contaminants.

In one example, a printed circuit board (PCB) 154 is disposed within the interior cavity 146 in the paddle end 138. The interior cavity 146 houses the PCB 154 with two openings. For example, an electrical cable is attached to the PCB 154 with a connector (e.g., a 2C board connector) and passes through a first opening of the two openings (not shown). The fist opening of the interior cavity 146 may be sealed with, for example, a grommet. The PCB 154 is positioned within the interior cavity 146 via a second opening of the two openings of the interior cavity 146.

Various electronic componentry may be mounted on or connected to the PCB 154. The PCB 154 may include a communication module 156 configured to transmit signals from the control device 100. In one example, the communication module 156 may be configured for wireless transmission of signals in the form of electromagnetic radiation (EMR), such as radio waves or radio frequency signals. Optionally, the communication module 156 may also be configured to receive signals. In one example, the communication module 156 may be configured to receive signals that may be in the form of EMR such as radio waves or radio frequency signals. The communications module 156 may include or may be a transmitter, receiver, or a transceiver. The PCB 154 may also include an antenna 158 that is in operative communication with the communication module 156 to send and optionally also receive EMR signals. The antenna 158 may be any device configured to transmit and/or receive electromagnetic radiation waves (e.g., TV or radio waves).

In the disclosed example, the antenna 158 is on the PCB 154 in a position where the antenna 158 is able to send signals without significant interference from the structure of the bicycle control device 100 and/or from a hand of the rider. In another example, to help reduce or prevent interference, the antenna 158 may be a wireless antenna and may be positioned, at least in part, in or on a portion of the bicycle control device 100 that is separate and remote or spaced from the housing 104. The antenna 158 may be positioned on another part of the brake lever 102 or the shift lever 132, for example.

In one example, the bicycle control device 100 also includes a controller (not shown) that is, for example, also on the PCB 154. The controller is operatively connected to the communication module 156 to perform electronic operations such as generating the signals related to one or more of shifting, pairing, derailleur trim operations, power management, and the like. The controller may be programmable and configurable to generate signals to control the front derailleur 74 and the rear derailleur 76, for example. In one example, the controller may be a microcontroller with an internal memory. In another example, the communication module 156 may be programmable and configurable to transmit and/or receive signals to control the front derailleur 74 and the rear derailleur 76. In one example, the communication module 156 may be a transceiver. Any number of different types of microcontrollers and communications modules 156 may be utilized. Additionally, ancillary electrical and/or electronic devices and components may be used, as is well known in the art, to further enhance or enable the function and operation of the controller and the communications module 156 and related components.

In one example, the electronic components of the shift lever assembly 112 may also include at least one light source (not shown), (e.g., a light emitting diode (LED)). The LED may also be positioned on the PCB 154. The LED may convey status information to the rider, for example, relating to the electronic components and/or function of the shift lever assembly 112 or the bicycle control device 100.

In one example, the electronic components may include one or more electrical switches. For example, a first electrical switch 160, when actuated, may cause operations to be carried out by the controller and/or the communication module 156. Such operations may relate to signal transmission or reception, derailleur 74, 76 and control device 100 pairing, trim and/or shift operations, and the like. The first electrical switch 160 may generate signals to initiate or elicit an action and/or response from various mechanisms of the bicycle 50, such as the front derailleur 74 and/or the rear derailleur 76.

Figure 5:
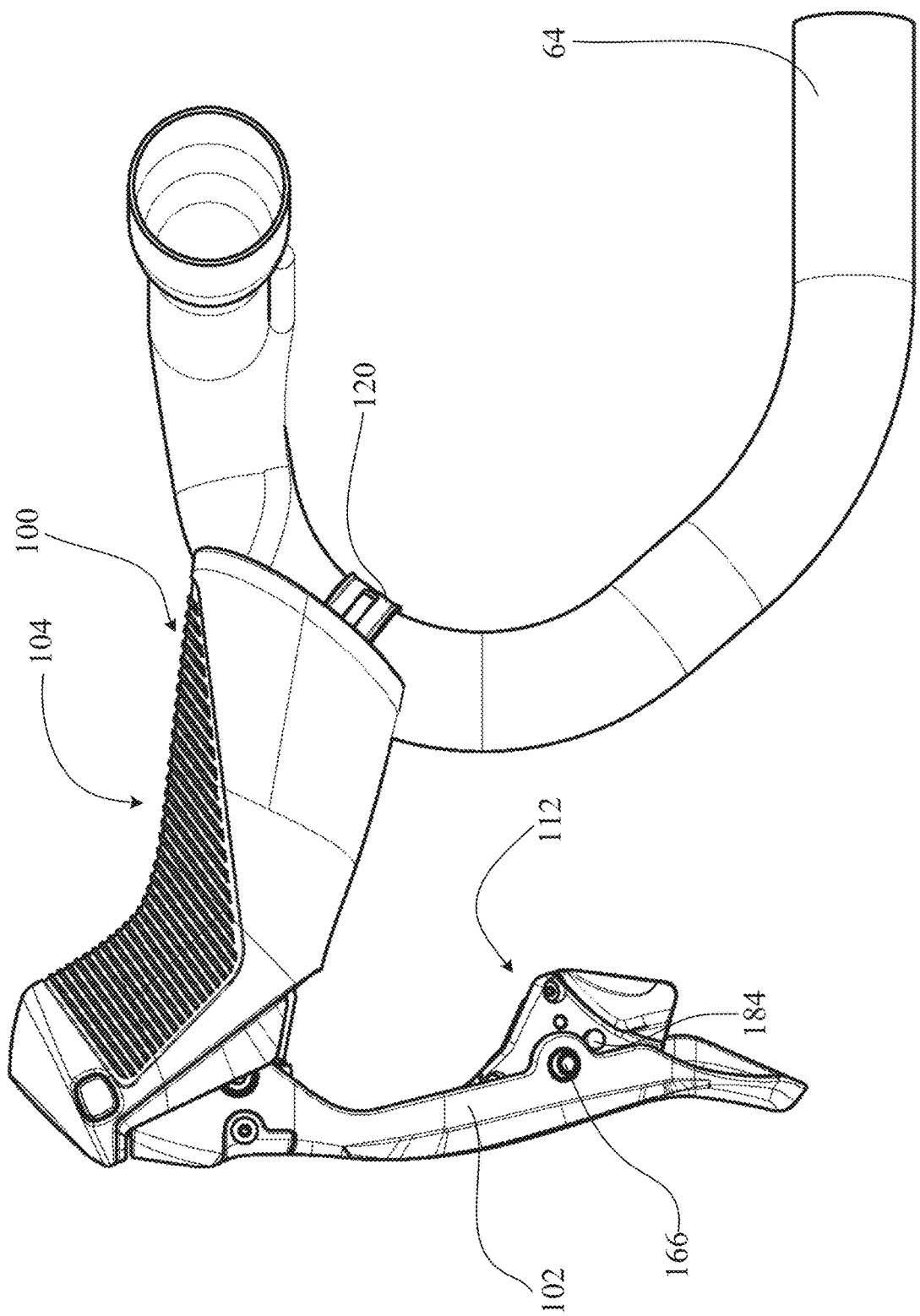
FIG. 5 is a second side view of the control device of FIG. 2 and a portion of a handlebar of the bicycle of FIG. 1.
Figure 6:
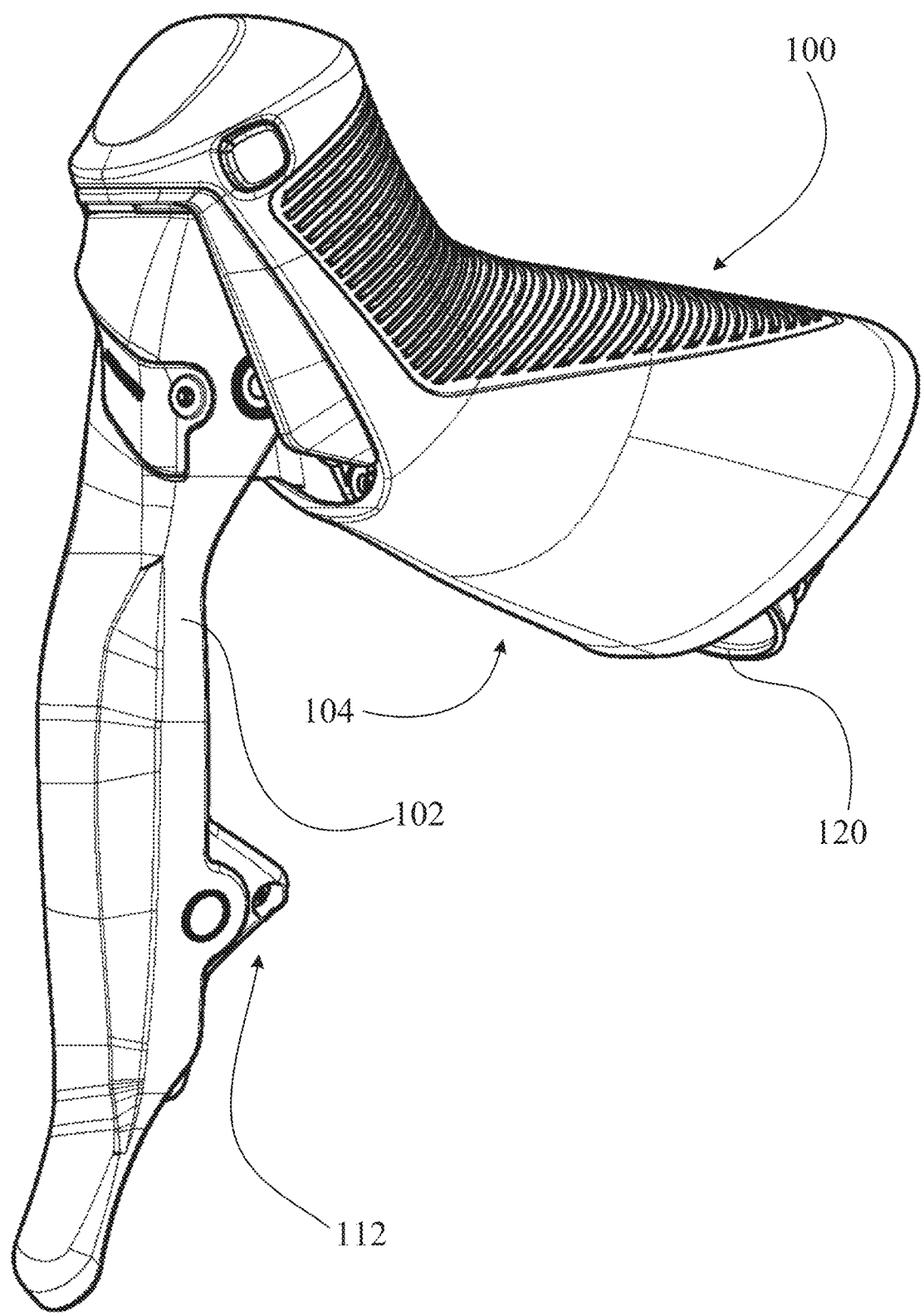
FIG. 6 is the exterior perspective view of the control device of FIG. 4, removed from the handlebar.
Figure 7:
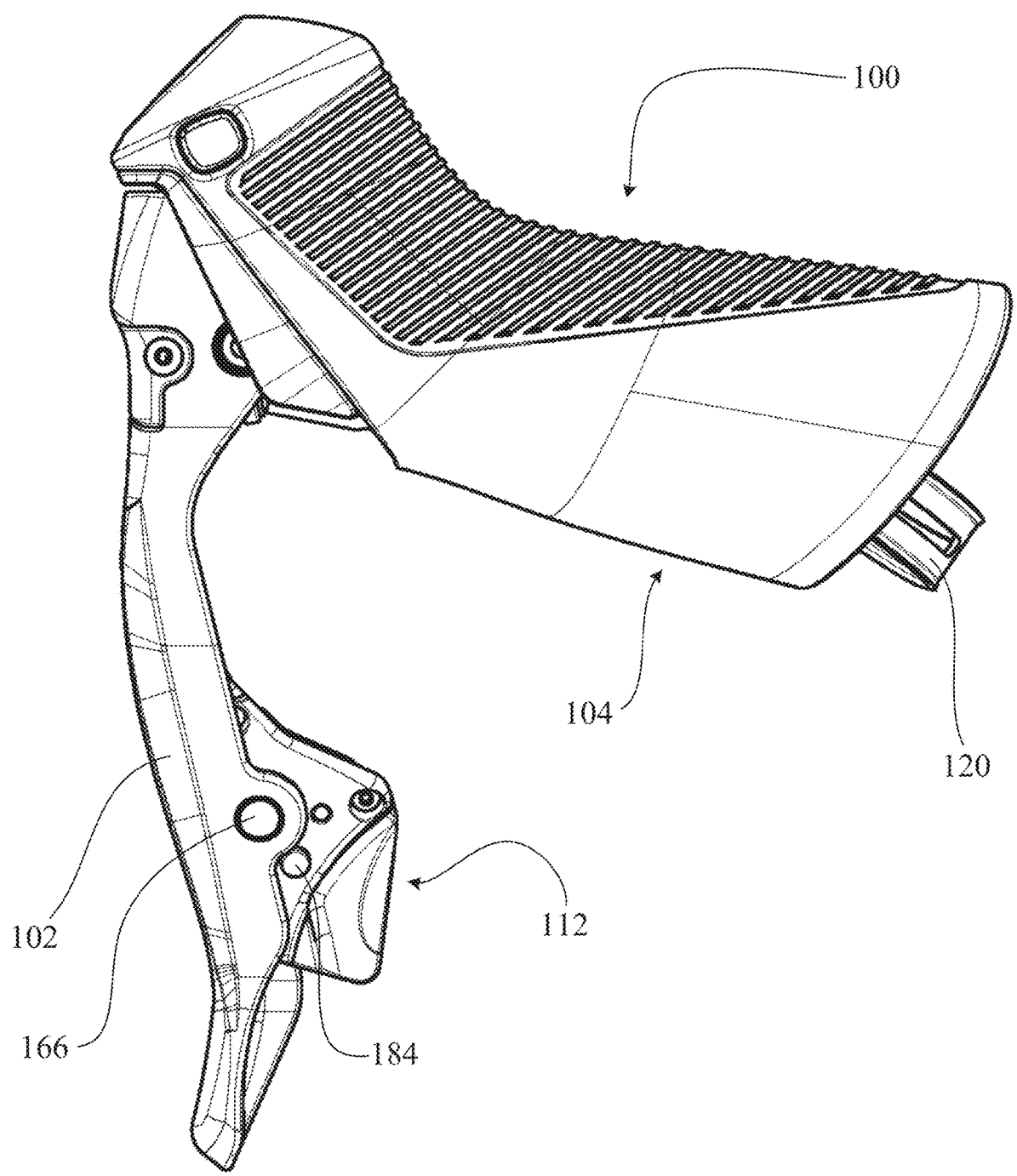
FIG. 7 is the second side view of the control device of FIG. 5, removed from the handlebar.

In this example, the first electrical switch 160 includes a contact (not shown) on the PCB 154 underlying a resilient dome switch element 162, also on the PCB 154. In this example, the first electrical switch 160 is actuated through the seal 152 from outside the interior cavity 146 in the paddle end 138 of the shift lever 132. The cover 148 has a first switch opening 164, where both the cover 148 and the first switch opening 164 are on an inward facing side of the shift lever 132 (e.g., a non-actuation side of the paddle end 138). An actuator 166 is seated in the first switch opening 164, as depicted in FIGS. 5 and 7. Referring to FIG. 10, the actuator 166 includes a button 168 that is received in a hole 170 in an inside wall 172 of the brake lever 102. A spring retainer 174 is retained in the first switch opening 164 in the cover 148. A spring 176 extends between the button 168 and the spring retainer 174 and biases the shift lever 132 towards an outside wall 178 of the brake lever 102. The rider, for example, operates the shift lever 132 by pushing inward on an actuation surface (e.g., an outside surface of the paddle end 138) against the bias force of the spring 176. As the rider pushes on the paddle end 138, the button 168 eventually contacts the spring retainer 174. Through the seal 152, the spring retainer 174 pushes against the resilient dome switch element 162, which further touches the contact on the PCB 154 to close and actuate the first electrical switch 160.

As another example, a second electrical switch 180 includes a contact on the PCB 154. The contact may be a domed switch element or a pressure type switch contact. In this example, the second electrical switch 180 is also actuated through the seal 152 from outside the interior cavity 146 and the shift lever 132. The cover 148 has a second switch opening 182, where both the cover 148 and the second switch opening 182 are again on the inward facing side of the shift lever 132 (e.g., the non-actuation side of the paddle end 138). A button 184 extends through and is seated in the second switch opening 182 in the cover 148, as depicted in FIGS. 5 and 7. The button 184 may be integrally formed as a part of the seal 152 or may be attached to material of the seal 152. The rider, for example, operates the second electrical switch 180 simply by depressing the button 184 toward the cover 148. The button 184 or the underlying material layer of the seal 152 may have a point contact (not shown) on the inside end, which pushes against the seal 152 to depress and close the contact to actuate the second electrical switch 180.

The first button 168 and the second button 184 operate through the material layer of the seal 152, whereby the integrity of the seal 152 for the interior cavity 146 in the paddle end 138 is not compromised. Other types of electrical switches may be used. The first electrical switch 160 may be used for operating the control device 100 on a frequent and more forceful basis, such as for initiation of a gear shift or gear change. The second electrical switch 180 may be an optional switch and, in this example, may be smaller and more self-contained. The second electrical switch 180 may be intended to be used less frequently than the first electrical switch 160. In one example, the second electrical switch 180 may be used for operations related to pairing the bicycle control device with a specific bicycle component, such as the front derailleur 74 and/or the rear derailleur 76, or for trimming the front derailleur 74 and/or the rear derailleur 76. The actuation of the first electrical switch 160 and the second electrical switch 180 sends signals through associated circuitry to be acted upon by the controller.

The electronic componentry on the PCB 154 and within the interior cavity 146 in the paddle end 138 is retained and sealed in place in the interior cavity 146. The seal 152 overlies the PCB 154 and is sandwiched between the paddle end 138 and the cover 148 of the shift lever 132 when the cover 148 is fastened to the shift lever 132 with, for example, the three fasteners 150. The seal 152 may be, for example, a gasket. Referring to FIG. 10, the paddle end 138 may include a groove 186 around an opening into the interior cavity 146. A rib on the seal 152 sits in the groove 186 to create a tight environmental seal when the cover 148 is secured to the paddle end 138. In one example, the second opening of the interior cavity 146 is sealed with the seal 152, which is compressed and retained by the cover 148; the cover 148 is fastened to the shift lever 132 with the three fasteners 150 in the form of thread-forming screws that install directly into the shift lever 132.

The electrical cable (e.g., a single, two wire (2C) electric cable; hereinafter, referred to as wires) is electrically connected to the electronic componentry of the PCB 154 and is routed from the interior cavity 146 through an opening (e.g., the first opening of the interior cavity 146) into the lever arm 140. The wires extend along the interior of the lever arm 140 and are routed around the sleeve 144 and a transverse opening 142 on the proximal end 134 of the shift lever 132. In the disclosed example, the wires are connected to a power supply (e.g., a self-contained battery unit 190). The self-contained battery unit 190 is described in greater detail below.

The shift lever assembly 112 may include additional, fewer, and/or different components. For example, as shown in the example of FIG. 10, the shift lever assembly 112 may include a backer 192 that may be inserted between and sandwiched by the cover 148 and the paddle end 138 of the shift lever 132. Each of the cover 148 and the paddle end 138 of the shift lever 132 may be formed to define a receiving portion, such as a pocket 194, that captures an edge of the backer 192. The backer 192 may create a contact point between a top of the shift lever 132 and a contact surface on an inside surface of the brake lever inside wall 172. The contact surface may include a bump or protrusion positioned to contact the backer 192. The backer 192 may be captured between the bump on the inside surface of the brake lever inside wall 172 and the pocket 194 on the shift lever 132. The backer 192 may be formed from a durable material with low friction characteristics. In one example, the backer 192 may be made from a material different than the shift lever 132, such as Teflon, and may be attached to the shift lever 132. The backer 192 may thus allow the shift lever 132 to slide laterally and easily relative to the brake lever 102 to inhibit binding and wear.

FIG. 10 shows a chamber 196 in the housing 104 where the brake lever 102 is connected to hydraulic brake system components. The chamber 196 may house and provide access to components of the control device 100 for maintenance or adjustment. When the outer cover 122 is attached to the housing 104, the chamber 196 may be covered, hidden, and protected from the environment.

Referring to FIG. 8, the housing 104 has a base portion 200, an extension portion 202 (e.g., a pommel) extending away from the base portion 200, an inward facing side 204, and an outward facing side 206 that is opposite the inward facing side 204. The base portion 200 of the housing 104 has a front end 208, a rear end 210 opposite the front end 208, an upward facing side 212, and a downward facing side 214. The base portion 200 of the housing 104 may include more, fewer, and/or different sides.

Part of the extension portion 202 (e.g., an upward facing part) of the housing 104 is accessible via a removable cover 216. The removable cover 216 may be secured to the housing 104 by any number of securing devices including, for example, screws or other fasteners, snap connections, adhesive, or another type of securing device. In the example shown in FIG. 8, the removable cover 216 is secured to the housing 104 by three screws 218. In other examples, more or fewer screws 218 and/or other securing devices may be used to secure the removable cover 216 to the housing 104.

Referring to FIGS. 9 and 10, the part of the extension portion 202 of the housing 104 that is accessible via the removable cover 216 houses a number of components of the control device 100. For example, a compliant or flexible membrane 220 may be provided over an open side of a chamber 222 (see FIG. 9) of this upward facing part of the extension portion 202 of the housing 104 to close off the chamber 222 and thus provide a defined fluid chamber (e.g., a hydraulic reservoir) having a variable volume. The flexible membrane 220 may be positioned between the removable cover 216 and the open side of the chamber 222. The fluid chamber at least partially defined by the flexible membrane 220 is at least partially filled with a fluid (e.g., an incompressible fluid) such as, for example, hydraulic brake fluid. In one embodiment, the flexible membrane 220 is a bladder.

Referring to FIGS. 8 and 9, the extension portion 202 of the housing 104 (e.g., the part accessible via the removable cover 216) also houses an auxiliary button unit 230. The auxiliary button unit 230 is mounted to the inward facing side 204 (e.g., an inboard side) of the extension portion 202 of the housing 104 (e.g., above the chamber 222, in front of a hydraulic reservoir cover sealing face, overlapping with a hydraulic bleed plug assembly, and overlapping with the hydraulic reservoir when viewed from the inward facing side 204 of the housing 104). The auxiliary button unit 230 is attached to the housing 104 in any number of ways including, for example, screws, adhesive tape, glue, epoxy, snap-fit features, press-fit features, and/or other fasteners or securing devices. The auxiliary button unit 230 is connected to the PCB 154 within the interior cavity 146 in the paddle end 138 of the shift lever 132 via, for example, an electrical cable 232 (e.g., a two conductor electrical cable). The electrical cable 232 may be routed and retained on and/or within the housing 104 through a channel 234 at the inward facing side 204 of the housing 104 (e.g., the base portion 200 and/or the extension portion 202 of the housing 104).

The auxiliary button unit 230 includes a number of components. Referring to FIGS. 8 and 9, the auxiliary button unit 230 includes, for example, an inner housing 236, an outer housing 238, a button actuator 240, a flexible sealing element 242 (e.g., a gasket) for the button actuator 240, a PCB 244 that supports and is electrically connected to an electrical switch 246, and the electrical cable 232 (see FIG. 9). The inner housing 236 has a first opening 248 through which the PCB 244 with the electrical switch 246 is assembled. The inner housing 236 also has a second opening 250 through which the electrical cable 232 passes. The second opening 250 is sealed (e.g., around the electrical cable 232) to prevent ingress of water and contaminants, for example. The second opening 250 may be sealed in any number of ways including with, for example, glue, epoxy, a flexible grommet, or another seal. For example, as shown in the example of FIG. 9, the second opening 250 may be sealed with a grommet 251.

The electrical cable 232 is joined to the PCB 244 in order to transmit signals from the electrical switch 246 of the auxiliary button unit 230 to the PCB 154 disposed within the interior cavity 146 in the paddle end 138 of the shift lever 132. The outer housing 238 is joined to the inner housing 236 and has a recess 252 in which the button actuator 240 is assembled. The joint between the inner housing 236 and the outer housing 238 is sealed to prevent ingress of water and contaminants, for example. The joint between the inner housing 236 and the outer housing 238 may be sealed in any number of ways including, for example, with plastic welding, a flexible sealing element (e.g., a gasket), or another seal.

The outer housing 238 has an opening 254 through which the button actuator 240 extends and translates when pressed by the rider to actuate the electrical switch 246. The opening 254 may be sealed to prevent ingress of water and contaminants, for example. The opening 254 may be sealed in any number of ways including, for example, with a gasket, an overmolded elastomer, an O-ring, or another seal.

In the examples shown in FIGS. 8 and 9, the button actuator 240 rests on the gasket 242, which is positioned between the button actuator 240 and the electrical switch 246. In one embodiment, the button actuator 240 rests directly on the electrical switch 246.

The auxiliary button unit 230 is covered with the outer cover 122. The electrical switch 246 may be activated by the rider, for example, by pressing on the button actuator 240 through the outer cover 122. Referring to FIG. 9, the outer cover 122 may have an external feature 256 (e.g., a convex or concave dome or rectangle) indicating a location of the auxiliary button unit 230.

Activation of the electrical switch 246 may control one or more same components and/or different components of the bicycle 50 than the first electrical switch 160 and/or the second electrical switch 180 controls. For example, activation of the auxiliary button unit 230 may initiate the generation of signals (e.g., by the controller of the PCB 154) related to shifting, pairing, derailleur trim operations, power management, one or more other actions on the bicycle 50, or any combination thereof. In one embodiment, the activation of the auxiliary button unit 230 controls the front derailleur 74 and/or the rear derailleur 76, for example. For example, the controller of the PCB 154 may be configured to generate signals to control the front derailleur 74 and/or the rear derailleur 76 in response to a signal received from the electrical switch 246 when the electrical switch 246 is activated by the rider. The auxiliary button unit 230, due to being located at the extension portion 202 of the housing 104, may provide an ergonomic option for controlling one or more components of the bicycle 50.

Referring to FIGS. 13 and 14, the housing 104 may generally include a housing bore 300 with a master cylinder sleeve 302 (e.g., a fluid cylinder or hydraulic cylinder) inserted into the housing bore 300 and configured to act as a master cylinder for the brake system. The master cylinder sleeve 302 may be any number of sizes and/or shapes. For example, as shown in FIGS. 10, 13, and 14, the master cylinder sleeve 302 may be cylindrically shaped and may be hollow. The master cylinder sleeve 302 may be made of any number of materials including, for example, aluminum, an aluminum alloy, stainless steel, a plastic, a composite material, another material, or any combination thereof. In one example, the housing 104 is made of a first material (e.g., glass filled Nylon), and the master cylinder sleeve 302 is made of a second material (e.g., aluminum) that is different than the first material. In another example, the first material and the second material are a same material. The housing bore 300, and thus the master cylinder sleeve 302 when installed within the housing bore 300, may be horizontal relative to a flat surface on which the bicycle 50 is supported, though other orientations may be provided.

To create a lighter weight configuration and reduce part count of the master cylinder sleeve 302 and a piston 304 (e.g., a piston assembly including one or more parts), the master cylinder sleeve 302 may be independent of the housing 104. This allows each component (e.g., the housing 104 and the master cylinder sleeve 302) to be designed and manufactured using the most reliable and/or lowest weight materials for each component.

At least part of the piston 304 resides in and moves relative to the master cylinder sleeve 302. Referring to FIGS. 13 and 14, the piston 304 has a first end 306 and a second end 308 opposite the first end 306. The piston 304 is coupled to the brake lever 102 via a push rod 310 adjacent to the second end 308 of the piston 304 (e.g., at a position closer to the second end 308 of the piston 304 than the first end 306 of the piston 304) and is operable by movement of the brake lever 102 as is known in the art. For example, rotation of the brake lever 102 causes translation (e.g., and rotation) of the push rod 310, which causes translation of the piston 304 relative to the master cylinder sleeve 302. In the examples shown in FIGS. 10, 13, and 14, the push rod 310 may be coupled to the piston 304 via an adjustment mechanism, as will be described in more detail below.

Referring to FIGS. 13 and 14, the push rod 310 has a first end 312 and a second end 314 opposite the first end 312. The first end 312 of the push rod 310 includes a body 316 that is disposable within part of an adjustment mechanism 318. For example, the adjustment mechanism 318 includes a push rod support 320 (e.g., a push rod socket) having a receptacle 322 at a first end 324 of the push rod support 320. The push rod 310 is connected to the push rod support 320 via the body 316 of the push rod 310 disposed within the receptacle 322 at the first end 324 of the push rod support 320.

The push rod support 320 is hollow at and adjacent to the first end 324 of the push rod support 320 to form the receptacle 322. The receptacle 322 is formed by one or more inner surfaces 326 (e.g., inner annular surfaces, at least one of which is angled relative to a central axis along a length of the push rod support 320) sized and shaped to facilitate positioning of the body 316 of the push rod 310 within the receptacle 322 of the push rod support 320 and rotation of the body 316 of the push rod 310 relative to the push rod support 320. For example, the one or more inner surfaces 326 of the push rod support 320 project outward at or adjacent to the first end 324 of the push rod support 320, and the body 316 of the push rod 310 may abut the one or more inner surfaces 326 of the push rod support 320. A base of the receptacle 322 may be rounded to facilitate rotation of the body 316 of the push rod 310 within the receptacle 322.

The adjustment mechanism 318 also includes a cam 330 supported by the push rod support 320 at or adjacent to the second end 328 of the push rod support 320. The second end 328 of the push rod support 320 is opposite the first end 324 of the push rod support 320.

Referring to FIGS. 10 and 14, a first spring 332 (e.g., a return spring) is disposed within the master cylinder sleeve 302. The return spring 332 extends from a position at or adjacent the first end 306 of the piston 304, towards the rear end 210 of the base portion 200 of the housing 104. The return spring 332 may be, for example, a compression spring and may act on the piston 304, at or adjacent to the first end 306 of the piston 304, such that the second end 308 of the piston 304 is pressed into contact with the cam 330 of the adjustment mechanism 318. In one embodiment, the return spring 332 is disposed around part of the piston 304 (e.g., at and/or adjacent to the first end 306 of the piston 304).

The control device 100 may include one or more components and/or features to prevent the return spring 332 from pushing the piston 304 and the adjustment mechanism 318 out of the master cylinder sleeve 302. For example, the brake lever 102 may include an extension 334 that extends towards the extension portion 202 of the housing 104. When viewed from the inward facing side 204 of the housing 104, contact between the extension 334 and the extension portion 202 of the housing 104 may act as a stop for clockwise rotation of the brake lever 102 relative to the housing 104 via the axle 126. Due to the connection of the brake lever 102 to the adjustment mechanism 318 via the push rod 310, when the brake lever 102 is not able to rotate further in the clockwise direction relative to the housing 104 (e.g., when viewed from the inward facing side 204 of the housing 104), the adjustment mechanism 318 is not able to translate further relative to the master cylinder sleeve 302 (e.g., out of the master cylinder sleeve 302). The cam 330 thus acts as a stop for the piston 304. In the example shown in FIG. 10, the control device 100 also includes a brake lever bias spring 336 disposed around the axle 126. The brake lever bias spring 336 may be configured to bias the brake lever 102 towards a position in which the body 316 of the push rod 310 is within the receptacle 322 of the push rod support 320 (e.g., in contact with at least one surface of the one or more inner surfaces 326 of the push rod support 320). In one embodiment, the receptacle 322 is a snap-in socket, and the body 316 of the push rod 310 is captive within the snap-in socket. The control device 100 may include more, fewer, and/or different components and/or features to keep the piston 304 captive within the master cylinder sleeve 302.

The axle 126 may be provided in any number of positions relative to components supported by the housing 104. For example, the axle 126 may be located between at least part of the chamber 222 and the push rod 310. In other embodiments, other positioning of the axle 126 relative to the chamber 222, the push rod 310, and/or other components supported by the housing 104 may be provided.

When a force is applied to the brake lever 102, the applied force is partially transmitted to the piston 304 via the push rod 310 (e.g., the body 316 of the push rod 310) and the adjustment mechanism 318 (e.g., the push rod support 320 and the cam 330). This transmitted force may cause the piston 304 to move (e.g., translate) relative to the master cylinder sleeve 302, towards the rear end 210 of the base portion 200 of the housing 104, and the return spring 332 is compressed. When the brake lever 102 is released and the force is no longer applied, the return spring 332 maintains contact between the second end 308 of the piston 304 and the cam 330, and returns the piston 304 and the brake lever 102 to respective rest positions (e.g., relative to the master cylinder sleeve 302).

Figure 15:
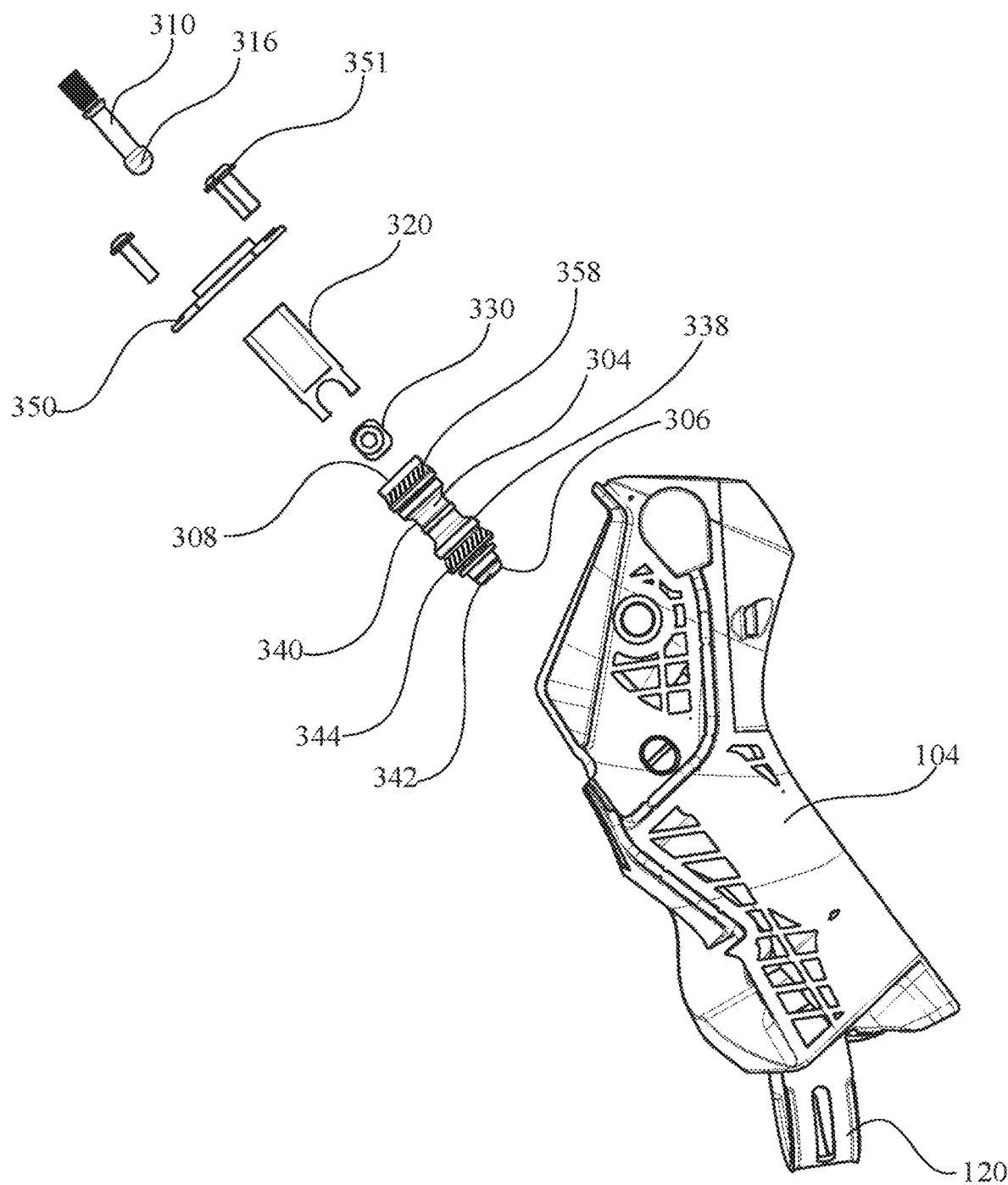
FIG. 15 is a side view of a housing of the control device of FIG. 2 with an exploded view of a first adjustment mechanism and a piston disassembled from a housing of the control device.
Figure 16:
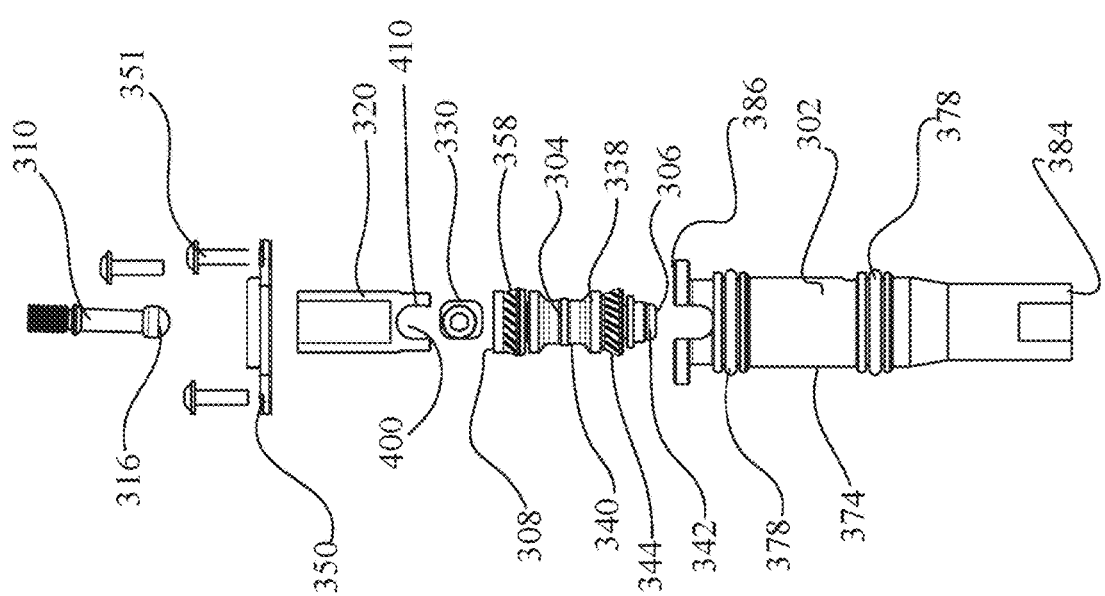
FIG. 16 is a top exploded view of the first adjustment mechanism and the piston of FIG. 15, and a fluid cylinder.

Referring to FIGS. 15-17, the piston 304 includes a flange 338 that extends away from and around an outer surface 340 (e.g., an outer annular surface) of the piston 304. The flange 338 may be disposed adjacent to the first end 306 of the piston 304 (e.g., closer to the first end 306 than the second end 308 of the piston 304). One or more components may be disposed between the flange 338 of the piston 304 and an end cap 342 of the piston 304. For example, a seal 344 (e.g., a cup seal) may be disposed around the piston 304 and between the end cap 342 and the flange 338 of the piston 304. In one embodiment, a ring (e.g., a backup ring) may also be disposed around the piston 304 and between the end cap 342 and the flange 338 of the piston 304. The seal 344 may be made of any number of materials including, for example, polyurethane or rubber. The seal 344 may be any number of shapes and sizes, respectively. For example, the seal 344 may be a hollow cylinder with a u-shaped or v-shaped cross-section. The seal 344 may be backed up by the backup ring, so that the seal 344 can handle high pressures. Such a backup ring may be made of any number of materials including, for example, a metal.

A piston assembly may include any number of components including, for example, the piston 304 (e.g., with the end cap 342), the push rod 310, the return spring 332, the seal 344, one or more other seals (e.g., seal 358), the backup ring, or any combination thereof. The piston assembly may include additional, fewer, and/or different components.

Referring to FIGS. 13 and 14, the housing bore 300 may include a first end 346 and a second end 348 opposite the first end 346. The first end 346 of the housing bore 300 may be at the rear end 210 of the base portion 200 of the housing 104. The housing bore 300 extends through the housing 104. The master cylinder sleeve 302 may be disposed entirely within the housing bore 300. In another embodiment, less than all of the master cylinder sleeve 302 is disposed within the housing bore 300. The adjustment mechanism 318 and the push rod 310 (e.g., when the brake lever 102 is depressed) may extend through the second end 348 of the housing bore 300.

Additional components of the hydraulic brake system may be disposed at and/or adjacent to the second end 348 of the housing bore 300 for sealing and component retention. For example, referring to FIGS. 10 and 15-17, a retention plate 350 (e.g., a cylinder cover) may be attached to the housing 104 at the second end 348 of the housing bore 300. The retention plate 350 may be attached to the housing 104 at the second end 348 of the housing bore 300 in any number of ways including, for example, with one or more connectors 351 (e.g., three screws) attached to the housing 104 (e.g., via corresponding threaded openings within the housing 104).

The cylinder cover 350 may keep the master cylinder sleeve 302 retained within (e.g., captured within) the housing bore 300. For example, referring to FIG. 10, the cylinder cover 350 may include an opening 352 through which the push rod support 320 is translatable. The opening 352 through the cylinder cover 350, however, may be smaller than an outer diameter of the master cylinder sleeve 302, such that the master cylinder sleeve 302 may not move through the opening 352 through the cylinder cover 350.

The push rod support 320 may also be sized and shaped, such that only a portion of the push rod support 320 is translatable through the opening 352 through the cylinder cover 350. The push rod support 320 may include a ridge or extension 354 adjacent to the second end 328 of the push rod support 320. The ridge or extension 354 extends away from an outer surface 356 of a body 357 of the push rod support 320. The opening 352 through the cylinder cover 350 may be sized and shaped, such that only the body 357 of the push rod support 320 is translatable through the opening 352 through the cylinder cover 350, as a diameter of the push rod support 320 at the ridge or extension 354 is too large to pass through the opening 352. In other words, the ridge or extension 354 may keep at least part of the cam 330 captive within the housing bore 300.

Referring to FIGS. 10 and 13-17, a seal 358 (e.g., a cup seal) may be disposed around the piston 304, adjacent to the second end 308 (e.g., at a position closer to the second end 308 of the piston 304 than the first end 306 of the piston 304) of the piston 304. Referring to FIG. 17, the piston 304 may include a groove 360 adjacent to the second end 308 of the piston 304, and the seal 358 may be disposed within the groove 360. The seal 358 may be made of any number of materials including, for example, polyurethane or rubber. The seal 358 may be any number of shapes and sizes, respectively. For example, the seal 358 may be a hollow cylinder with a u-shaped or v-shaped cross-section. The seal 358 protects components of the hydraulic brake system within the piston 304 from the environment.

Referring to FIGS. 10, 13, and 14, the extension portion 202 of the housing 104 includes an opening 362 (e.g., a bleed port) that extends from a front end 364 of the extension portion 202 of the housing 104, into the chamber 222. A bleed plug assembly 368 including at least a bleed plug 370 (e.g., a bleed screw) is removably connectable via, for example, corresponding threads to the bleed port 362 or a threaded bushing 372 attached to the bleed port 362, such that hydraulic fluid of the brake system may be filled, topped off, or bled via the chamber 222. The bleed plug 370 may be any number of shapes and sizes, and may be made of any number of materials. In one example, the bleed plug 370 is made of the same material as the master cylinder sleeve 302. For example, the bleed plug 370 is made of aluminum, which may be different than the material of which the housing 104 is made. Alternatively, the bleed plug 370 may be made of the same material as the housing 104. When the bleed plug 370 is removed, the chamber 222 (e.g., acting as a brake fluid chamber for the brake system) is accessible.

As discussed above, the chamber 222 is at least partially disposed within the extension portion 202 of the housing 202. Hydraulic brake calculations are based on lever fluid volumes, hose fluid volume, and caliper fluid volume. As pads wear, fluid is displaced into the caliper. Referring to FIG. 10, to provide more reservoir fluid volume, the chamber 222 includes a pocket 373 into a lever blade opening for additional fluid for compensation. The pocket 373 fits between ears of the brake lever 102 and wraps around the axle 126.

Referring to FIGS. 16 and 17, the master cylinder sleeve 302 has one or more outer annular surfaces 374 and one or more inner annular surfaces 376 (see FIG. 17). In the example shown in FIG. 17, the master cylinder sleeve 302 has at least eleven outer annular surfaces 374 with a number of different diameters, respectively, for positioning of, for example, seals 378 (e.g., O-rings) around the master cylinder sleeve 302. The master cylinder sleeve 302 may have more or fewer outer annular surfaces 374. In the example shown in FIG. 17, the master cylinder sleeve 302 has four inner annular surfaces 376. The master cylinder sleeve 302 may have more or fewer inner annular surfaces 376.

Referring to FIG. 17, the master cylinder sleeve 302 includes one or more first openings 380 (e.g., a plurality of first openings; five first openings disposed around a circumference of the master cylinder sleeve 302) and one or more second openings 382 (e.g., a plurality of second openings; five second openings disposed around a circumference of the master cylinder sleeve 302). The plurality of first openings 380 and the plurality of second openings 382, for example, extend from at least one of the one or more outer annular surfaces 374, through the master cylinder sleeve 302 (e.g., through a cylindrical wall of the master cylinder sleeve 302), to at least one of the one or more inner annular surfaces 376, respectively. In other words, the plurality of first openings 380 and the plurality of second openings 382 extend radially through the master cylinder sleeve 302.

The plurality of first openings 380 are spaced apart from each other circumferentially, and the plurality of second openings 382 are spaced apart from each other circumferentially. The plurality of second openings 382 are positioned at a distance along the length of the master cylinder sleeve 302 relative to the plurality of first openings 380. In other words, the plurality of second openings 382 are spaced apart relative to the plurality of first openings 380 in a direction along the length of the master cylinder sleeve 302. In the example shown in FIG. 17, the plurality of first openings 380 are closer to a first end 384 of the master cylinder sleeve 302 than the plurality of second openings 382 are relative to the first end 384 of the master cylinder sleeve 302. In other words, the plurality of second openings 382 are closer to a second end 386 of the master cylinder sleeve 302 than the plurality of first openings 380 are relative to the second end 386 of the master cylinder sleeve 302. The second end 386 of the master cylinder sleeve 302 is opposite the first end 384 of the master cylinder sleeve 302.

In one example, the plurality of first openings 380 are timing ports (hereinafter, referred to as timing ports), and the plurality of second openings 382 are compensation ports (hereinafter, referred to as compensation ports). The plurality of timing ports 380 and the plurality of compensation ports 382 may be any number of shapes and sizes. For example, the plurality of timing ports 380 and the plurality of compensation ports 382 may be circular-shaped openings. In one example, as flow through the plurality of compensation ports 382 is to be less controlled than the flow through the plurality of timing ports 380, the plurality of compensation ports 382 may be larger (e.g., in diameter) compared to the plurality of timing ports 380.

Referring to FIG. 17, as discussed above, the second end 308 of the piston 304 is biased against the cam 330 of the adjustment mechanism 318 when the brake lever 102 is not pulled. A surface of the cam 330 acts as a stop and locates an initial position of the piston 304 relative to the master cylinder sleeve 302. This also locates the seal 344, which is disposed around the piston 304, relative to the master cylinder sleeve 302. More specifically, the seal 344 disposed around the piston 304 is located relative to the plurality of timing ports 380 extending through the master cylinder sleeve 302. In the example shown in FIG. 17, the seal 344 is located adjacent to the plurality of timing ports 380 when the brake lever 102 is not pulled (e.g., an initial position of the piston assembly 702).

Figure 11:
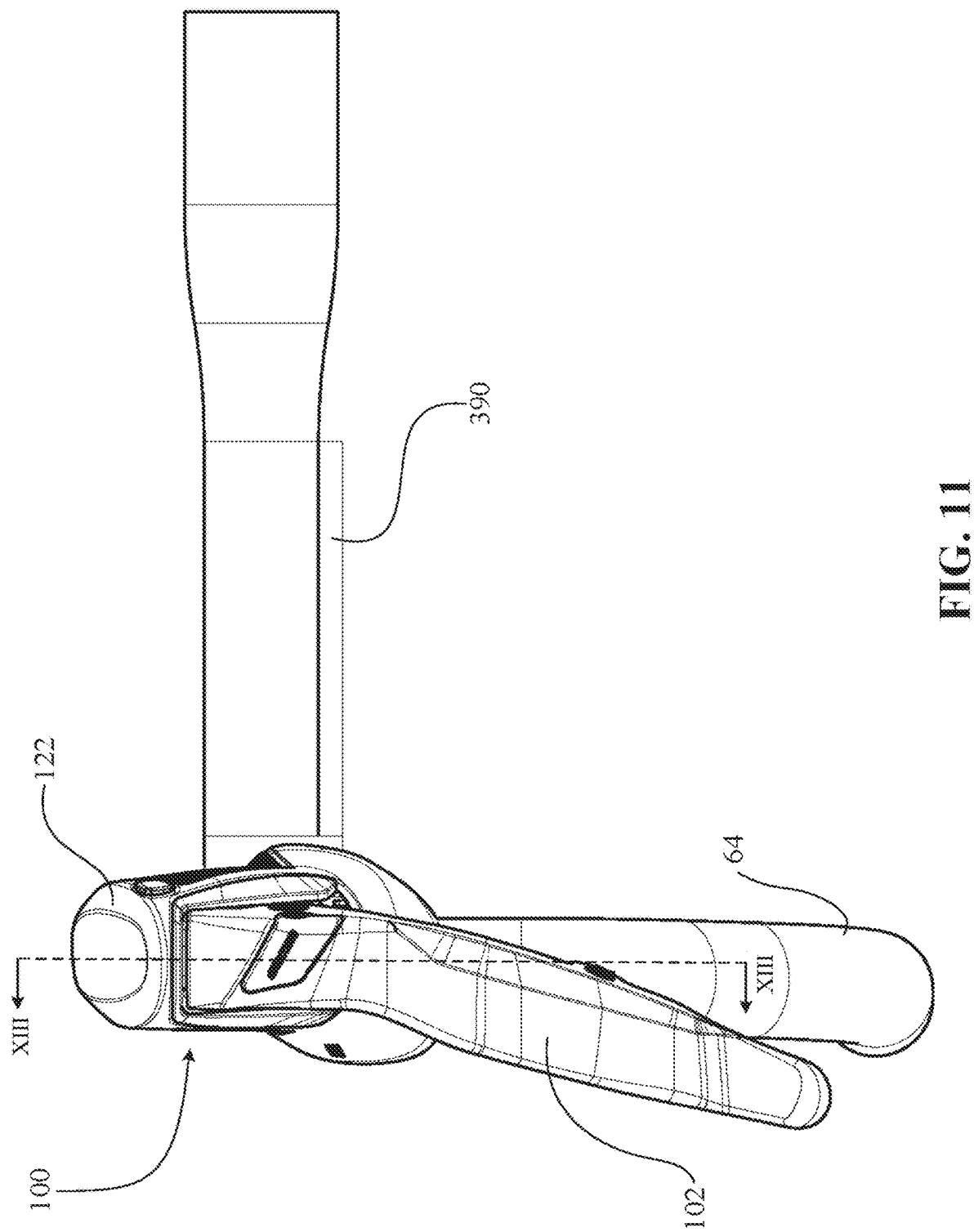
FIG. 11 is a front view of the control device of FIG. 2 and a portion of a handlebar of the bicycle of FIG. 1.
Figure 12:
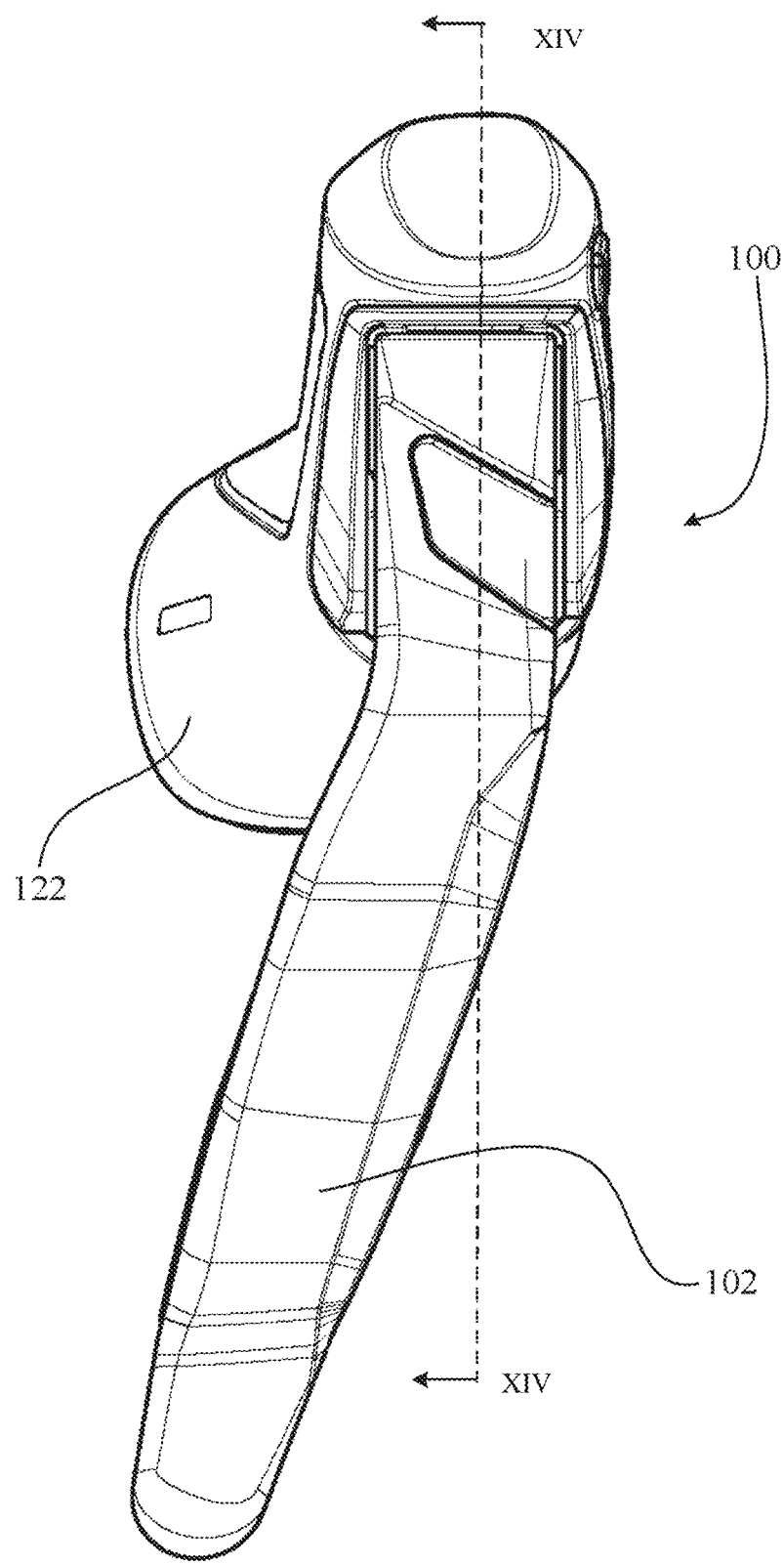
FIG. 12 is a front view of the control device of FIG. 11, removed from the handlebar.

When the piston assembly 702 is in the initial position and the bleed plug 370 is removed, the control device 100 has a fluid path between the bleed port 362, which is exposed to the environment when the bleed plug 370 is removed, and a fluid port 388 (e.g., at and/or adjacent to the first end 384 of the master cylinder sleeve 302) supported by the housing 104. The fluid port 388 is fluidly connected to a hydraulic line 390 (see FIG. 11) that leads to, for example, the hydraulic front brake mechanism 106 or the hydraulic rear brake mechanism 108. The fluid port 388 may be, for example, rotatable relative to the housing 104.

In one embodiment, the fluid port 388 is fluidly connected to the hydraulic line 390 via a hose connector 391 (e.g., a Stealthamajig valve assembly by SRAM®). The hose connector 391 may be integrated into the master cylinder (e.g., the master cylinder sleeve 302), which is an independent component of the housing 104. The Stealthamajig valve assembly 391, for example, is an assembly including a valve and a spring (e.g., the return spring 332). A force of the spring closes off the master cylinder sleeve 302 with, for example, an O-ring on the valve when the hydraulic line 390 is disconnected.

The fluid path between the bleed port 362 and the fluid port 388 extends through the chamber 222, a channel 392 through the housing 104 (e.g., the base portion 200 of the housing 104; see FIG. 13), between the chamber 222 and a volume 394 within the housing bore 300, between the housing 104 and the master cylinder sleeve 302, at least one first opening 380 of the plurality of first openings 380, and a volume 396 within the master cylinder sleeve 302, between the piston 304 and the rear end 210 of the base portion 200 of the housing 104.

The chamber 222 is located above the housing bore 300 and the cylinder sleeve 302, and the channel 392 (e.g., a communication port) may be used to fill the volume 394 (e.g., an annular volume) within the housing bore 300, between the housing 104 and the master cylinder sleeve 302, and irrigate the volume 396 within the master cylinder sleeve 302 to provide fluid for pressurizing. The channel 392 may be drilled into the housing 104 (e.g., the base portion 200 of the housing 104) and creates the flow between the chamber 222 and the housing bore 300 where the master cylinder sleeve 302 is installed. The bleed port 362 is located at a top of the extension portion 202 of the housing 104 (e.g., the pommel) and thus, a top of the chamber 222. An opening of the bleed port 362 may be oriented to allow the drill operation for the channel 392. This location maximizes air evacuation.

Air within, for example, the fluid path between the bleed port 362 and the fluid port 388 and/or within the hydraulic line 390 causes inefficiencies within the hydraulic braking system and may result in a spongy or loose brake lever 102. Air may be introduced into the fluid path via leaks, old seals, damaged hydraulic lines, and/or other reasons. Air within the fluid path may be purged in either direction, out the bleed port 362 when the bleed plug 370 is removed or out the fluid port 388 or the hydraulic line 390.

When the rider pulls the brake lever 102 and the brake lever 102 rotates relative to the housing 104 (e.g., in a first rotational direction), the push rod 310 connected to the brake lever 102 (e.g., via the adjustment mechanism 318) and the piston 304 pushes the piston 304, such that the piston 304 translates in a direction towards the rear end 210 of the base portion 200 of the housing 104 (e.g., in a first direction). This translation of the piston 304 also causes the seal 344 disposed around the piston 304 and abutting the flange 338 of the piston 304 to translate in the first direction. In other words, the translation of the piston 304 in the first direction causes the seal 344 to move in a direction towards the plurality of timing ports 380. The seal 344 moving across the plurality of timing ports 380 pushes a portion of the fluid within the chamber 222 out of the volume 396 within the master cylinder sleeve 302, and into the hydraulic line 390 via the fluid port 388. This actuates the hydraulic front brake mechanism 106 or the hydraulic rear brake mechanism 108.

When the seal 344 crosses the plurality of timing ports 380, the seal 344 positively displaces fluid and ultimately builds pressure slowing the front wheel 54 or the rear wheel 58, for example, and the rider. The seal 344 may be located as close to the plurality of timing ports 380 as possible for performance to allow for minimum movement of the brake lever 102 before braking is felt by the rider (e.g., "dead stroke", "dead throw", "deadband").

The adjustment mechanism 318 (e.g., including the cam 330) allows for adjustment of position between the seal 344 and the master cylinder sleeve 302 (e.g., contact adjustment). The piston assembly (e.g., including the piston 304 and the seal 344) slides axially to adjust the amount of dead stroke (e.g., throw of the brake lever 102 before pressure builds). The movement of the piston assembly may be accomplished through rotation of the cam 330 relative to, for example, the piston 304 and the push rod support 320.

Referring to FIG. 17, the master cylinder sleeve 302 has a central axis C extending along a length of the master cylinder sleeve 302. The cam 330 is rotatable relative to the piston 304 (e.g., the piston assembly), for example, via a cam axis of rotation M. The cam axis of rotation M is, for example, perpendicular to the central axis C extending along the length of the master cylinder sleeve 302.

Referring to FIG. 13-19, the cam 330 is supported by the push rod support 320, at and/or adjacent to the second end 328 of the push rod support 320. Referring to FIGS. 10 and 16, the push rod support 320 may include a pocket 400 at and/or adjacent to the second end 328 of the push rod support 320. The cam 330 may be pressed into the pocket 400 of the push rod support 320 by the piston 304 with the biasing of the piston 304 in a direction away from the rear end 210 of the base portion 200 of the housing 104 and towards the cam 330.

Figure 18:
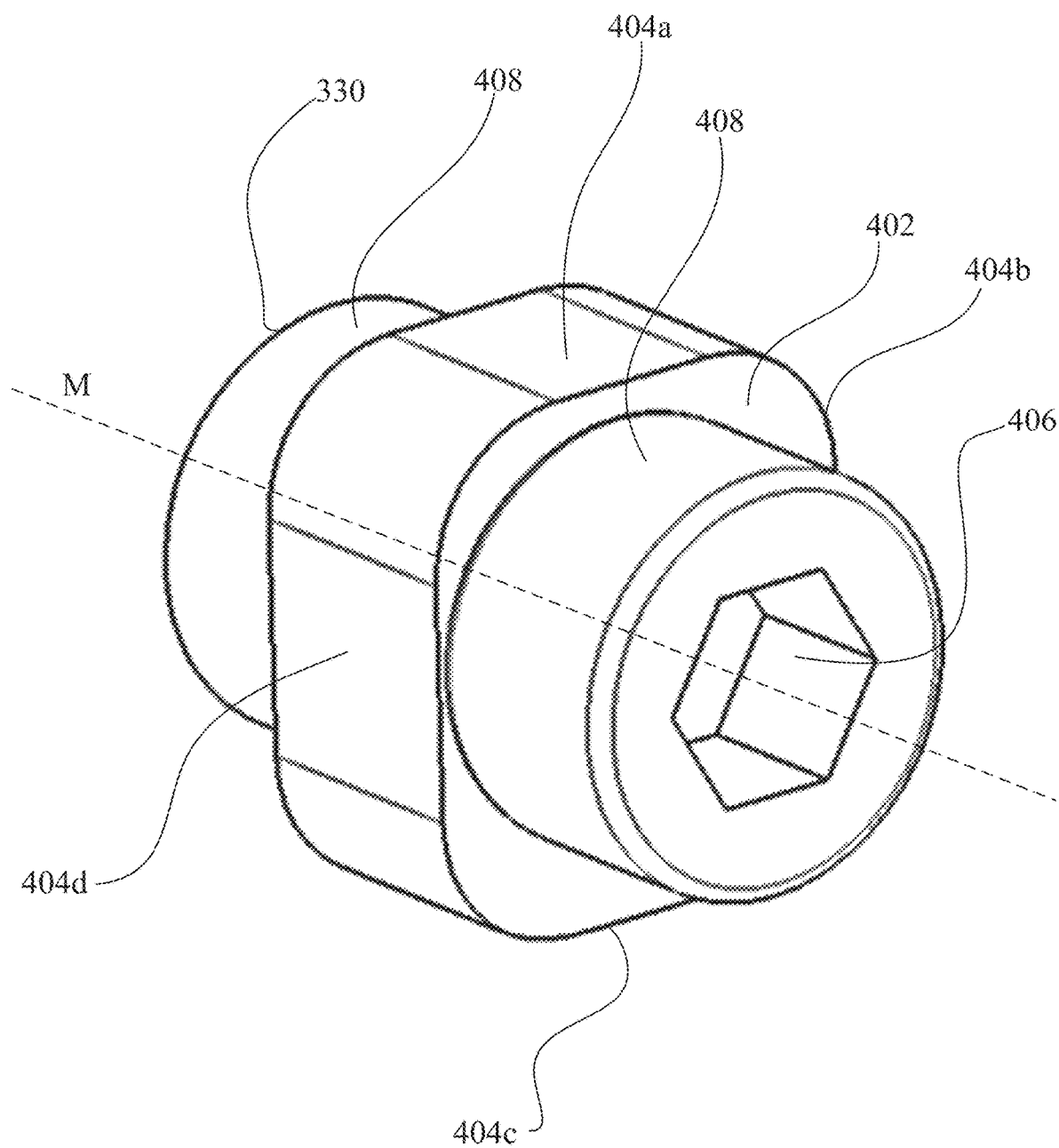
FIG. 18 is a perspective view of a cam of the first adjustment mechanism of FIG. 17.

Referring to FIG. 18, the cam 330 includes a body 402 that may have four different sides 404a-d (e.g., settings) with four different heights relative to a centerline of the cam 330 (e.g., the cam axis of rotation M), respectively. In other words, each side of the four different sides 404a-d has a different height in a direction along or parallel with the central axis C extending along the length of the master cylinder sleeve 302 when the respective side 404 is in contact with the second end 308 of the piston 304. In other embodiments, the cam 330 may include more or fewer sides 404 with different heights relative to the centerline, respectively (e.g., six sides 404 with different heights relative to the centerline, respectively).

The cam 330 also includes a tool interface 406. The tool interface 406 may be formed by, for example, cylindrical extensions 408 extending away from opposite sides of the body 402 of cam 330, respectively. One or both of the cylindrical extensions 408 of the tool interface 406 include one or more sockets (e.g., hexagonal sockets), respectively, via which a tool may be used to rotate the cam 330 relative to the push rod support 320 and the piston 304. The tool interface 406 (e.g., the one or more sockets) may be accessed with a tool (e.g., a hex key) through the outer cover 122 via an opening in the outer cover 122.

The tool interface 406 may be made of a same material (e.g., a metal such as aluminum) as the body 402 of the cam 330 (e.g., as a single part). Alternatively, the tool interface 406 may be made of a different material (e.g., aluminum) than the body 402 of the cam 330 (e.g., a plastic) and/or may be a separate part that is attached to the body 402 of the cam 330. In one embodiment, the two cylindrical extensions 408 are formed by the body 402 of the cam 330 being positioned around and attached to a single cylindrical component, such that body 402 separates the single cylindrical component into the two extensions 408.

The two cylindrical extensions 408 may be positioned within and supported at opposite openings 410 in the pocket 400 (see FIG. 16) of the push rod support 320, respectively, such that the cam 330 is connected to and supported by the push rod support 320. Referring to FIG. 17, the body 402 of the cam 330 and the pocket 400 within the push rod support 320 may be sized and shaped, such that when the cam 330 is rotated relative to the push rod support 320, for example, none of the different sides 404 of the body 402 of the cam 330 come in contact with the push rod support 320 within the pocket 400.

The different heights of the different sides 404 of the body 402 of the cam 330 allow for adjustment of the dead stroke. For example, if the cam 330 is rotated from a first position, in which a first side 404a of the body 402 is in contact with the second side 308 of the piston 304, to a second position, in which a second side 404b of the body 402 is in contact with the second side 308 of the piston 304 (see FIG. 17), where the second side 404b of the body 402 has a greater height than the first side 404a of the body 402, the dead stroke is decreased (e.g., the seal 344 moves towards the plurality of first openings 380).

The push rod 310 is coupled to the brake lever 102 at or adjacent to the second end 314 of the push rod 310. Referring to FIGS. 10 and 14, a portion of the push rod 310 (e.g., at and/or adjacent to the second end 314 of the push rod 310) is attached to the brake lever 102 via a threaded connection within the sleeve 144. For example, referring to FIG. 10, the sleeve 144 is positioned within the opening 142 through the bracket 131 of the shift lever assembly 112, in addition to the openings 145 through the brake lever 102, and a straight rod cross dowel 414 with threads (e.g., female threads) is positioned within the sleeve 144, which acts as a bushing. In other words, the straight rod cross dowel 414 with, for example, female threads and a single bushing (e.g., the sleeve 144) are retained and rotate within the brake lever 102. The straight rod cross dowel 414 functions as an attachment point for the push rod 310, as the threads within the straight rod cross dowel 414 engage with threads (e.g., male threads) at and/or adjacent to the second end 314 of the push rod 310.

Referring to FIG. 14, an adjustment mechanism 416 includes the threaded connection between the push rod 310 and the straight rod cross dowel 414. The adjustment mechanism 416 is configured to adjust an angular position of the brake lever 102 relative to the housing 104, such that when the bicycle control device 100 is mounted to the handlebar 64, for example, a distance between an end of the brake lever 102 and the handlebar 64 is also adjusted.

Referring to FIG. 10, the adjustment mechanism 416 also includes a tool interface 418 at the second end 314 of the push rod 310. The tool interface 418 may be any number of different types of tool interfaces including, for example, a hex key socket, a flathead slot, Phillips slots, or another type of tool interface. In one embodiment, a hex key is used to thread the push rod 310 in and out of the straight rod cross dowel 414. With part of the push rod support 320 captive within the master cylinder sleeve 302, for example, as the push rod 310 is threaded into the straight rod cross dowel 414 (e.g., rotated in a first rotational direction relative to the straight rod cross dowel 414), the body 316 of the push rod 310 rotates relative to the push rod support 320, within the receptacle 322 at the first end 324 of the push rod support 320, and the end of the brake lever 102 moves closer to the handlebar 64, for example. As the push rod 310 is threaded out of the straight rod cross dowel 414 (e.g., rotated in a second rotational direction relative to the straight rod cross dowel 414 that is opposite the first rotational direction relative to the straight rod cross dowel 414), the end of the brake lever 102 is biased away (e.g., allowed to move away) from the handlebar 64, for example.

The tool interface 418 is accessible via an opening 420 through the brake lever 102. The opening 420 through the brake lever 102 allows the rider, for example, to adjust an initial distance D from the brake lever 102 to the handlebar 64. The opening 420, and thus the tool interface 418, is accessible through a cover 422 (e.g., a hatch) attached to the brake lever 102 (e.g., a front side of the brake lever 102). The cover 422 may be attached to the brake lever 102 in any number of ways including, for example, with one or more fasteners 424 (e.g., one screw and a corresponding threaded opening in the brake lever 102).

The hydraulic brake system may include additional, fewer, and/or different components. For example, the bicycle control device 100 may be attached to the handlebar 64 in any number of ways. For example, referring to FIG. 10, the bicycle control device 100 may be attached to the clamp 120, and the clamp 120 may be attached to the handlebar 64. The bicycle control device 100 may be attached to the clamp with, for example, a nut 426 (e.g., a long nut) and a bolt 427. The bolt 427 may extend through an opening 428 through the clamp 120 and a corresponding opening through the housing 104 (not shown), and the nut 426 may secure the bicycle control device 100 to the clamp 120 via the bolt 427. A washer 429 may be disposed between the nut 426 and the housing 104.

Other embodiments of an adjustment mechanism may be provided. For example, referring to FIGS. 19 and 20, an adjustment mechanism 430 may not include a cam (e.g., the cam 330). A push rod support 432 (e.g., a push rod socket) may be connected to a piston 434 disposed within a master cylinder sleeve 436 via an adapter 438 (e.g., a contact dial adapter, a threaded boss) having, for example, at least internal threads 439 at an inner annular surface of the adapter 438.

The piston 434 has a first end 440 and a second end 442 opposite the first end 440. The piston 434 may be biased against (e.g., with a spring within the master cylinder sleeve 436) the adapter 438. For example, the second end 442 of the piston 434 may be biased against the adapter 438.

The push rod support 432 has a first end 444 and a second end 446 opposite the first end 444. The first end 444 of the push rod support 432 includes a receptacle 448 that extends from the first end 444 of the push rod support 432 into the push rod support 432. A push rod 450 has a first end 452 and a second end 454 opposite the first end 452. The first end 452 of the push rod 450 is formed by a body 456 (e.g., a spherical body), and the push rod 450 is connected to the push rod support 432 via the body 456 of the push rod 450 disposed within the receptacle 448 at the first end 444 of the push rod support 432.

The second end 446 of the push rod support 432 is formed by an extension 458. The extension 458 of the push rod support 432 may have a smaller diameter than a remainder of the push rod support 432 (e.g., at the first end 444 of the push rod support 432). The extension 458 of the push rod support 432 may have external threads 460 that are threadably connected to the internal threads 439 of the adapter 438. The adapter 438 may be rotatable and translatable relative to the push rod support 432 via the threaded connection between the external threads 460 of the push rod support 432 and the internal threads 439 of the adapter 438.

The adjustment mechanism 430 includes a hollow dial 462 (e.g., a contact dial) supported by a housing 464 of the bicycle control device 100. The hollow dial 462 is disposed around the adapter 438 (e.g., an outer annular surface of the adapter 438) and rotationally fixed relative to the adapter 438, such that the hollow dial 462 and the adapter 438 rotate and translate together. The hollow dial 462 and the adapter 438 may be separate parts and may be rotationally fixed relative to each other in any number of ways including, for example, with one or more connectors and/or an adhesive. In one embodiment, the hollow dial 462 and the adapter 438 are formed by a single part.

A cylinder cover 466 is attached to the housing 464 at and/or adjacent to an end of a housing bore 468 extending through the housing 464. The cylinder cover 466 may be attached to the housing 464 in any number of ways including, for example, with one or more fasteners (e.g., circlips, snaps, and/or screws). The cylinder cover 466 may, for example, keep at least the master cylinder sleeve 436 within the housing bore 468 and protect components (e.g., the master cylinder sleeve 436 and the piston 434) from the environment.

The push rod support 432 is rotationally fixed relative to the cylinder cover 466, and thus the housing 464, such that the push rod support 432 may not rotate relative to the housing 464. For example, the push rod support 432 is keyed to the cylinder cover 466, such that the push rod support 432 may only translate relative to the cylinder cover 466, and thus the housing 464.

A piston assembly including, for example, at least the piston 434 and a seal 470 (e.g., a primary seal) disposed around the piston 434 is movable (e.g., axially) relative to the master cylinder sleeve 436 and, more specifically, relative to a plurality of openings 472 (e.g., timing ports) extending through the master cylinder sleeve 436. The piston assembly is movable by the adjustment mechanism 430 to adjust an amount of dead stroke (e.g., lever throw before pressure builds). The piston assembly may include more, fewer, and/or different components. For example, the piston assembly may also include a seal 474 (e.g., a secondary seal) disposed around the piston 434 at a distance away from the primary seal 470 in a direction along a length of the piston 434.

The movement of the piston assembly may be provided by rotation of the hollow dial 462. The hollow dial 462 is a rider interface and spins the adapter 438 on the second end 446 of the push rod support 432. Rotation of the hollow dial 462, and thus the adapter 438, in a first rotational direction relative to the housing 464, and thus the push rod support 432, causes the adapter 438 to move further onto the push rod support 432 (e.g., the extension 458 of the push rod support 432) and allows the piston assembly to be pushed further away from the plurality of openings 472 (e.g., by a spring within the master cylinder sleeve 436), lengthening the dead stroke. Rotation of the hollow dial 462, and thus the adapter 438, in a second rotational direction (e.g., opposite the first rotational direction) relative to the housing 464, and thus the push rod support 432, causes the adapter 438 to move further off of the push rod support 432 (e.g., the extension 458 of the push rod support 432) and pushes the piston assembly towards the plurality of openings 472, shortening the dead stroke.

Figure 19:
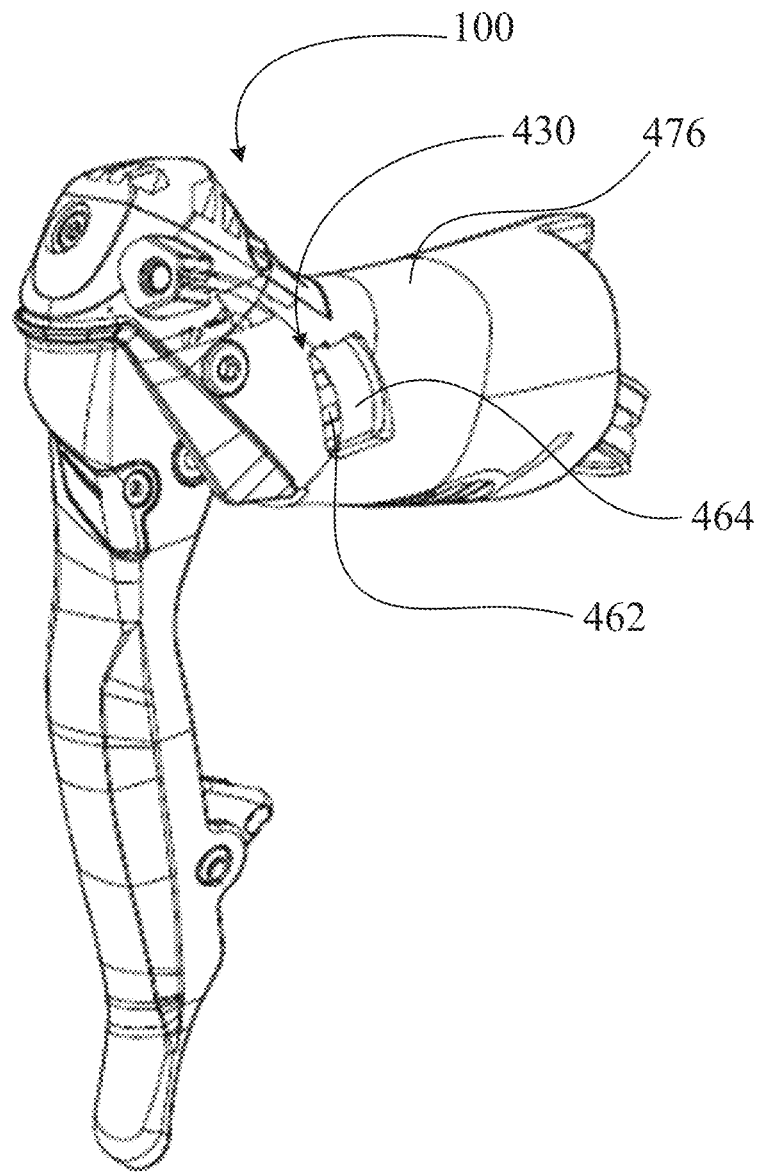
FIG. 19 is a perspective view of another embodiment of the control device of the bicycle of FIG. 1, including a second adjustment mechanism.

Referring to FIG. 19, a cover 476 (e.g., corresponding to the cover 122) covering at least part of the housing 464 may be movable relative to the housing 464, such that the hollow dial 462 may be inaccessible when the cover 476 is in a first position relative to the housing 464 but accessible when the cover 476 is in a second position relative to the housing. In other words, the hollow dial 462 may be made accessible by pulling the cover 476 back from a front of the housing 464.

The adjustment mechanism 430 (e.g., the hollow dial 462, the adapter 438, and the threaded connection between the adapter 438 and the extension 458 of the push rod support 432) may provide any number of ranges of adjustment of the dead stroke. For example, the adjustment mechanism 430 may provide infinite adjustment between zero and 1.5 mm.

Figure 21:
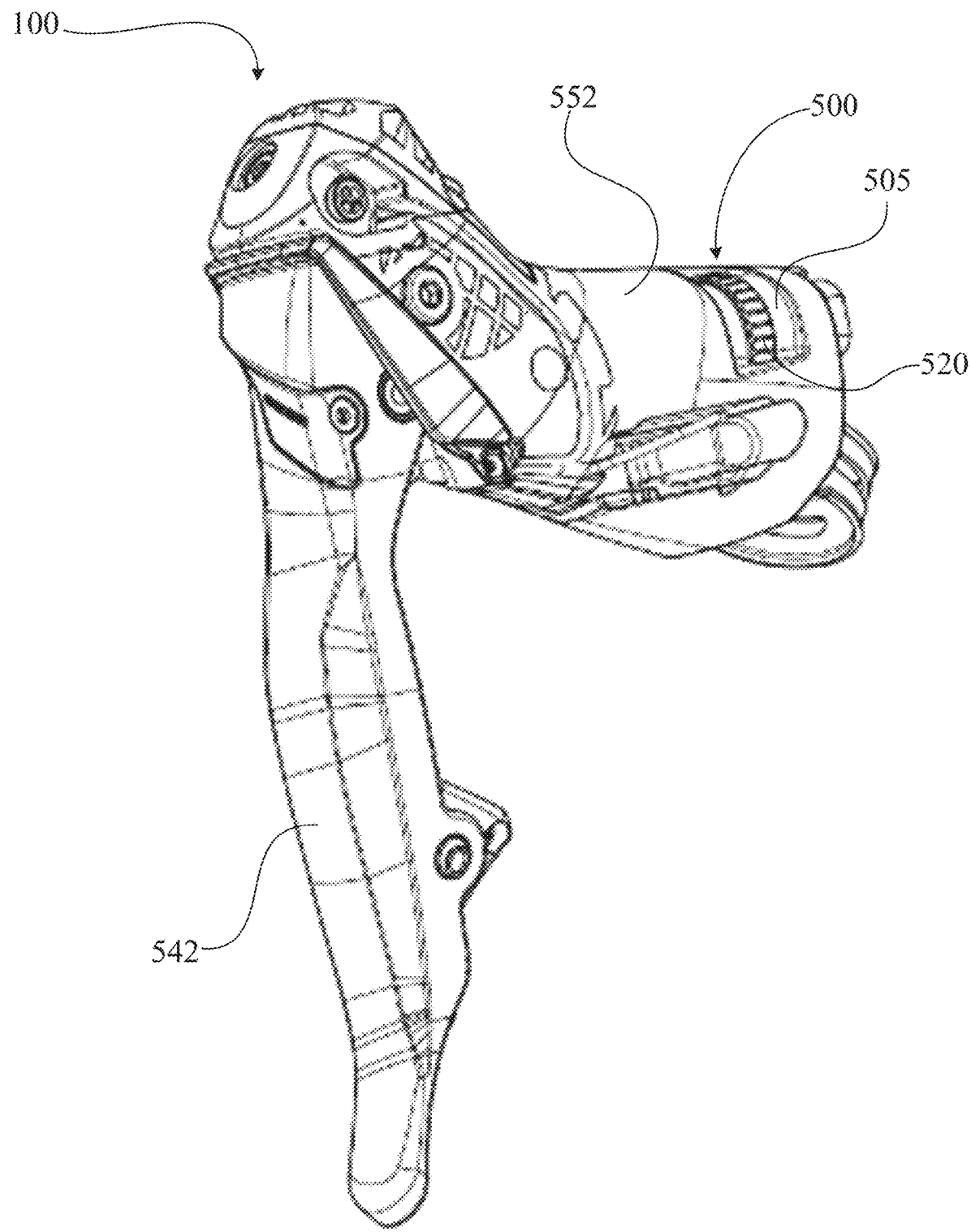
FIG. 21 is a perspective view of another embodiment of the control device of the bicycle of FIG. 1, including a third adjustment mechanism.
Figure 22:
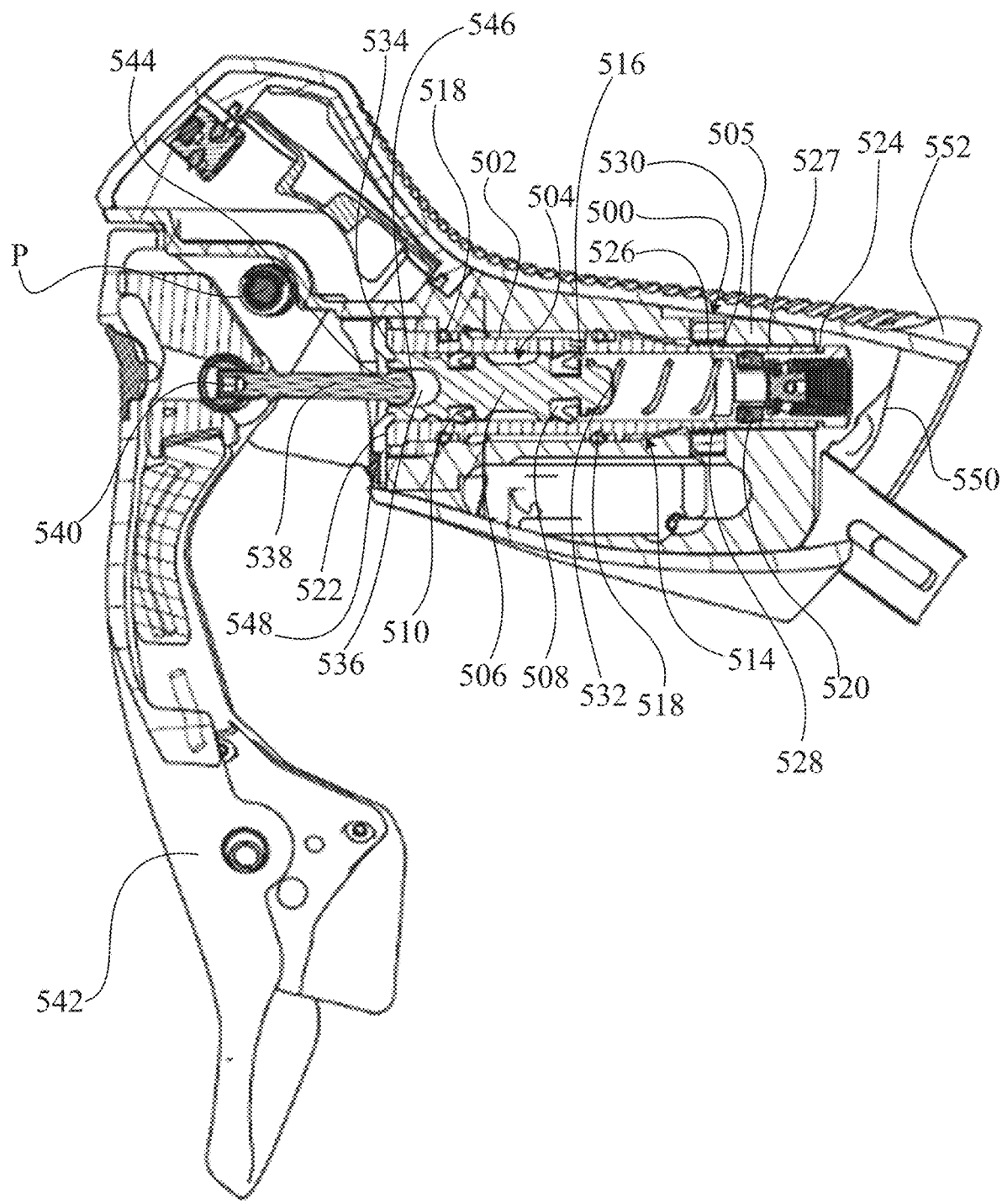
FIG. 22 is a cross-section of the control device of FIG. 21.

As another embodiment of an adjustment mechanism, referring to FIGS. 21 and 22, an adjustment mechanism 500 may be configured to move a master cylinder sleeve 502 relative to a piston assembly 504 and a housing 505 of the bicycle control device 100, for example. The piston assembly 504 includes at least a piston 506 and a seal 508 (e.g., a primary seal) disposed around and supported by the piston 506. The piston assembly 504 may include more, fewer, and/or different components. For example, the piston assembly 504 may also include a seal 510 (e.g., a secondary seal) disposed around and supported by the piston 506 at a distance from the primary seal 508 in a direction along a length of the piston 506.

The piston assembly 504 (e.g., the piston 506, the primary seal 508, and the secondary seal 510) is positionally fixed relative to the housing 505 of the bicycle control device 100, for example. A master cylinder sleeve assembly 514 including the master cylinder sleeve 502 (e.g., having timing ports 516 extending through the master cylinder sleeve 502) and one or more O-rings 518 disposed around and supported by the master cylinder sleeve 502 translates relative to the piston assembly 504 to adjust the amount of dead stroke (e.g., lever throw before pressure builds).

The adjustment mechanism 500 includes a hollow dial 520 supported by the housing 505. The master cylinder sleeve 502 has a first end 522 and a second end 524 opposite the first end 522. The hollow dial 520 is disposed around and connected to the master cylinder sleeve 502 at a position along the master cylinder sleeve 502 closer to the second end 524 of the master cylinder sleeve 502 than the first end 522 of the master cylinder sleeve 502. The master cylinder sleeve 502 may include external threads 526 at an outer annular surface 527 of the master cylinder sleeve 502, adjacent to the second end 524 of the master cylinder sleeve 502 (e.g., closer to the second end 524 of the master cylinder sleeve 502 compared to the first end 522 of the master cylinder sleeve 502), and the hollow dial 520 may include internal threads 528 at an inner annular surface 530 of the hollow dial 520. The hollow dial 520 may be rotatably connected to the master cylinder sleeve 502 via, for example, the internal threads 528 of the hollow dial 520 and the external threads 526 of the master cylinder sleeve 502.

The piston 506 has a first end 532 and a second end 534 opposite the first end 532. The piston 506 includes a receptacle 536 that extends from the second end 534 of the piston 506 into the piston 506. A push rod 538 has a first end 540 connected to a brake lever 542, and a body 544 at a second end 546 opposite the first end 540. The body 544 is disposed within the receptacle 536 within the piston 506.

A cylinder cover 548 is attached to the housing 505 in any number of ways. For example, the cylinder cover 548 is attached to the housing 505 with one or more connectors (e.g., fasteners such as screws, circlips, and/or snaps). The cylinder cover 548 contacts the piston 506 to maintain a position of the piston 506 relative to the housing 505.

The master cylinder sleeve 502 is rotationally fixed relative to the housing 505. For example, the master cylinder sleeve 502 may be keyed to the housing 505, such that the master cylinder sleeve 502 may translate relative to the housing 505 but not rotate relative to the housing 505. The master cylinder sleeve 502 being keyed to the housing 505 may thus prevent the master cylinder sleeve 502 from rotation with the hollow dial 520.

The movement of the master cylinder sleeve 502 relative to the housing 505 and the piston 506 may be provided by rotation of the hollow dial 520. The hollow dial 520 is a rider interface and causes the master cylinder sleeve 502 to translate relative to the piston 506, and thus the housing 505. The hollow dial 520 may be supported by the housing 505, such that the hollow dial 520 is not able to translate relative to the housing 505, and thus the piston 506. Rotation of the hollow dial 520 in a first rotational direction relative to the housing 505 causes, due to the threaded connection between the internal threads 528 of the hollow dial 520 and the external threads external threads 526 of the master cylinder sleeve 502, the master cylinder sleeve 502 to translate (e.g., axially relative to the housing 505 and the piston 506) in a direction towards a rear end 550 of the housing 505. Such translation of the master cylinder sleeve 502 moves the timing ports 516 through the master cylinder sleeve 502 away from the primary seal 508 disposed around the piston 506, lengthening the dead stroke. Rotation of the hollow dial 520 in a second rotational direction (e.g., opposite the first rotational direction) relative to the housing 505 causes the master cylinder sleeve 502 to translate (e.g., axially relative to the housing 505 and the piston 506) in a direction away from the rear end 550 of the housing 505. Such translation of the master cylinder sleeve 502 moves the timing ports 516 through the master cylinder sleeve 502 towards the primary seal 508 disposed around the piston 506, shortening the dead stroke.

Referring to FIG. 21, a cover 552 (e.g., corresponding to the cover 122) covering at least part of the housing 505 may be movable relative to the housing 505, such that the hollow dial 520 may be inaccessible when the cover 552 is in a first position relative to the housing 505 but accessible when the cover 552 is in a second position relative to the housing 505. In other words, the hollow dial 520 may be made accessible by pulling the cover 552 back from a front of the housing 505.

The adjustment mechanism 500 (e.g., the hollow dial 520, and the threaded connection between the hollow dial 520 and the master cylinder sleeve 502) may provide any number of ranges of adjustment of the dead stroke. For example, the adjustment mechanism 500 may provide infinite adjustment between zero and 1.5 mm.

Figure 20:
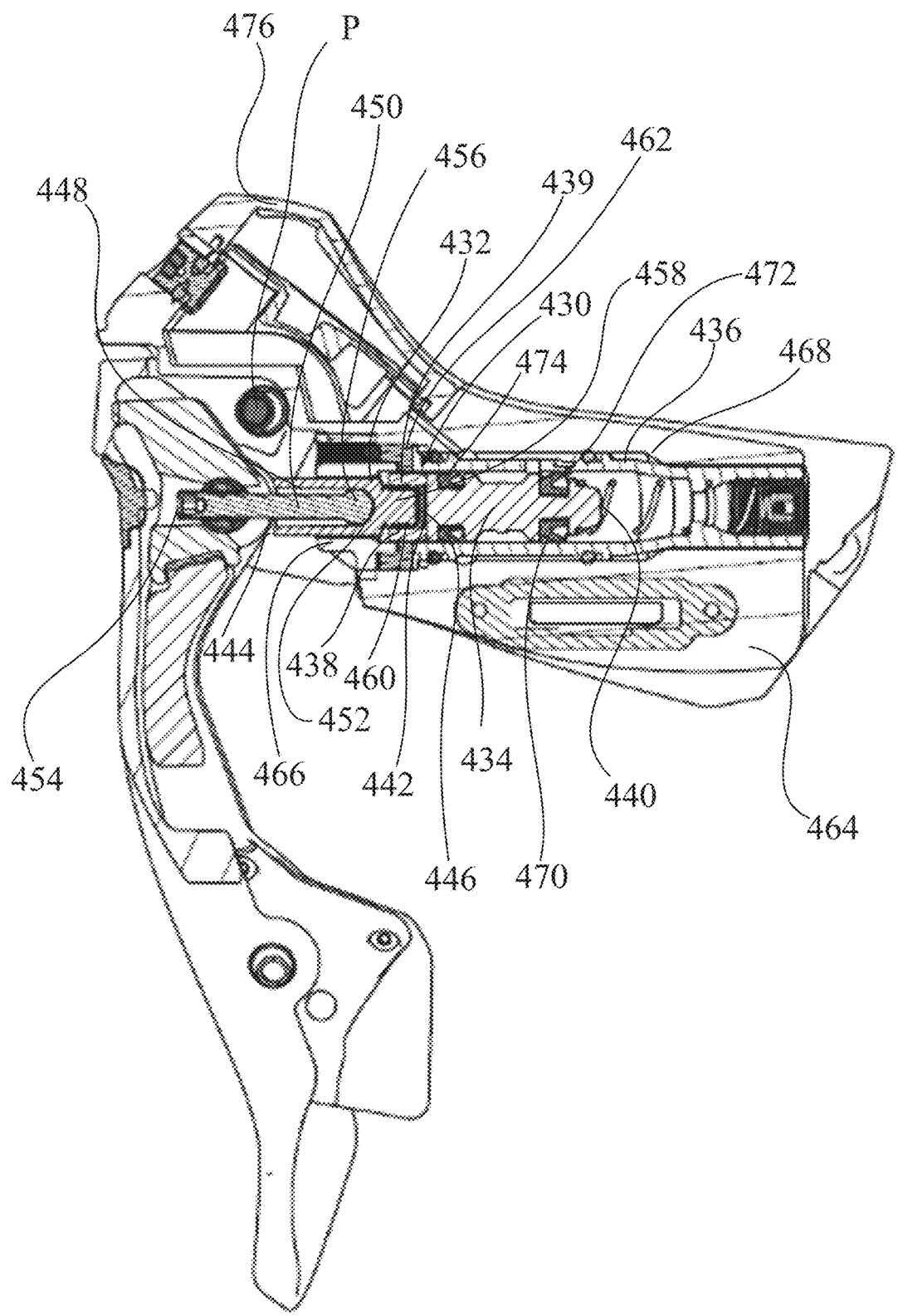
FIG. 20 is a cross-section of the control device of FIG. 19.

This bicycle control device 100 of the present embodiments uses, for example, a high-pivot brake lever. Referring to FIGS. 14, 20, and 22, the pivot axis P, about which the brake lever 102 is rotatable, is above (e.g., relative to a downward facing side of a housing of the bicycle control device 100) a push rod (e.g., the push rod 310, 450, or 538) and an actuating cross dowel (e.g., the cross dowel 414), via which the push rod is connected to the brake lever 102. This location of the pivot axis P allows for a greater mechanical advantage for building pressure and also provides a more subtle sweep of an end of an end of the push rod, mitigating bore, piston, and seal wear that may occur from side-load of a piston (e.g., the piston 304, 434, or 506) within a bore.

Figure 23:
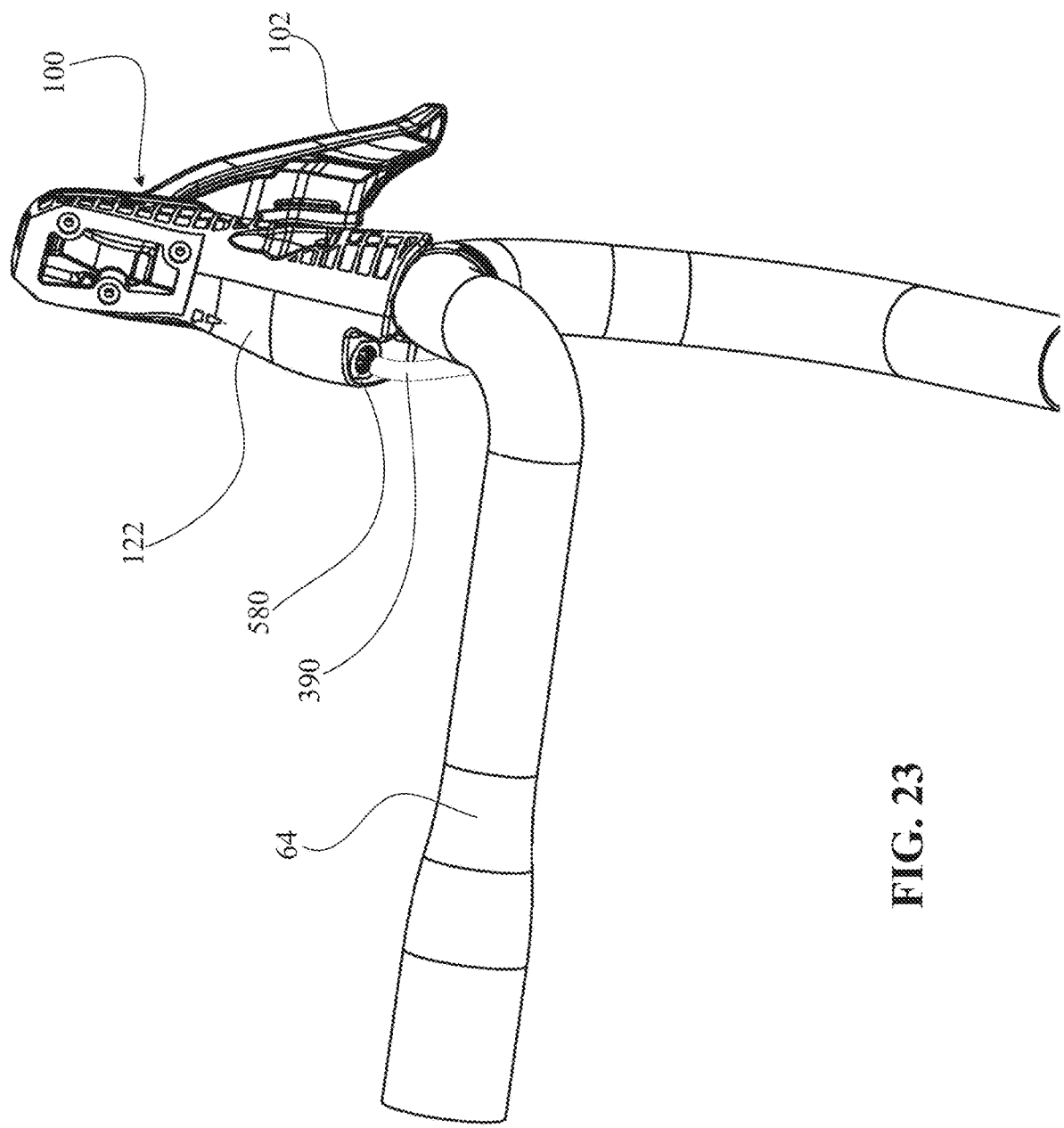
FIG. 23 is a perspective view of the control device of FIG. 2, with a reservoir cover removed, and a portion of a handlebar of the bicycle of FIG. 1.
Figure 24:
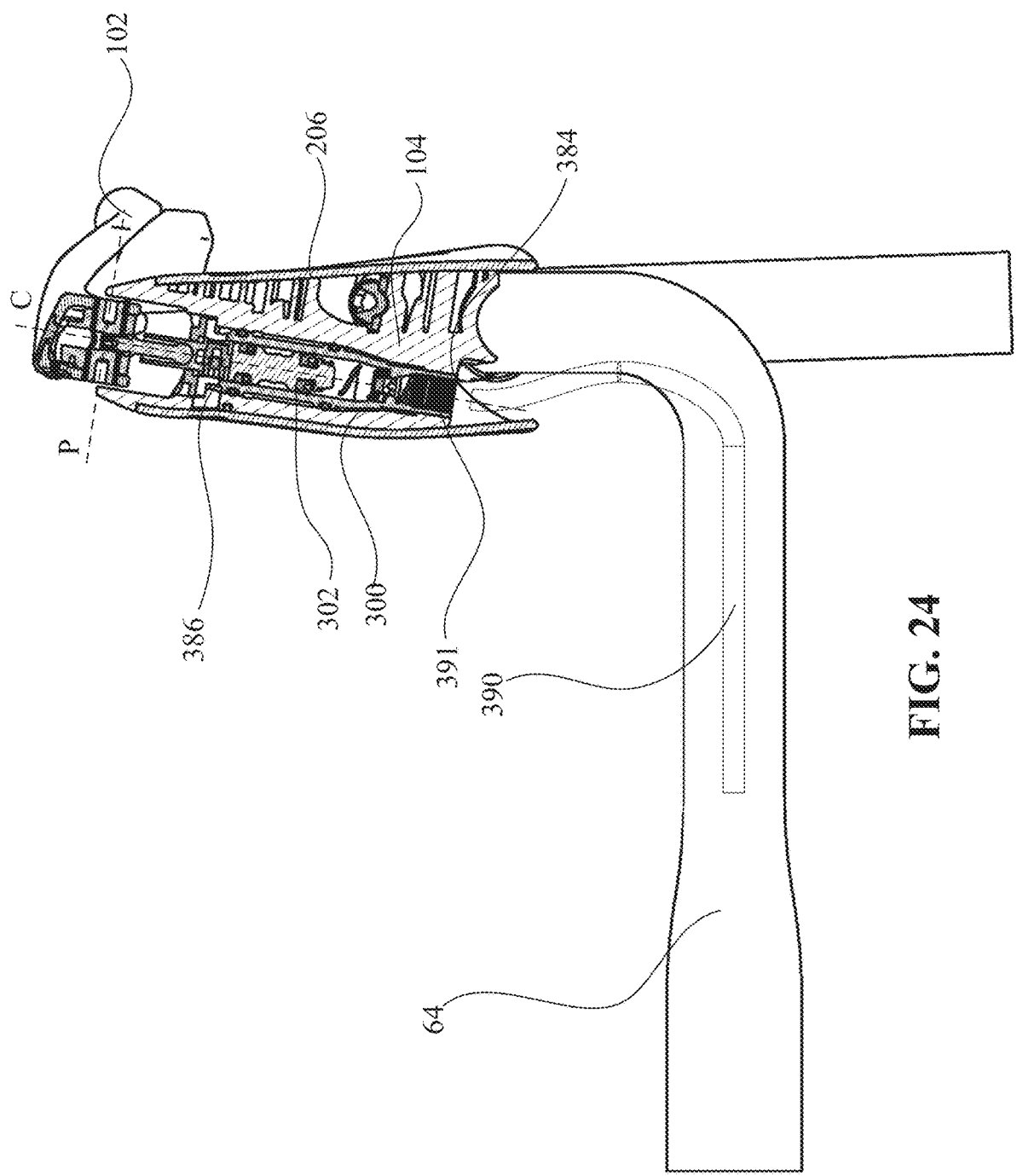
FIG. 24 is a cross-section of the control device of FIG. 4, taken along axis XXIV-XXIV, and a portion of a handlebar of the bicycle of FIG. 1.

Referring to FIGS. 23 and 24, the master cylinder sleeve 302 and the housing bore 300, in which the master cylinder sleeve 302 is disposed, for example, are oriented at an angle relative to the handlebar 64. This angle provides space to package, for example, the master cylinder sleeve 302, adjustment mechanisms (e.g., the adjustment mechanism 318, 430, or 500), and the hose connector 391 (e.g., a Stealthamajig valve) into the housing bore 300. This angle may also allow for installation of a hose (e.g., the hydraulic line 390) and a hose compression nut 580. An angle between the master cylinder sleeve 302 and the handlebar 64 may be provided to allow tool access for installation of the hose compression nut 580, but remain close enough to the handlebar 64 to not affect rider experience or aesthetics.

Referring to FIG. 24, the central axis C of the master cylinder sleeve 302 is angled relative to the outward facing side 206 of the housing 104 (e.g., and a portion of the handlebar 64), such that the second end 386 of the master cylinder sleeve 302 is closer to the outward facing side 206 of the housing 104 than the first end 384 of the master cylinder sleeve 302 is relative to the outward facing side 206 of the housing 104. In one embodiment, the central axis C of the master cylinder sleeve 302 extends generally horizontally relative to a flat surface 800 on which the bicycle 50 is supported when the bicycle control device 100 is mounted to the handlebar 64, for example. Other orientations may be provided.

The brake lever 102 may be mounted to the housing 104 at a same angle as the central axis C of the master cylinder sleeve 302 is angled relative to, for example, the outward facing side 206 of the housing 104, such that smooth lever actuation is provided. In other words, the pivot axis P may be perpendicular to the central axis C of the master cylinder sleeve 302. This angle provides a unique ergonomic experience, as a lever sweep of the brake lever 102 may follow a natural motion of finger(s) of the rider.

Figure 25:
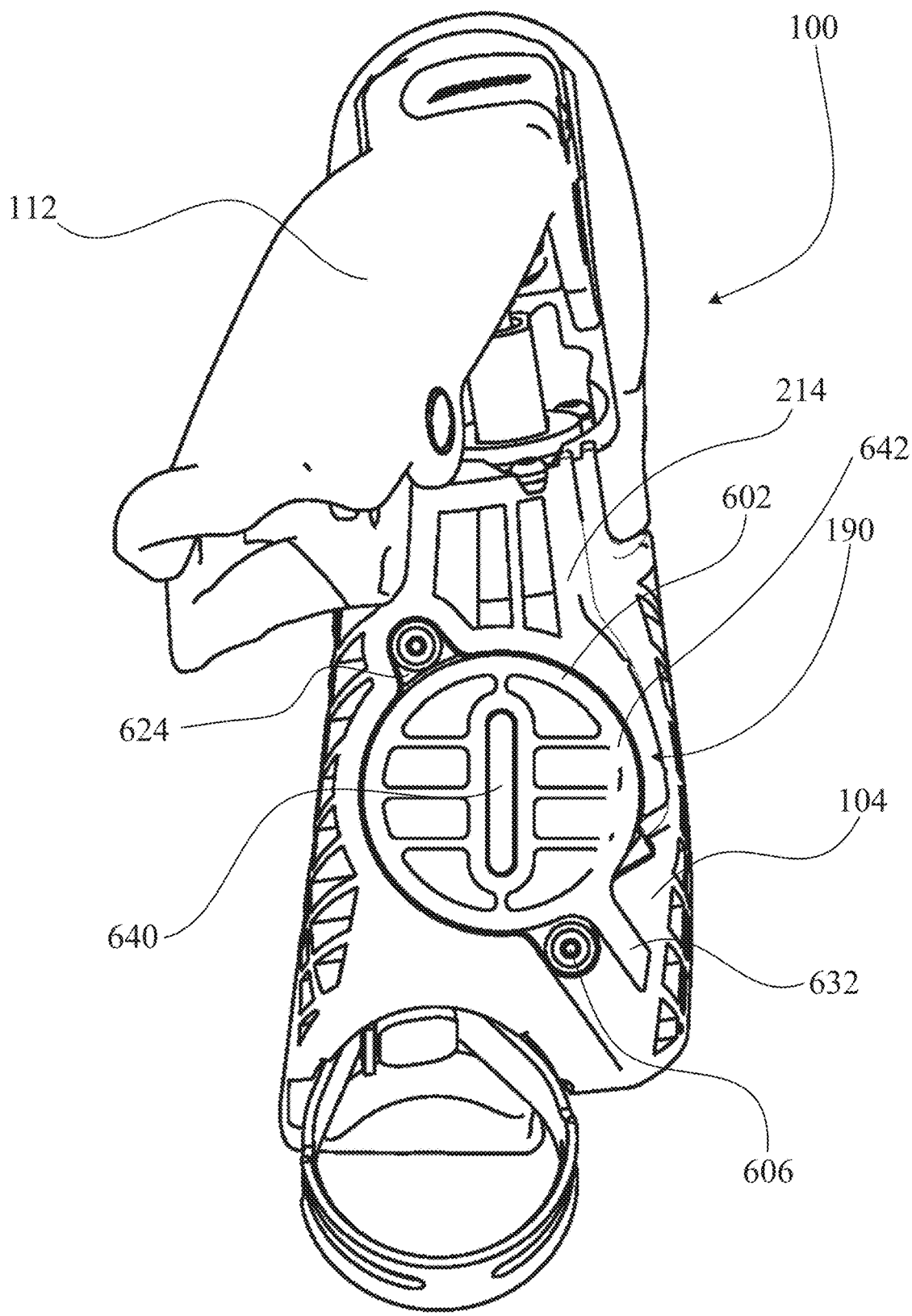
FIG. 25 is a bottom view of the control device of FIG. 2, removed from the handlebar.
Figure 26:
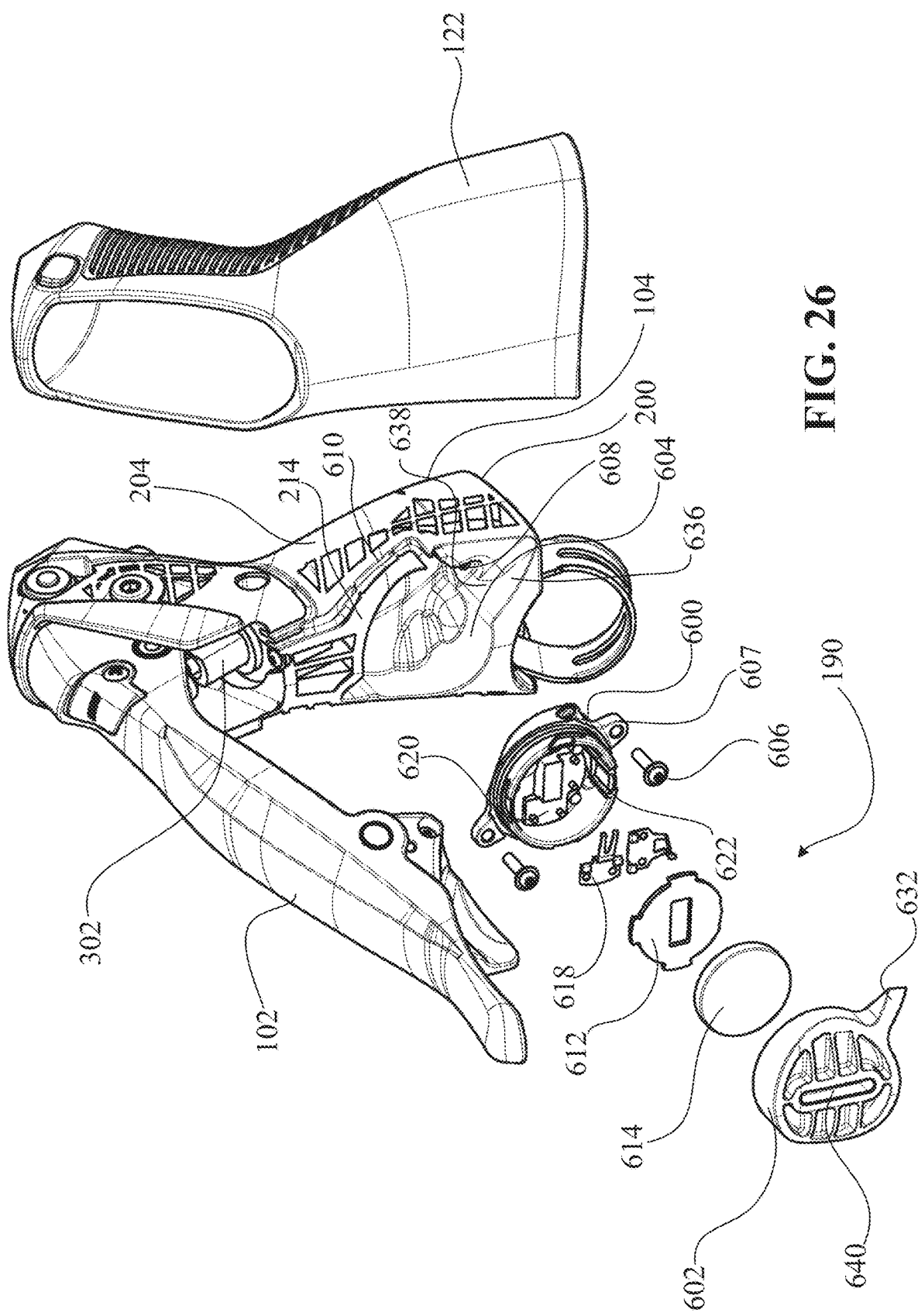
FIG. 26 is a perspective view of another embodiment of the control device of the bicycle of FIG. 1, with a cover removed and an exploded view of a first battery assembly disassembled from a housing of the control device.
Figure 27:
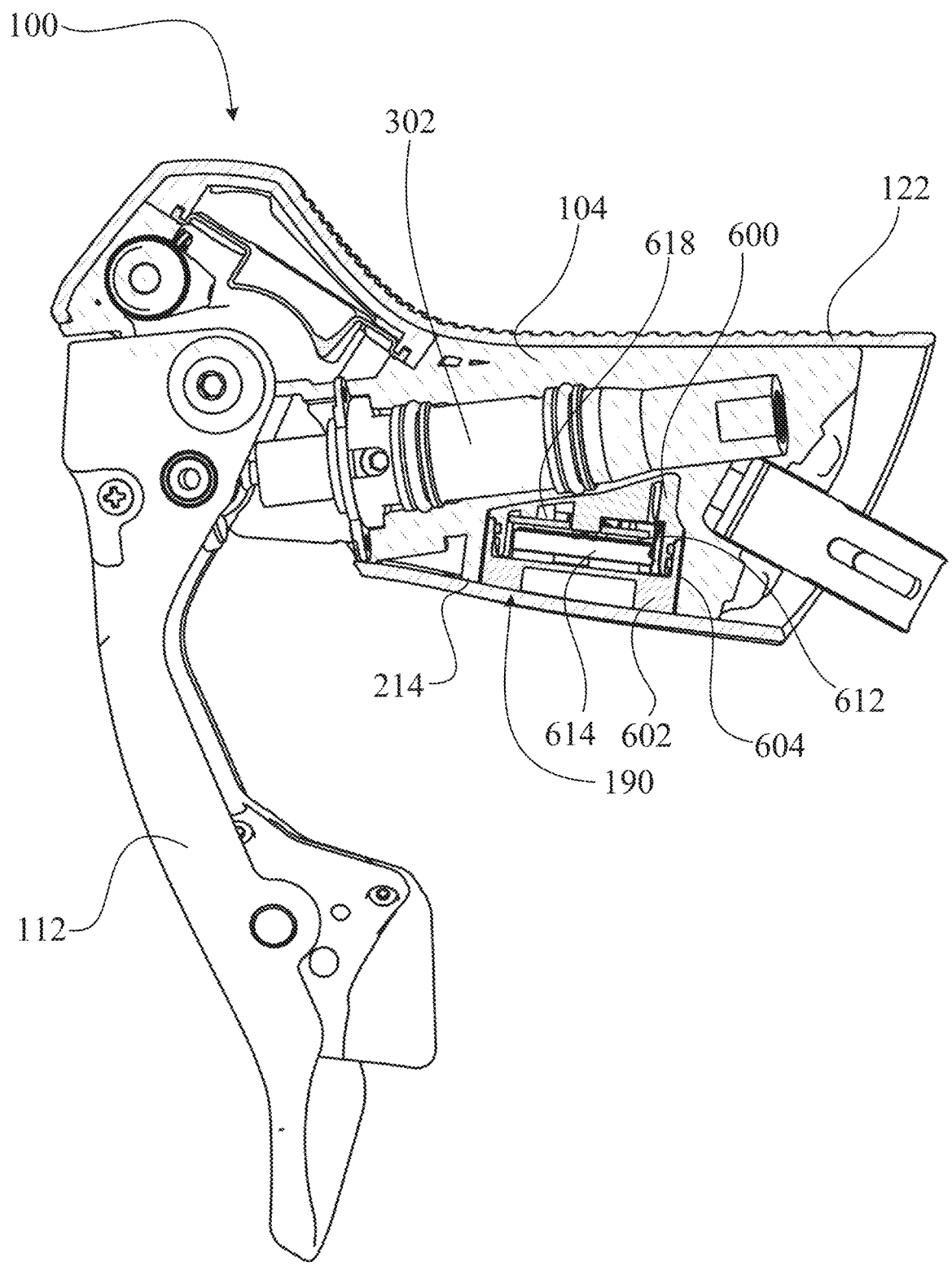
FIG. 27 is a cross-section of the control device of FIG. 26, removed from the handlebar and assembled.

Referring to FIGS. 25-29, in addition to the hydraulic brake system components discussed above, the housing 104 also supports the self-contained battery unit 190 (e.g., a battery unit). Referring to FIG. 26, the battery unit 190 includes a battery case 600 and a first battery cover 602 (e.g., an external battery cover). The battery case 600 is received in a recess 604 in the housing 104 and is fixedly attached to the housing 104 via one or more connectors 606 (e.g., screws and corresponding threaded openings, tabs, snap features, adhesive tape, glue, epoxy, and/or press-fit features) at one or more tabs 607 (e.g., two tabs) of the battery case 600. In this example, the battery case 600 is fastened to the housing 104 at the two tabs 607 via two screws 606 and two corresponding threaded openings 608 in the housing 104. Alternatively or additionally, the battery case 600 may be attached to the housing 104 via adhesive, other fasteners, and/or another type of connector (e.g., tabs or snap features). More or fewer than two connectors 606 may be provided.

In one embodiment, the recess 604 of the housing 104 extends into the housing from the downward facing side 214 of the base portion 200 of the housing 104. Accordingly, the self-contained battery unit 190 may be mounted to the housing 104 at the downward facing side 214 of the base portion 200 of the housing 104. In other embodiments, however, the self-contained battery unit 190 may be mounted to other sides and/or portions of the housing 104. The self-contained battery unit 190 unit may be positioned below the master cylinder sleeve 302 when viewed from the inward facing side 204 of the bicycle control device 100, for example.

The self-contained battery unit 190 is connected to the PCB 154 within the paddle end 138 of the shift lever 132 in any number of ways. For example, the self-contained battery unit 190 is connected to the PCB 154 via a two conductor electrical cable. The two conductor electrical cable may be routed and retained on the housing 104 through a channel 610 within at least the base portion 200 of the housing 104. The two conductor electrical cable may be routed on either the inboard side or the outboard side of the housing 104. In one embodiment, the self-contained battery unit 190 is also connected to the PCB 244 of the auxiliary button unit 230 to power components supported by the PCB 244 of the auxiliary button unit 230. The self-contained battery unit 190 may be connected to the PCB 244 of the auxiliary button unit 230 via, for example, another two conductor electrical cable.

The self-contained battery unit 190 further includes a second cover 612 (e.g., an internal battery cover) disposed between the battery case 600 and the first battery cover 602. A battery 614 may be received within a battery receptacle (e.g., including a first cavity or recess) defined by the external battery cover 602 and the internal battery cover 612. The battery 614 may be any number of different types of batteries including, for example, a conventional and replaceable coin cell type battery. Alternatively, the battery 614 may be a non-replaceable and/or rechargeable battery.

The battery 614 may be configured to provide power for the controller, the communication module 156, remote switches or electrical devices via accessory jacks, and/or other electronic components. For example, the battery 614 may be configured to provide power to the electrical switch 246 of the auxiliary button unit 230 when the battery 614 is disposed within the battery receptacle 616.

The self-contained battery unit 190 may also include one or more seals 617 (e.g., O-rings; see FIG. 28) for the external battery cover 602 and/or the internal battery cover 612, electrical contacts 618 (e.g., two battery electrical contacts 618), and a grommet seal. The self-contained battery unit 190 may include additional, fewer, and/or different components.

Figure 28:
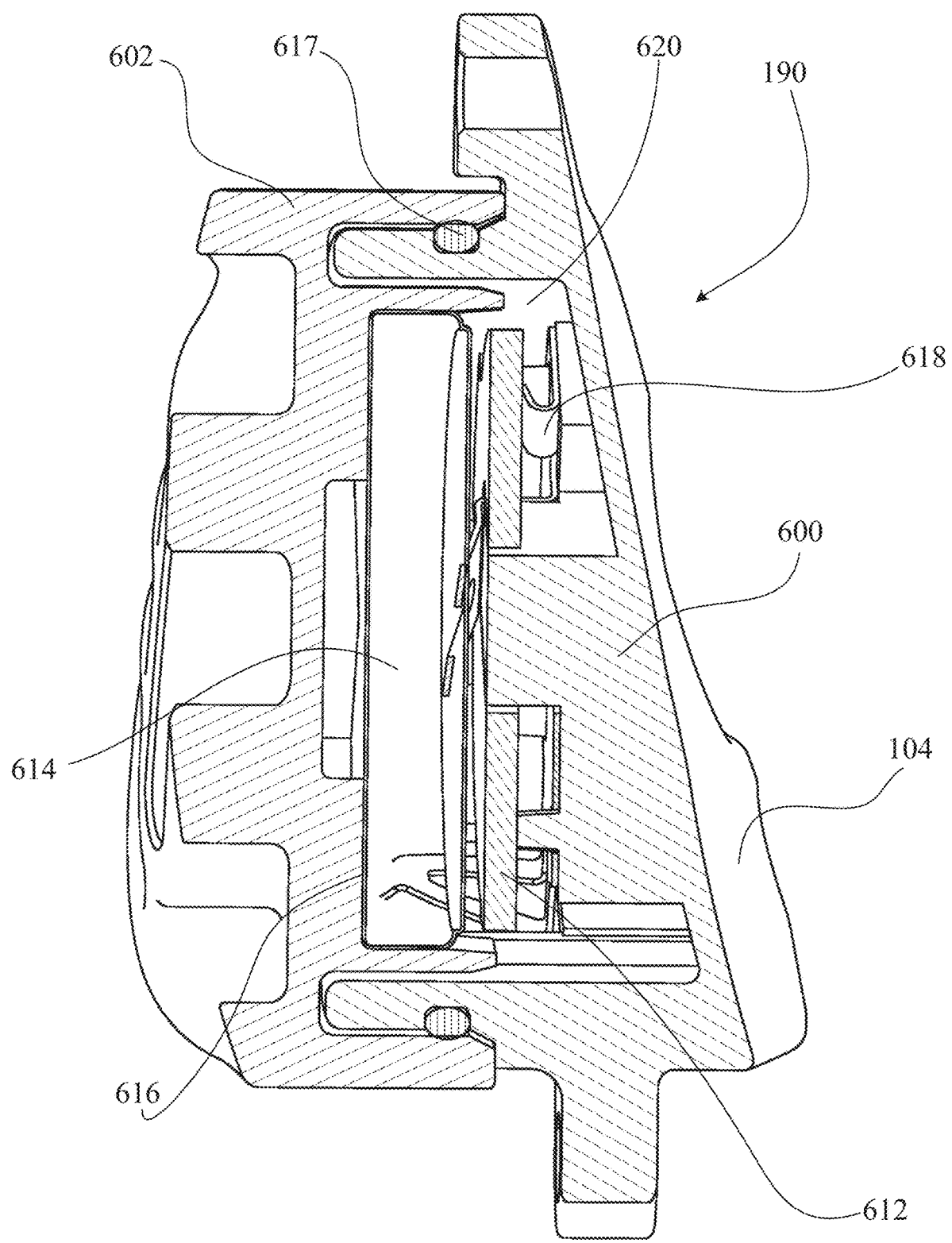
FIG. 28 is a close-up of the cross-section of the first battery assembly of FIG. 27.

Referring to FIG. 28, the battery case 600 has one cavity 620 (e.g., a second cavity or recess; an internal cavity) internal to the housing 104 with one opening, and one cavity 616 external to the housing 104 (e.g., the battery receptacle 616; an external cavity) with one opening. The internal cavity 620 houses the electrical contacts 618, which may be fixed to the battery case 600, and terminations of wires from one or more electrical cables. In one example, the electrical contacts 618 are physically connected to the battery case 600 via plastic heat staking, though the electrical contacts 618 may be fixed to the battery case 600 in additional and/or different ways. For example, the electrical contacts 618 may be physically connected to the battery case 600 via snap-fit features, screws, glue, epoxy, and/or another connector. The wires of the one or more electrical cables may be physically connected to the electrical contacts 618 in any number of ways including, for example, via crimp features and solder.

Referring to FIG. 26, the one or more electrical cables pass through an opening 622 to the internal cavity 620. In one embodiment, the opening 622 to the internal cavity 620 is sealed with, for example, the grommet seal to prevent, for example, the ingress of water and contaminants. The opening 622 to the internal cavity 620 may be sealed in any number of other ways including, for example, with glue or an epoxy. The electrical contacts 618 pass from the internal cavity 620 into the external cavity 616 to interface with the battery 614.

The internal battery cover 612 may be assembled in the battery case 600 over the electrical contacts 618 and the one or more electrical cables in order to conceal the electrical contacts 618 and the one or more electrical cables and protect the electrical contacts 618 and the one or more electrical cables from damage. The internal battery cover 612 may be retained in the battery case 600 in any number of ways including, for example, plastic heat staking, snap-fit features, and screws.

The battery 614 may be retained within the external battery cover 602 through, for example, a light interference fit so that the battery 614 is positioned within the self-contained battery unit 190 by the external battery cover 602, and is removable from the self-contained battery unit 190 when the external battery cover 602 is removed.

Figure 29:
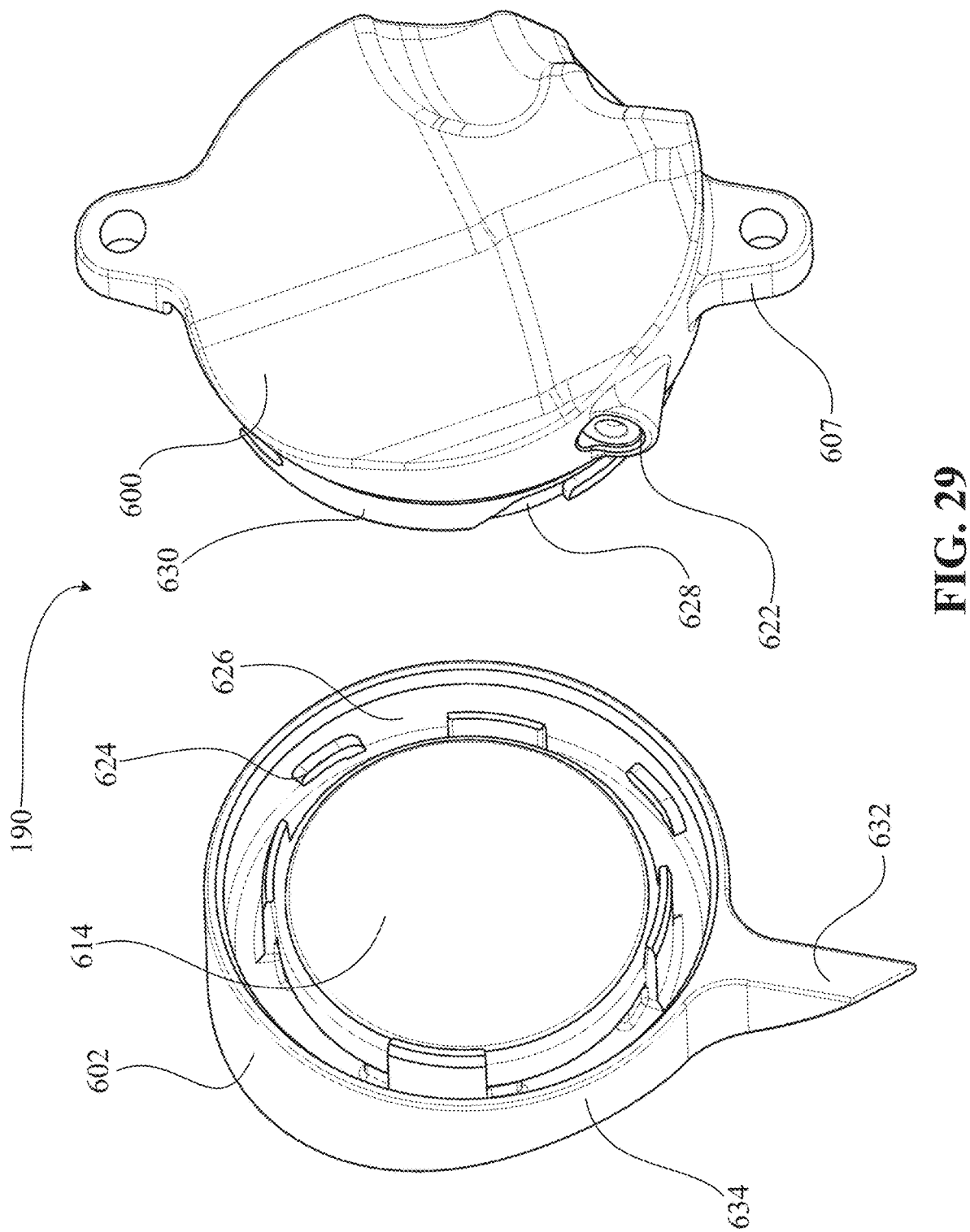
FIG. 29 is a close-up perspective exploded view of a battery housing and a battery cover of the first battery assembly of FIG. 26.

Referring to FIG. 29, the external battery cover 602 may be retained on the battery case 600 through a set of tab features 624 extending away from an inner side 626 of the external battery cover 602, and slot features 628 at an inner side 630 of the battery case 600. The external battery cover 602 is installed and removed, via the tab features 624 and the slot features 628, by rotating the external battery cover 602 relative to the battery case 600. Other attachment features may be provided.

In the example shown in FIG. 29, the tab features 624 (e.g., male features) are on the external battery cover 602, while the slot features 628 (e.g., female features) are on the battery case 600. In another embodiment, the slot features 628 may be on the external battery cover 602, while the tab features 624 are on the battery case 600.

The tab features 624 of the external battery cover 602 that retain the battery 614 within the battery case 600 also align the external battery cover 602 to the battery case 600 to prevent damage to, for example, the one or more seals 617 and/or the electrical contacts 618 as the external battery cover 602 is being installed.

The external battery cover 602 may also include a lever feature 632 that extends away from an outer annular surface 634 of the external battery cover 602. The lever feature 632 facilitates removal from and installation onto the battery case 600 without a tool. The lever feature 632 also rotationally aligns the external battery cover 602 relative to the battery case 600 and the housing 104. For example, the housing 104 may include a recess 636 (see FIG. 26) formed at least partially by a wall 638, and the external battery cover 602 may only be installed in an orientation in which the lever feature 632 is disposed within the recess 636. Otherwise, the lever feature 632 may interfere with the housing 104. Referring to FIG. 25, the external battery cover 602 may also include a slot 640 (e.g., a coin slot feature) within an outer side 642 of the external battery cover 602 to facilitate removal and installation of the external battery cover 602 with a tool or a coin.

Figure 30:
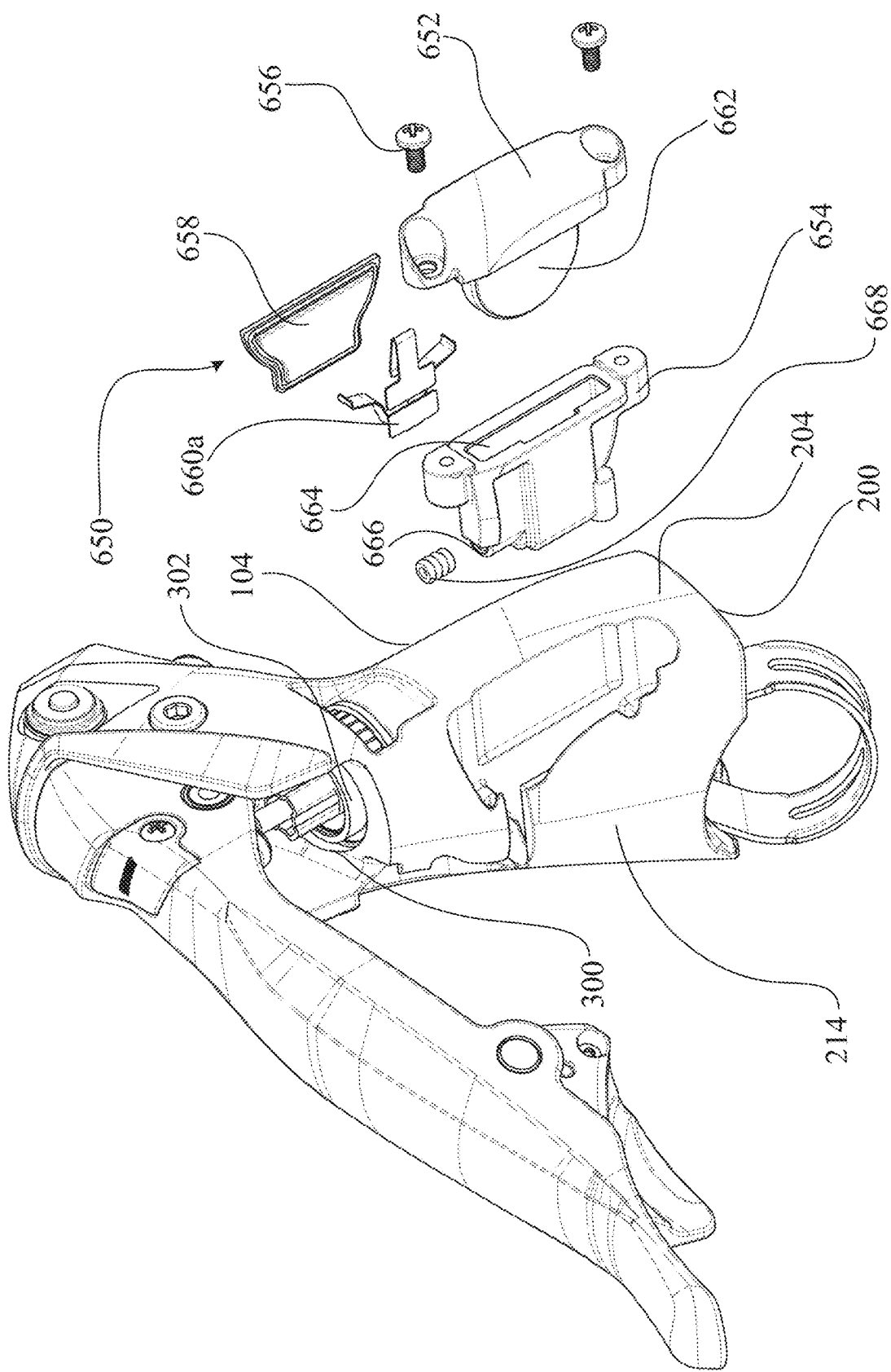
FIG. 30 is a perspective view of another embodiment of the control device of the bicycle of FIG. 1, with an exploded view of a second battery assembly disassembled from a housing of the control device.

Other embodiments of a self-contained battery unit may be provided. For example, referring to FIGS. 30 and 31, a self-contained battery unit 650 may be supported at and assembled from the inward facing side 204 of the housing 104. For example, the self-contained battery unit 650 may be supported by the housing 104 between the downward facing side 214 of the base portion 200 of the housing 104 and the housing bore 300 through the housing 104, and thus the master cylinder sleeve 302 supported within the housing bore 300. In other embodiments, the self-contained battery unit 650 may be supported in other locations within the housing 104.

In this embodiment, an external battery cover 652 is attached to a battery case 654 (e.g., a battery housing) via one or more connectors 656 (e.g., two screws or snap-fit features) instead of rotational locking features. The battery case 654 may be attached to the housing 104 in any number of ways including, for example, via the one or more connectors 656 (e.g., via corresponding threaded openings in the housing 104), other connectors, tabs, locking features, snaps, an adhesive, and/or another connector.

Sealing between the external battery cover 652 and the battery case 654 may be achieved in any number of ways including, for example, via a gasket or overmolded elastomer 658 that is compressed between the external battery cover 652 and the battery case 654.

The self-contained battery unit 650 also includes electrical contacts 660 (e.g., two battery electrical contacts 660). A positive battery contact 660a is positioned on an outboard portion of the battery case 654 and biases a battery 662 positioned within the self-contained battery unit 650 and the external battery cover 652 towards the inward facing side 204 of the housing 104.

The battery case 654 has one cavity 664 (e.g., an internal cavity) external to the housing 104 with one opening 666. The internal cavity 664 houses the electrical contacts 660, which may be fixed to the battery case 654, and terminations of wires from one or more electrical cables. The internal cavity 654 also houses the gasket or overmolded elastomer 658 and at least part of the battery 662. In one example, the electrical contacts 660 are physically connected to the battery case 654 via plastic heat staking, though the electrical contacts 660 may be fixed to the battery case 654 in additional and/or different ways. For example, the electrical contacts 660 may be physically connected to the battery case 654 via snap-fit features, screws, glue, epoxy, and/or another connector. The wires of the one or more electrical cables may be physically connected to the electrical contacts 660 in any number of ways including, for example, via crimp features and solder.

Figure 31:
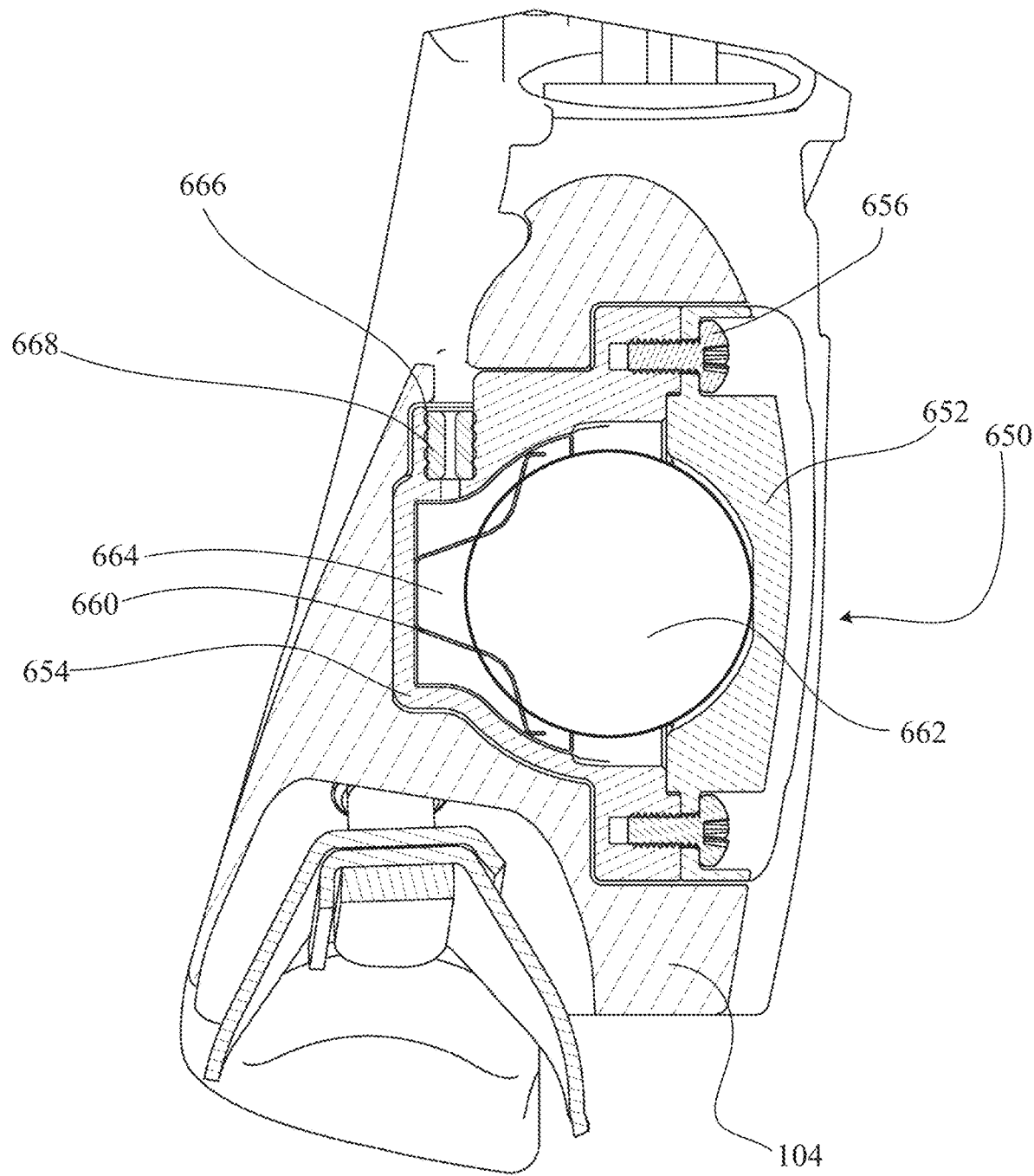
FIG. 31 is a close-up cross-section of the second battery assembly of FIG. 30, assembled.

Referring to FIG. 31, the one or more electrical cables pass through the opening 666 to the internal cavity 664. In one embodiment, the opening 666 to the internal cavity 664 is sealed with, for example, a grommet seal 668 to prevent, for example, the ingress of water and contaminants. The opening 666 to the internal cavity 664 may be sealed in any number of other ways including, for example, with glue or an epoxy.

Although certain control devices, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A control device mountable to a handlebar of a bicycle, the control device comprising:
    a housing having a base portion and an extension portion, the base portion of the housing having a front end, a rear end opposite the front end, a downward facing side, an upward facing side, an inward facing side, an outward facing side, and a handlebar clamp disposed at the rear end;
    a lever coupled to and pivotable relative to the housing;
    a master cylinder portion supported by the housing, the master cylinder portion having a fluid cylinder, the fluid cylinder having a first end and a second end opposite the first end with a cylindrical wall therebetween, the fluid cylinder being hollow, such that an opening extends through the master cylinder portion, from the first end to the second end; and a piston assembly supported by the housing, the piston assembly being movable relative to the master cylinder portion, at least part of the piston assembly being disposed within the master cylinder portion, wherein the master cylinder portion is angled relative to the outward facing side of the base portion of the housing, such that the second end of the fluid cylinder is closer to the outward facing side than the first end of the fluid cylinder is relative to the outward facing side.

2. The control device of claim 1, further comprising a push rod, wherein the lever is coupled to the piston assembly via the push rod, such that rotation of the lever relative to the housing causes the piston assembly to translate relative to the master cylinder portion, wherein the master cylinder portion has a central axis extending along a length of the master cylinder portion, wherein the control device further comprises a pivot axle that pivotably couples the lever to the housing, the pivot axle defining a pivot axis about which the lever is pivotable relative to the housing, and wherein the pivot axis is perpendicular relative to the central axis of the master cylinder portion, such that the lever pivots in a plane in line with or parallel relative to the central axis of the master cylinder portion.

3. The control device of claim 2, wherein relative to the downward facing side of the base portion of the housing, the pivot axle is disposed above the push rod.

4. The control device of claim 3, further comprising a fluid chamber at least partially disposed within the extension portion of the housing, the pivot axle being disposed between at least part of the fluid chamber and the push rod.

5. The control device of claim 4, wherein the cylindrical wall of the fluid cylinder has at least one inner annular surface and at least one outer annular surface, and wherein the cylindrical wall of the fluid cylinder includes an opening extending from an inner annular surface of the at least one inner annular surface to an outer annular surface of the at least one outer annular surface of the cylindrical wall, through the cylindrical wall.

6. The control device of claim 5, wherein the piston assembly includes a piston and a seal disposed around the piston, wherein a fluid is disposable within a volume between the piston and the fluid cylinder, and wherein the piston assembly is configured to translate in a first direction relative to the master cylinder portion when the lever pivots in a first rotational direction relative to the housing, such that the seal moves towards the opening through the cylindrical wall of the fluid cylinder and pushes a portion of the fluid out of the master cylinder portion for activation of a brake caliper of the bicycle.

7. The control device of claim 1, wherein the master cylinder portion has a central axis extending along a length of the master cylinder portion, and wherein when the control device is mounted to the handlebar of the bicycle.

8. The control device of claim 1, further comprising a push rod, a first end of the push rod being coupled to the lever via the first adjustment mechanism and a second end of the push rod being coupled to the piston assembly, such that rotation of the lever relative to the housing causes the piston assembly to translate relative to the master cylinder portion, wherein the first adjustment mechanism includes a threaded connection between the push rod, at or adjacent to the first end of the push rod, and the lever, and wherein the lever is pivotably connected to the housing, such that when the push rod rotates relative to the lever in a first rotational direction via the threaded connection between the push rod and the lever, an end of the lever moves towards the base portion of the housing.

9. The control device of claim 8, wherein the first end of the push rod is accessible and rotatable via an opening through the lever.

10. A control device mountable to a handlebar of a bicycle, the control device comprising:

a housing having a base portion and an extension portion, the base portion of the housing having a front end, a rear end opposite the front end, a downward facing side, an upward facing side, an inward facing side, an outward facing side, and a handlebar clamp disposed at the rear end;

a lever coupled to and pivotable relative to the housing;

a master cylinder portion supported by the housing, the master cylinder portion having a fluid cylinder, the fluid cylinder having a first end and a second end opposite the first end with a cylindrical wall therebetween, the fluid cylinder being hollow, such that an opening extends through the master cylinder portion, from the first end to the second end; and a piston assembly supported by the housing, the piston assembly being movable relative to the master cylinder portion, at least part of the piston assembly being disposed within the master cylinder portion, a first adjustment mechanism configured to adjust an angular position of the lever relative to the housing, such that when the control device is mounted to the handlebar of the bicycle, a distance between an end of the lever and the handlebar is also adjusted; and a second adjustment mechanism configured to adjust an initial position of the piston assembly relative to an opening through the cylindrical wall of the fluid cylinder, wherein the piston assembly includes a piston and a seal disposed around the piston, wherein a fluid is disposable within a volume between the piston and the fluid cylinder, wherein the piston assembly is configured to translate in a first direction relative to the master cylinder portion from when the lever pivots in a first rotational direction relative to the housing, such that the seal moves towards the opening through the cylindrical wall of the fluid cylinder and pushes a portion of the fluid out of the master cylinder portion for activation of a brake caliper of the bicycle.

11. The control device of claim 10, wherein the second adjustment mechanism includes a cam that is rotatable relative to the piston assembly, wherein the piston assembly is biased against the cam, such that the cam acts as a stop and locates an initial position of the piston assembly relative to the master cylinder portion, wherein the cam is configured to translate the piston assembly relative to the master cylinder portion when the cam is rotated relative to the piston assembly.

12. The control device of claim 11, wherein the master cylinder portion has a central axis extending along a length of the master cylinder portion, wherein the cam is rotatable relative to the piston assembly about a cam axis of rotation, the cam axis of rotation being perpendicular to the central axis of the master cylinder portion, and wherein the cam has a plurality of sides, each side of the plurality of sides having a different height in a direction along or parallel with the central axis of the master cylinder portion.

13. The control device of claim 12, further comprising:
a push rod; and
a push rod support including a receptacle at a first end of the push rod support, the push rod support being connected to the push rod at the receptacle,
wherein the push rod support supports the cam at or adjacent to a second end of the push rod support, the second end of the push rod support being opposite the first end of the push rod support, and
wherein the lever is coupled to the piston assembly via the push rod, the push rod support, and the cam, such that rotation of the lever relative to the housing causes the piston assembly to translate relative to the master cylinder portion.

14. The control device of claim 10, wherein the second adjustment mechanism includes a hollow dial supported by the housing, and
wherein the second adjustment mechanism is configured, such that rotation of the hollow dial relative to the housing causes one of the piston assembly and the master cylinder portion to translate relative to the other of the piston assembly and the master cylinder portion.

15. The control device of claim 14, further comprising:
a push rod; and
a push rod support including a receptacle at a first end of the push rod support, the push rod support being connected to the push rod at the receptacle,
wherein the second adjustment mechanism further comprises a hollow adapter having an inner annular surface and an outer annular surface,
wherein a second end of the push rod support is threadedly connected to the hollow adapter at the inner annular surface of the hollow adapter, and an inner annular surface of the hollow dial is connected to the outer annular surface of the hollow adapter,
wherein the hollow adapter abuts a piston of the piston assembly, and is configured to rotate with the hollow dial and rotate and translate relative to the push rod support via the threaded connection between the push rod support and the hollow adapter, such that rotation of the hollow dial relative to the housing causes the hollow adapter, and thus the piston assembly, to translate relative to the master cylinder portion.

16. The control device of claim 14, further comprising a push rod, wherein a piston of the piston assembly includes a receptacle at an end of the piston, the piston being connected to the push rod at the receptacle,
wherein an inner annular surface of the hollow dial is threadedly connected to an outer annular surface of the fluid cylinder, and
wherein the hollow dial is rotatable relative to the fluid cylinder via the threaded connection between the inner annular surface of the hollow dial and the outer annular surface of the fluid cylinder, such that rotation of the hollow dial relative to the housing causes the fluid cylinder to translate relative to the piston assembly.

17. The control device of claim 10, further comprising:
a shift lever coupled to and movable relative to the housing;
an electrical switch that is actuatable by movement of the shift lever;
a controller in communication with the electrical switch, the controller being configured to generate a shift signal in response to actuation of the electrical switch,
a battery receptacle supported by the base portion of the housing, the battery receptacle being electrically connected to the controller, such that when a battery is disposed within the battery receptacle, the battery is configured to power the controller, the electrical switch, or a combination thereof, and
a battery cover that closes off the battery receptacle and is removably attached to the battery receptacle or the housing.

18. The control device of claim 17, wherein the battery receptacle opens up to the downward facing side or the inward facing side of the base portion of the housing and wherein the battery receptacle is supported within the housing, between the downward facing side of the base portion of the housing and the master cylinder portion.

19. The control device of claim 17, wherein the extension portion of the housing has an inward facing side and an outward facing side, the outward facing side being opposite the inward facing side,
wherein the electrical switch is a first switch,
wherein the control device further comprises:
a second switch that is supported by the extension portion of the housing, at or adjacent to the inward facing side of the extension portion of the housing; and
an actuator in communication with the second switch, such that the second switch is actuatable via the actuator, and
wherein the actuator is supported by the inward facing side of the extension portion of the housing.

* * * * *